June 13, 1944.  E. H. PLACKE  2,351,541
ACCOUNTING MACHINE
Filed March 24, 1941  15 Sheets-Sheet 1

Everett H. Placke
Inventor

By Carl Benst
His Attorney

Everett H. Placke
Inventor

By Carl Beust
His Attorney

June 13, 1944.  E. H. PLACKE  2,351,541
ACCOUNTING MACHINE
Filed March 24, 1941    15 Sheets-Sheet 3
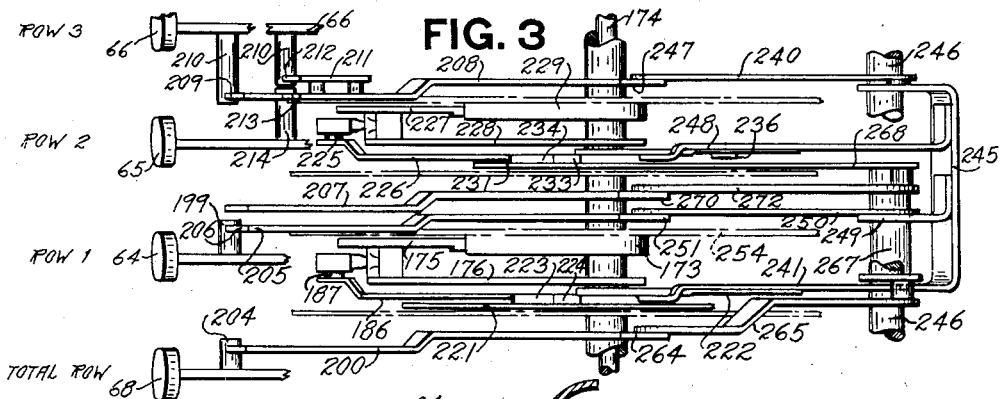
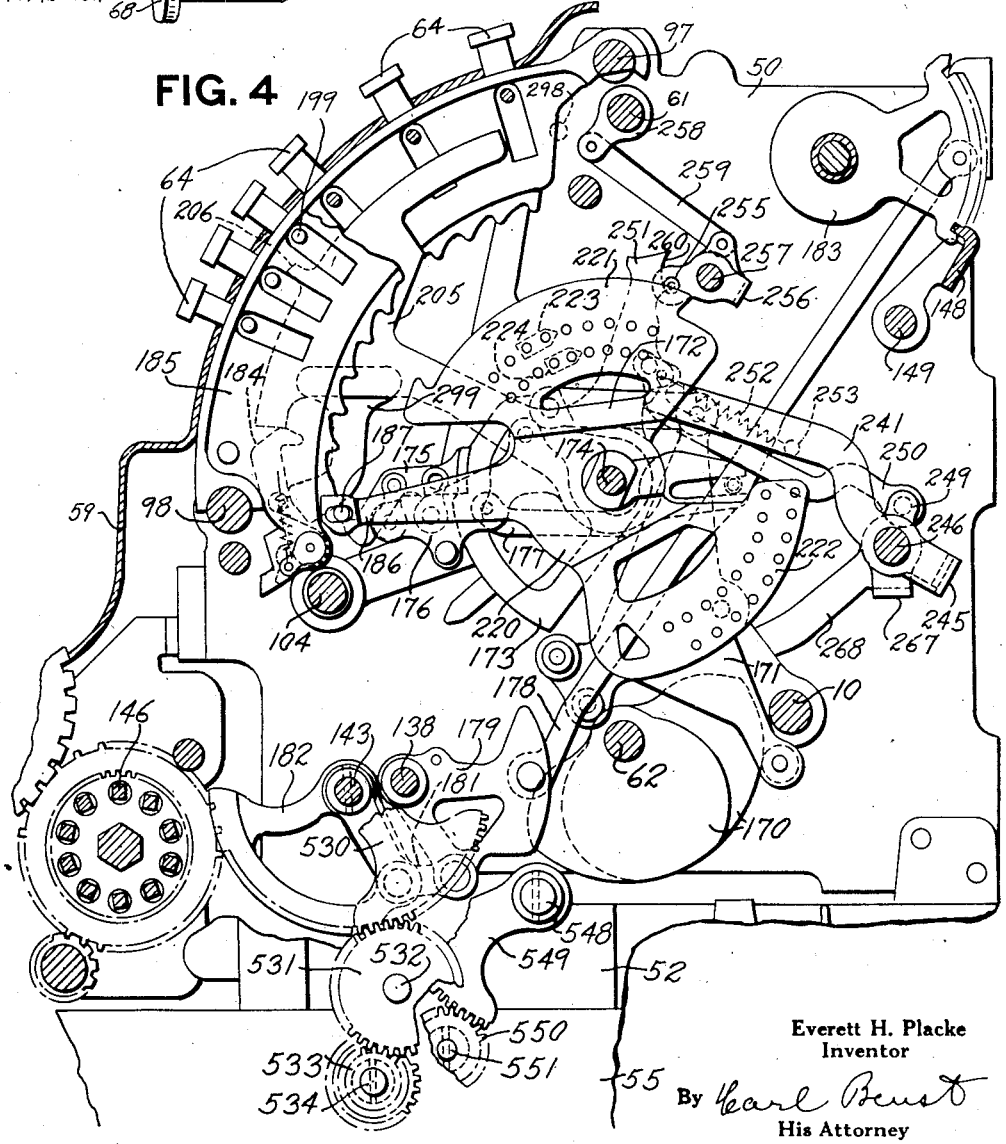
Everett H. Placke
Inventor
By Carl Beust
His Attorney

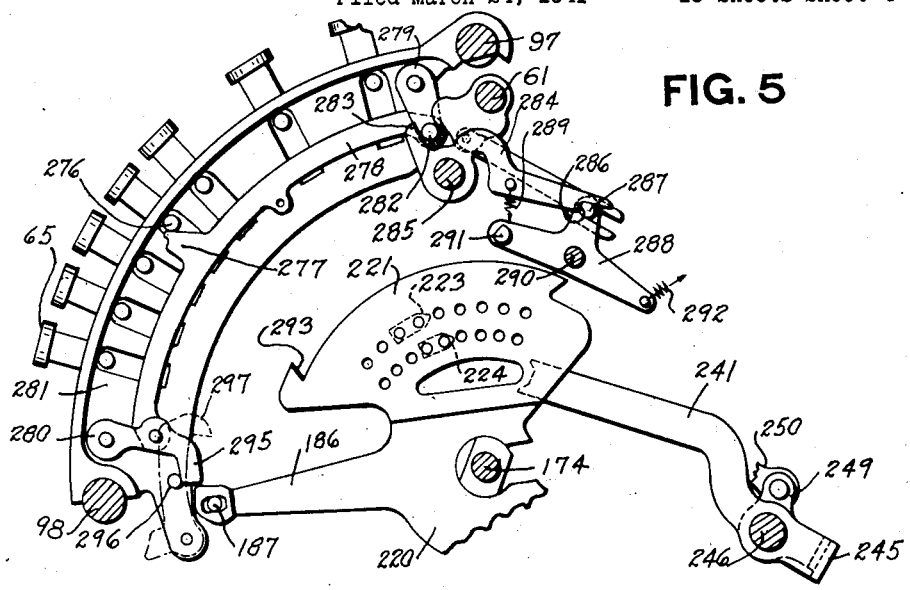
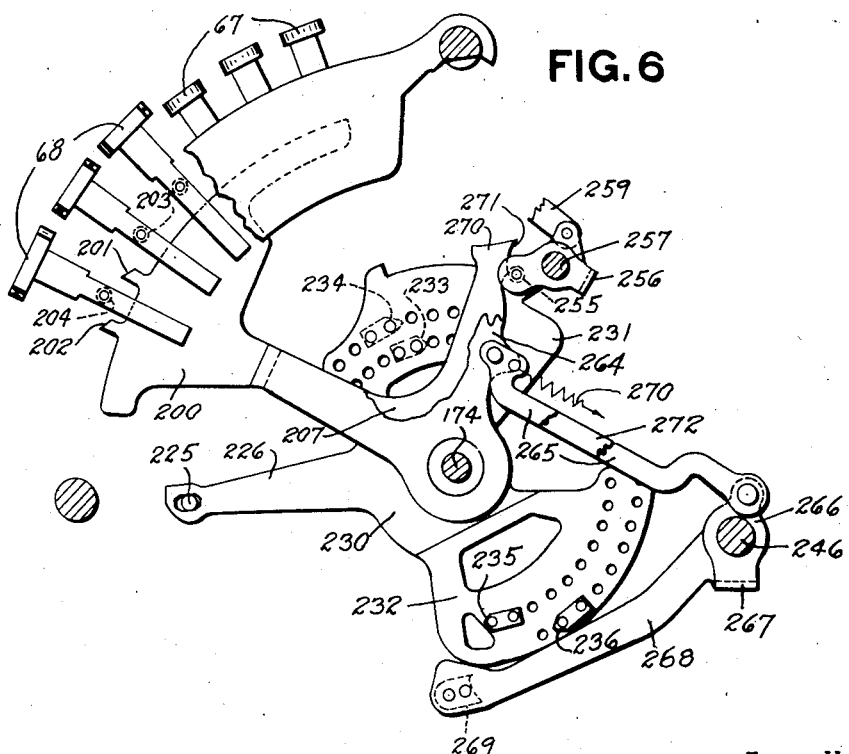

June 13, 1944.  E. H. PLACKE  2,351,541
ACCOUNTING MACHINE
Filed March 24, 1941   15 Sheets-Sheet 5
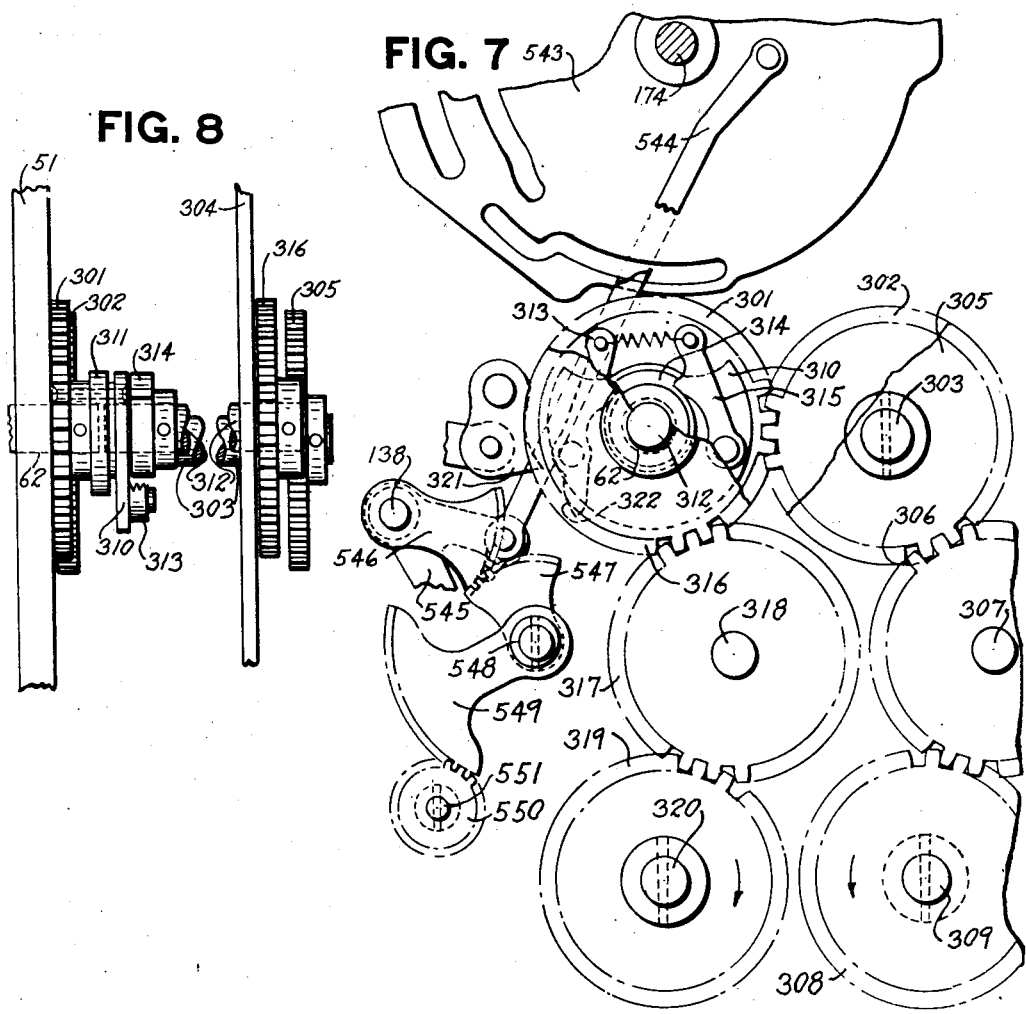
Everett H. Placke
Inventor
By Earl Beust
His Attorney June 13, 1944.　　　E. H. PLACKE　　　2,351,541
ACCOUNTING MACHINE
Filed March 24, 1941　　15 Sheets-Sheet 6

Everett H. Placke
Inventor

By *Earl Benst*
His Attorney

June 13, 1944.  E. H. PLACKE  2,351,541
ACCOUNTING MACHINE
Filed March 24, 1941    15 Sheets-Sheet 7

Everett H. Placke
Inventor
By Pearl Benst
His Attorney

June 13, 1944.　　　　E. H. PLACKE　　　　2,351,541
ACCOUNTING MACHINE
Filed March 24, 1941　　　15 Sheets-Sheet 8

Everett H. Placke
Inventor

By Earl Beust
His Attorney

June 13, 1944. E. H. PLACKE 2,351,541
ACCOUNTING MACHINE
Filed March 24, 1941 15 Sheets-Sheet 9

Everett H. Placke
Inventor

By Earl Beust
His Attorney

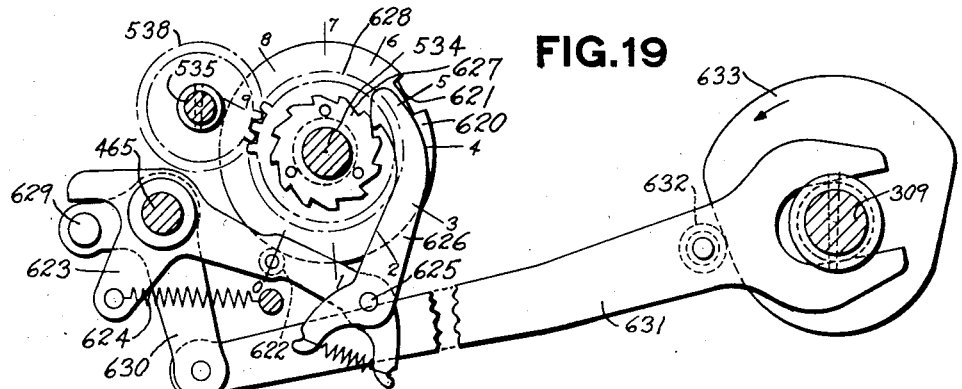
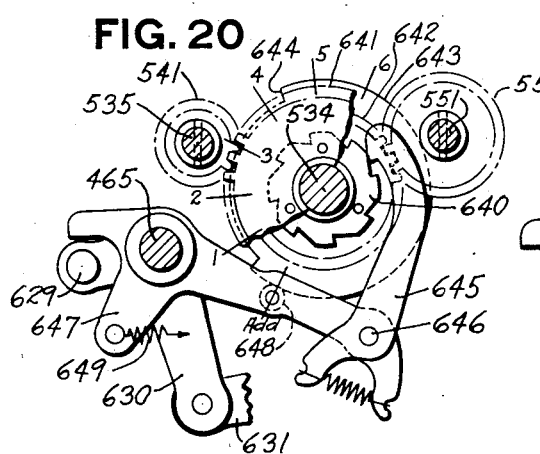
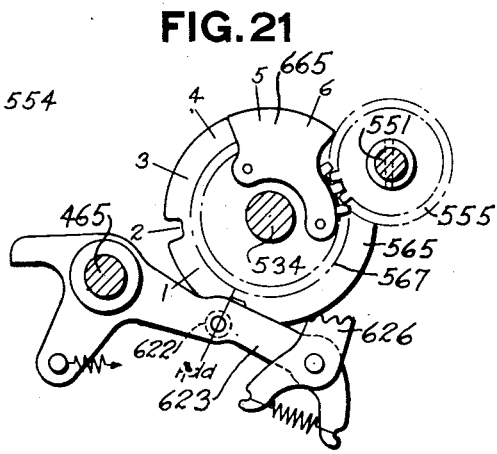
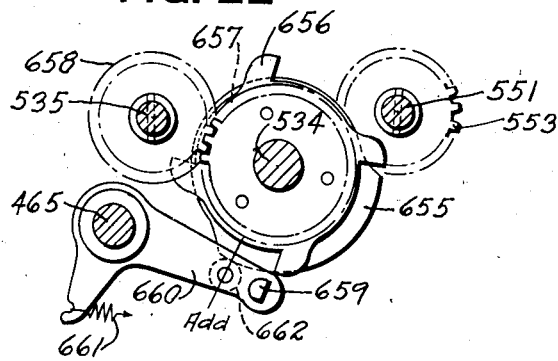

June 13, 1944.                    E. H. PLACKE                    2,351,541
                              ACCOUNTING MACHINE
                           Filed March 24, 1941           15 Sheets-Sheet 11
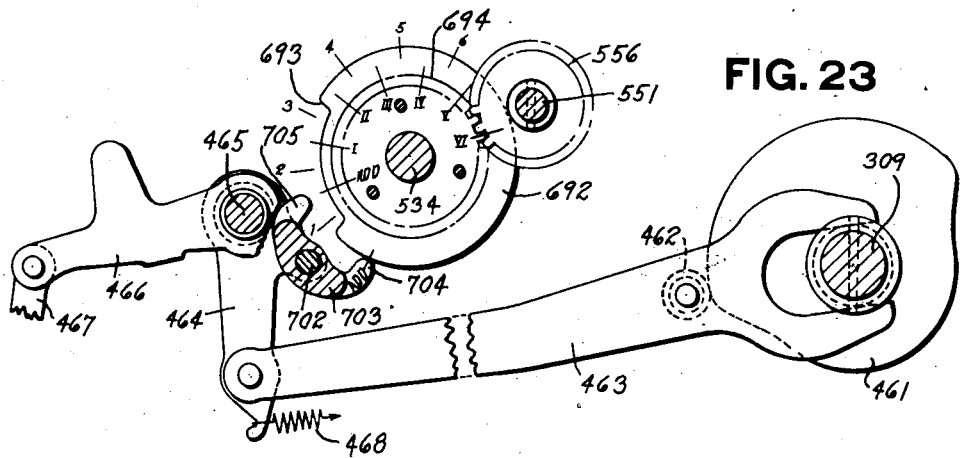
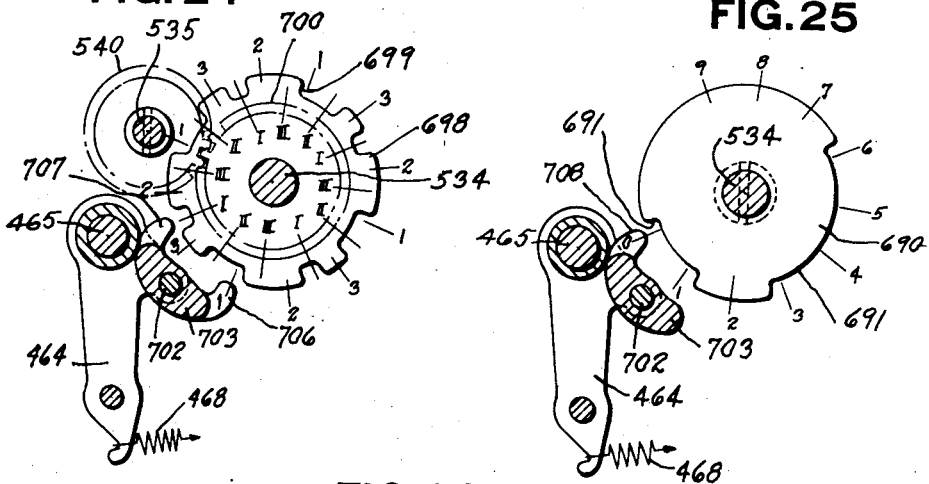
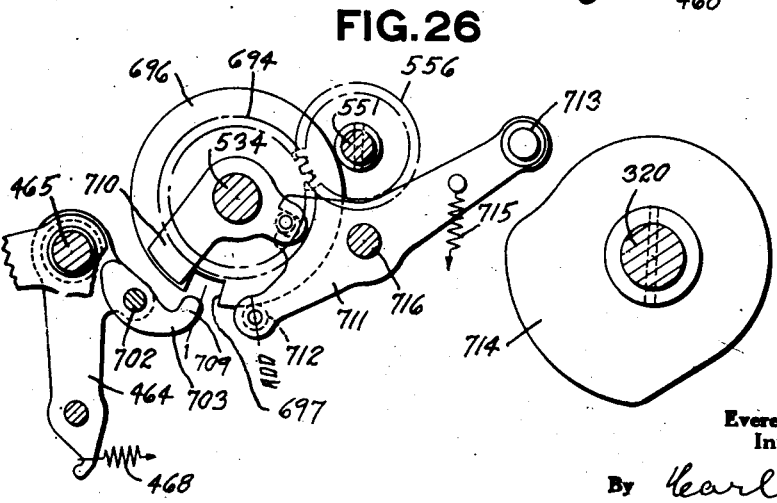
Everett H. Placke
Inventor
By *Carl Beust*
His Attorney June 13, 1944.  E. H. PLACKE  2,351,541
ACCOUNTING MACHINE
Filed March 24, 1941  15 Sheets-Sheet 12
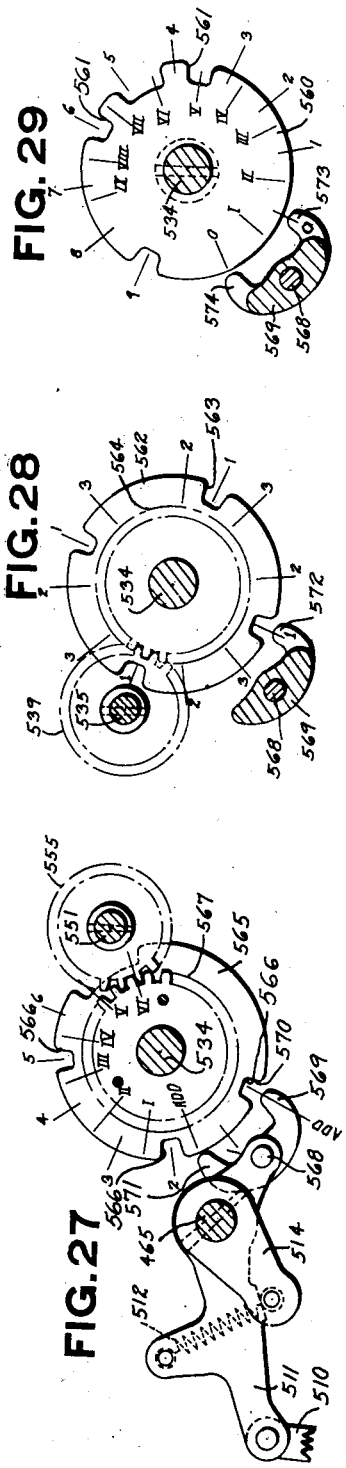
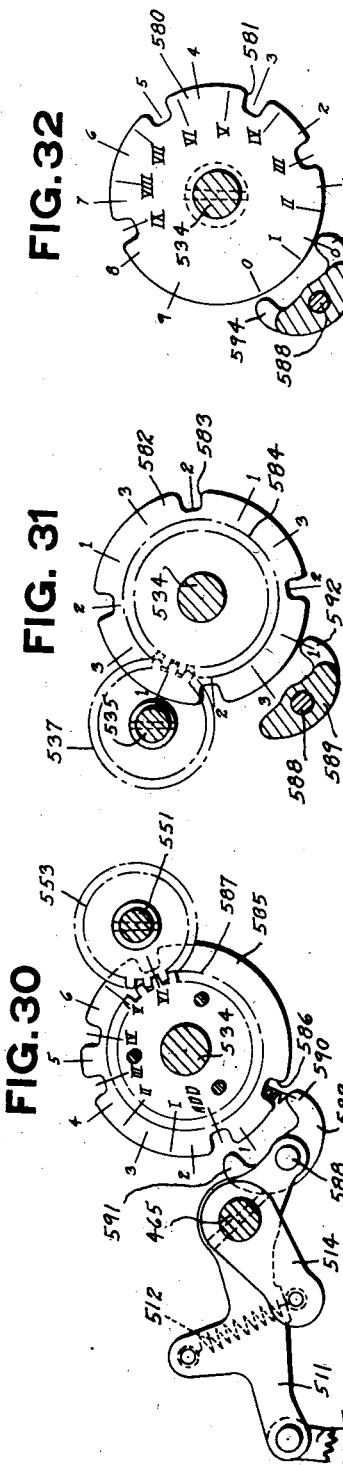
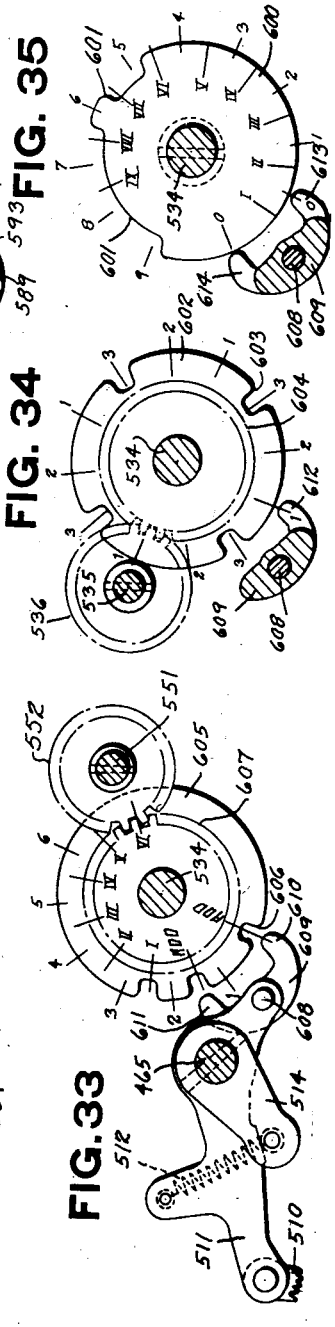
Everett H. Placke
Inventor
By Carl Beust
His Attorney June 13, 1944.                E. H. PLACKE                 2,351,541
                          ACCOUNTING MACHINE
                      Filed March 24, 1941      15 Sheets-Sheet 13

| THE DOE CO. | | | | EMPLOYEE'S STATEMENT | | | |
|---|---|---|---|---|---|---|---|
| CHECK NO. | DATE | | | CLOCK NO. | HOURS | GROSS AND BAL. | DEDUCTIONS | NET |
| 2085 | JAN 14-41 | EXACTLY $ * 47 AND 45¢ | $*47.45 | 123 | 45 | 55.00 | SS .55 IN 2.00 AD 5.00 | 47.45 |
| PAY TO THE ORDER OF | | | | | | | BA 15.00 ED 95.00 | |
| Richard Roe | | | | | | | | |

FIG. 38

| EARNINGS RECORD | | | | | | | ADVANCE LEDGER | | | | | |
|---|---|---|---|---|---|---|---|---|---|---|---|---|
| WEEK ENDING | CLOCK NO. | HOURS | CHECK NUMBER | O.A.B. | EARNINGS TO-DAY | TO-DATE | DATE | CLOCK | CHECK | ADVANCE | RE-PAID | BALANCE ON ADVANCES |
| JAN 7 | 123 | 30 | 2083 | | 40.00 | 40.00 | JAN 7 | 123 | 2083 | | | 20.00 |
| JAN-14 | 123 | 45 | 2085 | .55 | 55.00 | 95.00 | JAN-14 | 123 | 2085 | | 5.00 | 15.00 |
| JAN-14 | 123 | 90 | 2086 | .90 | 100.00 | 195.00 | JAN-14 | 123 | 2086 | | 15.00 | .00 |
| JAN-14 | 123 | 60 | 2087 | .75 | 75.00 | 270.00 | | | | | | |

Everett H. Placke
Inventor

By *Earl Benst*
His Attorney

June 13, 1944. E. H. PLACKE 2,351,541
ACCOUNTING MACHINE
Filed March 24, 1941 15 Sheets-Sheet 14

Everett H. Placke
Inventor

By Kearl Beust
His Attorney

June 13, 1944.    E. H. PLACKE    2,351,541
ACCOUNTING MACHINE
Filed March 24, 1941    15 Sheets-Sheet 15

Everett H. Placke
Inventor
By Carl Benst
His Attorney

Patented June 13, 1944

2,351,541

UNITED STATES PATENT OFFICE 2,351,541

ACCOUNTING MACHINE

Everett H. Placke, Dayton, Ohio, assignor to The National Cash Register Company, Dayton, Ohio, a corporation of Maryland Application March 24, 1941, Serial No. 384,930

21 Claims. (Cl. 101—93)

This invention relates to accounting machines and similar business machines and is directed particularly to the recording means of such types of machines.

The invention is embodied in machines of the general type shown in the following United States Letters Patent, and reference may be had to them for a complete showing and description of standard mechanisms not fully disclosed herein: United States patents, Nos. 1,619,796; 1,747,397; 1,761,542; and 1,916,535 issued March 1, 1927; February 18, 1930; June 3, 1930; and July 4, 1933, respectively, to Bernis M. Shipley; No. 2,175,346, issued October 10, 1939, to Maximilian M. Goldberg; No. 2,141,332 issued December 27, 1938, to Charles H. Arnold; No. 1,693,279 issued November 27, 1928, to Walter J. Kreider; and the following co-pending applications for United States Letters Patent for accounting machines: Serial Number 324,462, filed March 18, 1940, by Mayo A. Goodbar, now Patent No. 2,305,000, issued December 15, 1942; Serial Number 359,374 filed October 2, 1940, by Pascal Spurlino and Konrad Rauch, and Serial Number 381,962 filed March 6, 1941, by Pascal Spurlino, Mayo A. Goodbar, and Marvin D. Frost now Patent No. 2,345,839, issued April 4, 1944.

The machine embodying the present invention and as now constructed is well adapted for use by any organizations where a large number of payroll checks are to be issued periodically and particularly where such organizations wish to keep accurate records of totals of the amounts paid to their employees, and also a record of the various deductions which nowadays is common practice. As is well known, such deductions include social security payments, group insurance premiums, payments on advances made to the employees by the Company, interest on such payments and many types of deductions which various organizations permit their employees to make against their gross earnings for a definite period.

Accurate records of each of the various types of individual deductions are accumulated in the machine with the result that the Company may at any time definitely ascertain by means of printed records the various totals of such deductions, also the totals of the net earnings of the employees, the gross earnings of the employees and the advances made to the employees.

The machine is also adapted to print a payroll check upon the main portion of which are shown the check number, the date, and the net amount of the check. On a stub portion of the check, which is to be torn off and retained by the employee before cashing the same, are shown his clock number, the number of hours that he worked, the gross amount of his check, a list of the deductions and symbols indicating what the deductions are for, the balance of the advances which have been made to such employees to date, and also the total of his gross earnings to date. On this stub is also printed the net amount of his check, which is identical with the amount printed on the main portion of the check.

A ledger card may also be printed by the machine shown in the present invention, upon which ledger card there appear in duplicate the date, the employee's clock number, and the serial number of the check. The number of hours is also printed on the ledger card, the amount of OAB or social security paid, the gross earnings on the present check, the total earnings to date, the amounts repaid on advances, and finally the balance on the advances.

On the detail strip or audit sheet the machine is adapted to keep a very complete record of all of the transactions which transpire in connection with each employee.

On this sheet, in connection with each payroll check which is issued, there is a printed record of the employee's clock number, the number of hours worked, the total of his earnings to date, the balance of advances that he owes to date, and the gross earnings, all of which are printed in one line. In the next line are printed the number of deductions which the employee may have had if the amount of such deductions does not exceed three. If there are 1, 2 or 3 deductions, all of them are printed on the second line. If there are more than three deductions, then the fourth deduction is printed on the third line. On the next line, whether it be the third or fourth line, is printed the present status of the employee's account, which is the new gross earnings to date, the new balance of advances, and the net amount of his check, along with the serial number of the check.

Such a record is printed by the machine on the audit strip for each employee's account as his payroll check is printed by the machine.

Certain of the amounts printed on the check, the ledger sheet and the audit strip are set up on the keyboard of the machine, the same being divided into sections, whereupon the employee's clock number may be set up on certain keys, the number of hours worked on other keys, and then a control key is operated to cause such amounts to be added into or subtracted from totalizers in the machine. On the next operation the same keys upon which the employee's clock number and the number of hours worked are set up, may be used to set up the previous earnings to date and the advances to date. These are two separate operations and are called pick-up operations. After such operations the operator sets up on the keyboard the various deductions, such as OAB or social security, the insurance deductions, repayment of money against the advance payment totals, and various other types of deductions, such as garnishees, welfare deductions, and several others designated as miscellaneous deductions.

After the necessary deductions are made, then the keys in the total row are operated, usually in the following order: The "Advances to date" total key is depressed, then the "Earnings to date" total key is depressed, and finally the "Net check" key is depressed. The results of the depressions of these three keys are as follows: The total "Advances to date" are printed on the check, the ledger card and the audit strip, the "Earnings to date" are also printed on all three of such record materials, and the amount of the "Net check" is printed on the check and the stub portion of the check and also upon the record strip.

Usually the sequence of operation is first to pick up the "Earnings to date," which amount may be secured from the ledger card, and the next operation is to pick up the balance of the "Advances to date" which also is obtained from the ledger card.

Some organizations prefer to use a time clock card for the purpose of setting up the employee's clock number, the number of hours worked, and various types of deductions, such as social security, group insurance, advances, etc.

Therefore, in order to take care of such conditions, the present machine is provided with an attachment, in which a stack of such time cards may be placed in position directly above the keyboard of the machine so that they can be easily read by the operator.

These cards are stacked in a substantially vertical position. However, they do lean slightly forward. There is a weight block back of the cards to keep them all forward so that the first one in front is underneath a picker, or card ejecting device. This device is operated by an electromagnet and functions upon the depression of the "Earnings to date" key in the total row.

The attachment also has a motor which is constantly driven and which operates a set of feeding rolls to which the card is presented upon the downward movement of the picker, whereupon the card is fed into a storage bin directly below that part of the attachment which supports the stack of cards. This of course brings into view the next employee's card, from which data may be read to pick up various items that are to be entered into the machine as above described.

For the purpose of illustrating one form of the present invention, the machine shown herein is constructed to perform the functions stated above. However, it is not intended to limit the invention to this one form, as other forms for fulfilling other types of business systems may be used without in any way departing from the invention. This is particularly true in connection with the audit strip, the control of the impression means for printing thereon, and the feeding means for feeding the audit strip at the proper time and preventing feed of the record strip at other times under the control of the three banks of control keys and one bank of total keys, shown in the present invention.

It is, therefore, one object of this invention to provide an accounting machine with means for distributing items into a plurality of classification totals and also provide a plurality of "Crossfooters" or add-subtract totalizers for obtaining the proper totals and balances of the various necessary items.

Another object of this invention is to provide an accounting machine with a more flexible type of record material feeding mechanism.

Another object is to provide a novel feeding mechanism for the record material whereby a plurality of data may be printed on one line, a plurality of data or a single item may be printed on an adjacent line, and a plurality of data printed on a third line, all in connection with one transaction.

A further object of the present invention is to provide a novel control for the several impression means associated with the record material, which control is wholly dependent upon the type of operation through which the machine is being put.

Another object of the present invention is to provide an easily accessible audit strip supporting mechanism, one which can be very readily slid outwardly from the machine so that it can be reloaded very conveniently at any time.

Another object of this invention is to provide a hand spacing or feed mechanism for the audit strip, and in conjunction with said hand feeding mechanism means is provided for releasing the mechanism that normally retains the audit strip roll in position when the hand feeding means is moved in the reverse direction.

Another object of the present invention is to provide a special drive mechanism for the printer means whereby certain parts of the printing mechanism receive two complete cycles of operation during total taking operations whereas other parts of the same printing mechanism receive only one cycle of operation during total taking operations, which is the usual manner in which printing means of machines of the present type are operated.

In other words, generally a total taking operation consists of two cycles of operation, whereas adding operations consist of one cycle of operation, and previously usually the printing mechanism is wholly disabled during the first cycle of a two-cycle total taking operation, whereas in the present invention, as above stated, there is provided a novel means for giving a part of the printing mechanism two cycles of movement during certain total taking operations and also only the one usual second cycle of operation during other total taking operations.

A still further object of the present invention is the provision of a novel control means for controlling the operation of the individual impression means associated with the record material.

Another object of this invention is the provision of novel mechanism to work in conjunction with said control means to automatically position the same to control the printing on the record material, depending upon the type of transaction being entered in the machine and also depending upon the number of certain other types of operations being entered in the machine.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 3 is a skeleton view of a portion of the mechanism for controlling the operation of the differential mechanisms of certain of the banks of transaction keys by certain of the transaction keys in other banks, and also by the keys of the total bank.

Fig. 4 is a section of the machine taken to the right of the first bank of transaction keys looking toward the left of the machine.

Fig. 5 is a fragmentary view of a portion of the second transaction bank and shows the means controlled thereby for controlling the differential mechanism of the first transaction bank to be set to the eighth position upon operation of the key in the fourth position of the second transaction bank.

Fig. 6 is a fragmentary view of the total key bank, and shows the means whereby a device under control of the second transaction bank is used to transmit motion from the key lock shaft to operate the control row detent to control the differential mechanism associated with the second transaction bank, to be set in the first and second positions under control of the first two keys of the total row.

Fig. 7 is a view of the driving mechanism from the main drive shaft of the machine, showing how a portion of the printing mechanism receives only one cycle of operation during a two-cycle total taking operation and how another portion of the printing mechanism receives two full cycles of operation during the two-cycle total taking operation.

Fig. 8 is a fragmentary partial view in edge elevation of a part of the driving mechanism of Fig. 7.

Figure 9A:
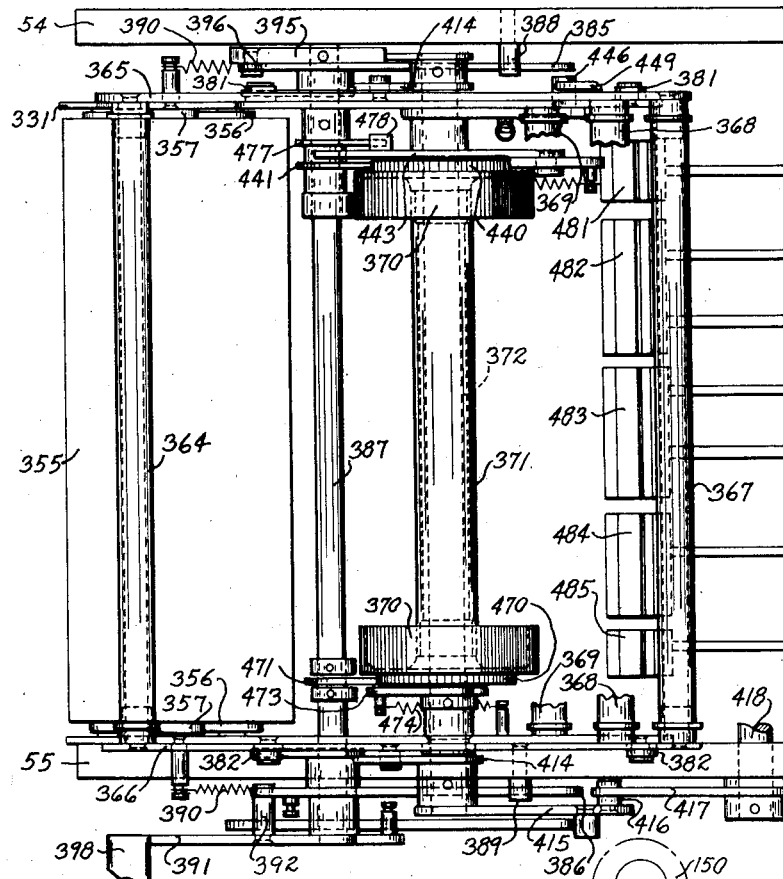
Figure 9B:
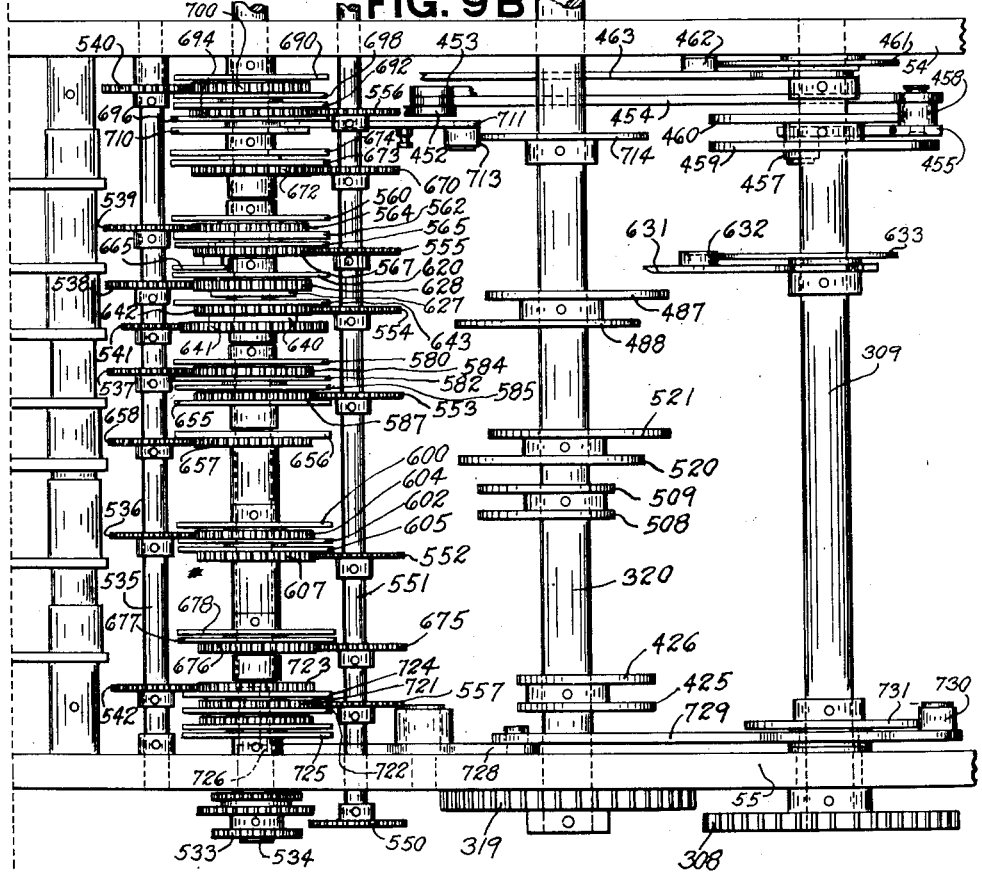

Figs. 9A and 9B together constitute a top plan view of the printing mechanism for printing on the audit strip and also shows a portion of the control means for feeding the strip and also for controlling the impression means associated with said audit strip.

Figure 10A:
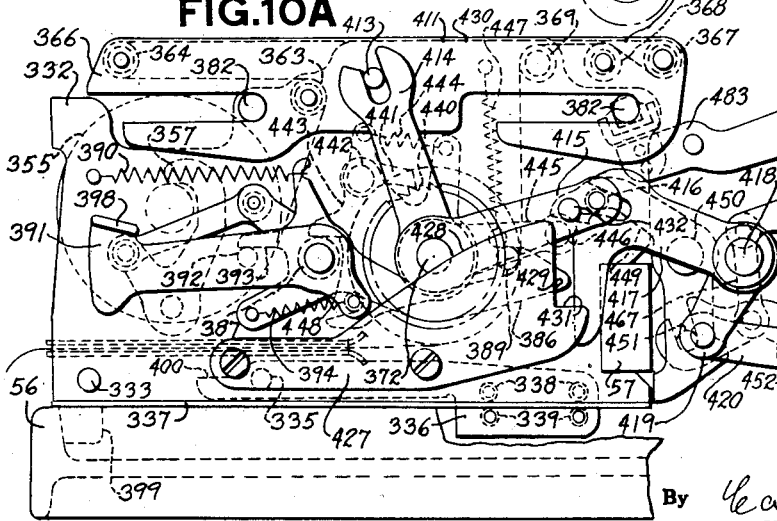
Figure 10B:
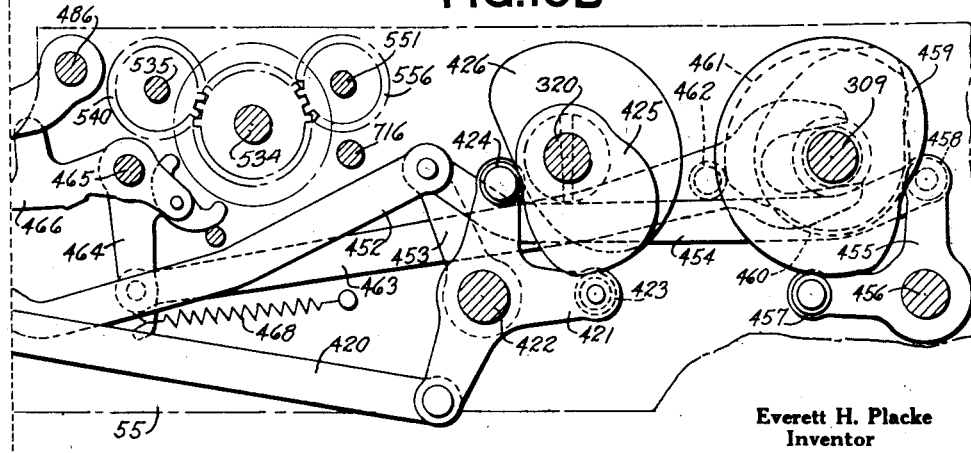

Figs. 10A and 10B constitute a right side elevation of the mechanism shown in Figs. 9A and 9B.

Figure 11:
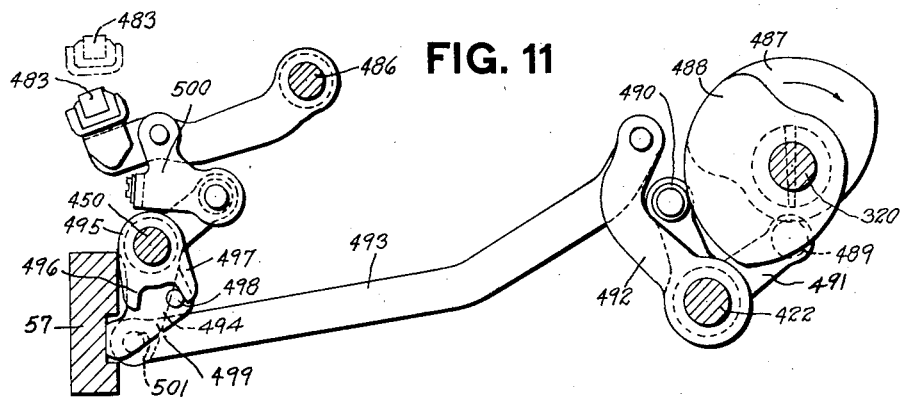

Fig. 11 shows the means for raising and lowering the hammers prior to the actual operation thereof for printing.

Figure 12:
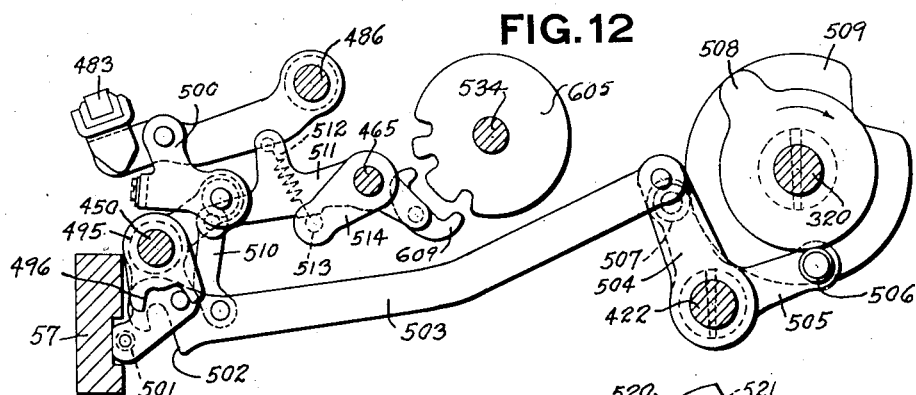

Fig. 12 shows the means for operating the hammers after they have been raised into approximate printing position.

Figure 13:
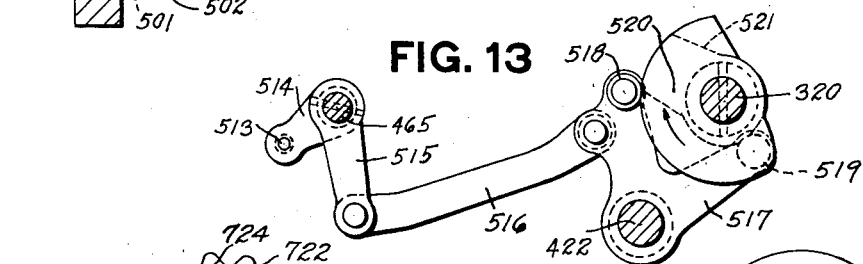

Fig. 13 shows the means for connecting the hammers to and disconnecting the hammers from their operating means.

Figure 14:
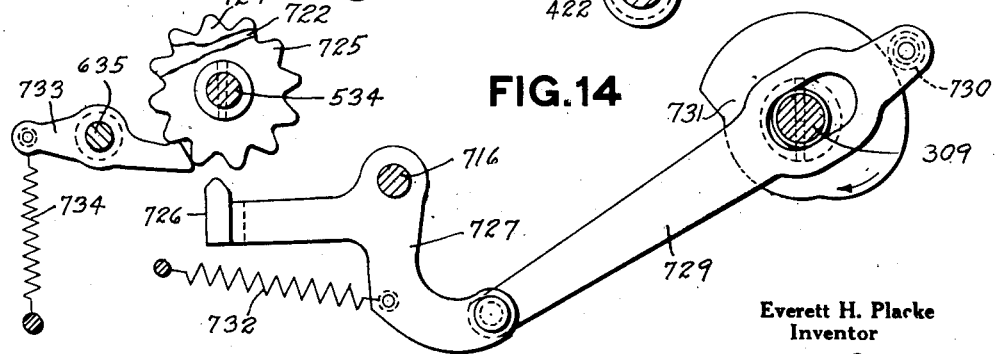

Fig. 14 is a detail view of the common alining means for the entire set of impression control and feed control means.

Figure 15:
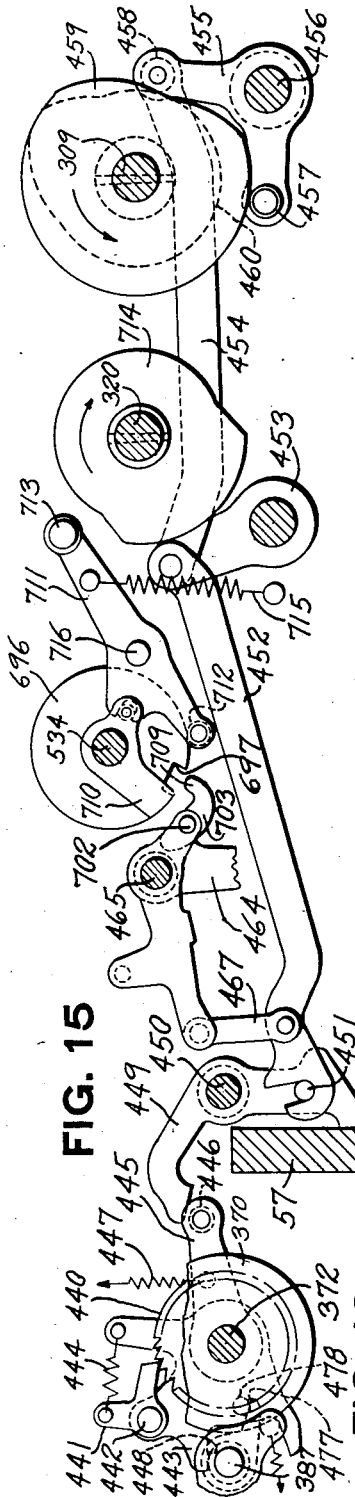

Fig. 15 is a detail of the means for feeding the audit strip.

Figure 16:
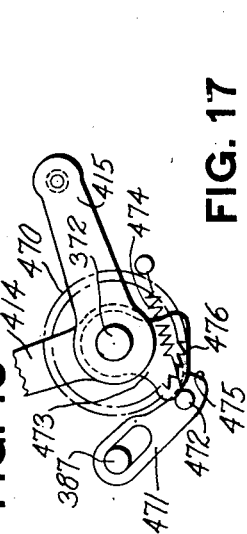

Fig. 16 is a detail of the means for preventing overthrow movement of said feeding means.

Figure 17:
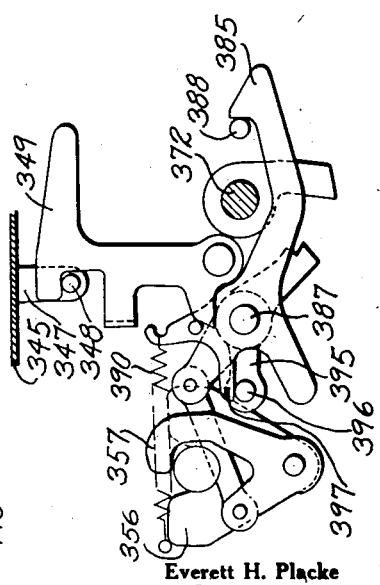

Fig. 17 shows the means for retaining the audit strip supply roll in its normal position in the machine and also shows the manually operated means for permitting removal of the audit strip and installation of another one.

Figure 18:
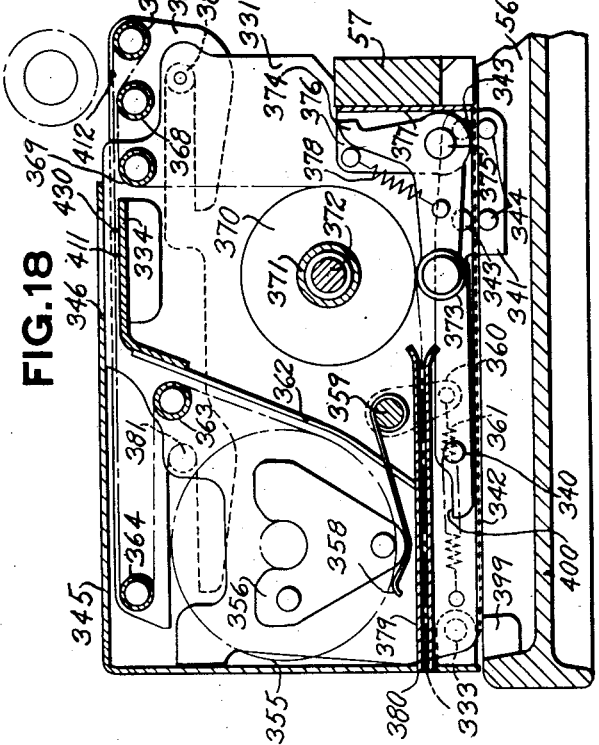

Fig. 18 shows a portion of the frame for carrying the audit strip and the mounting therefor, and the guide means for feeding the strip around through the frame so that it can be properly printed upon.

Fig. 19 is a detail of the means for controlling the feeding of the impression selecting plates during operations of the machine in which deductions are being entered in the machine.

Fig. 20 is a detail of the means for feeding the hammer selecting plates during total operations.

Fig. 21 shows the means to prevent the feeding means of Fig. 19 from feeding when totals are cleared from row three.

Fig. 22 shows the overthrow preventing means for the feeding means of Fig. 20.

Figs. 23 to 26 show individually the four control plates for controlling the feeding of the audit strip on certain types of operation and preventing the feed of the strip on other types of operations. The plates of Figs. 23 and 26 are controlled by the total control row, the plate of Fig. 24 is controlled by the mechanism shown in Figs. 19 and 20, and the plate of Fig. 25 is controlled directly from the second transaction bank.

Figs. 27 to 35 inclusive show details of the selecting plates for controlling the selection of the hammers for printing on the audit strip. Of this group of figures, Figs. 27, 30 and 33 show the plates controlled by the total row; the plates of Figs. 28, 31 and 34 are set under the control of the mechanism of Figs. 19 and 20; and the plates of Figs. 29, 32 and 35 are set under the control of the differential mechanism of row 2.

Figures 36, 37, 38:
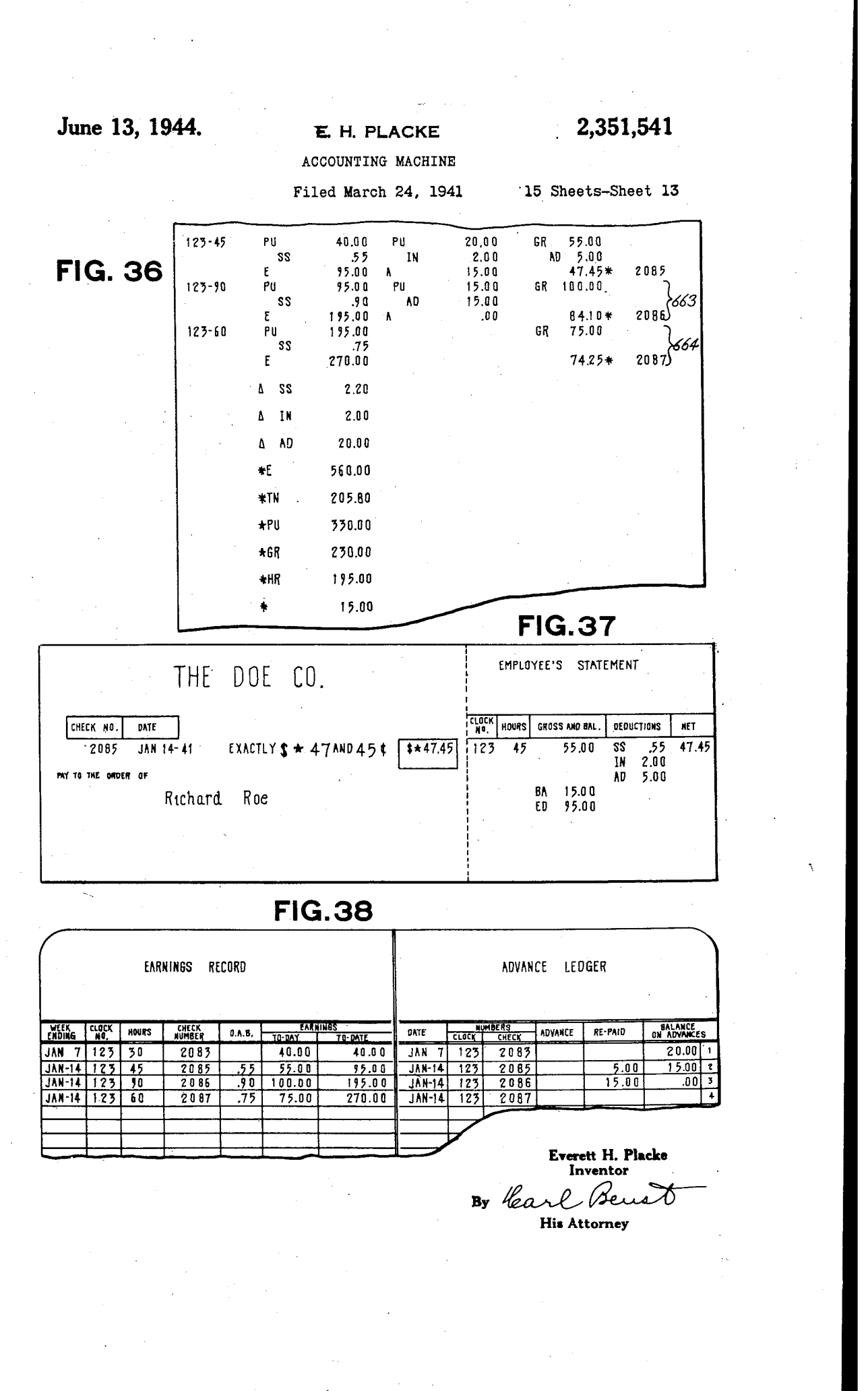

Fig. 36 is a facsimile of a portion of the audit strip.

Fig. 37 is a facsimile of the check printed by the present machine.

Fig. 38 is a facsimile of a ledger card printed by the present machine.

Figure 39:
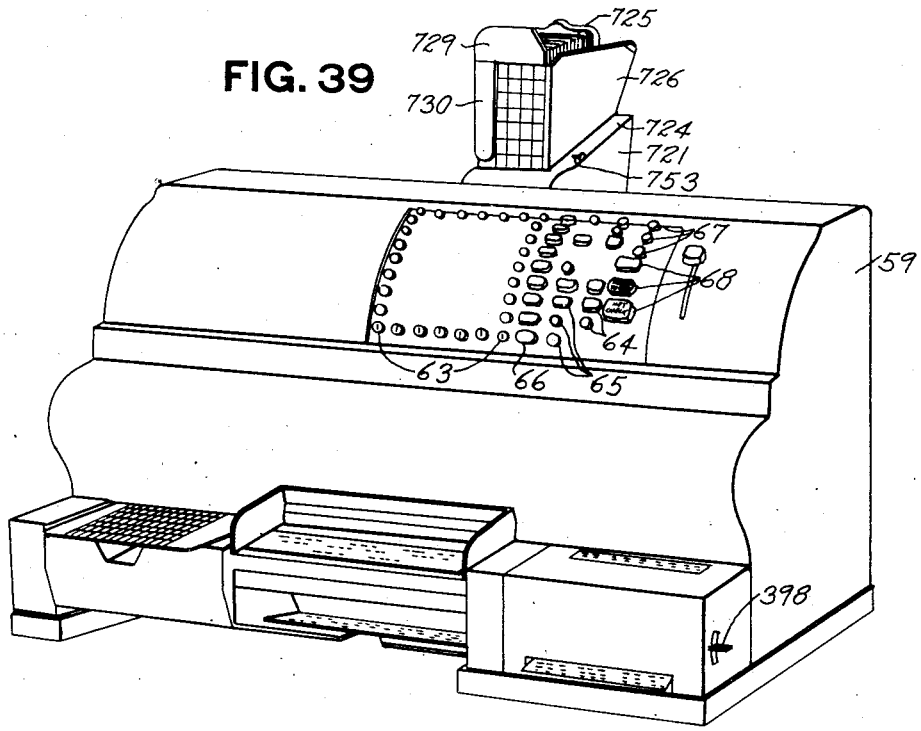

Fig. 39 is a perspective view of the machine and also shows the attachment and the time clock cards used by the operator to pick up the number of hours worked by the employee and also other data from the cards, as previously mentioned.

Figure 40:
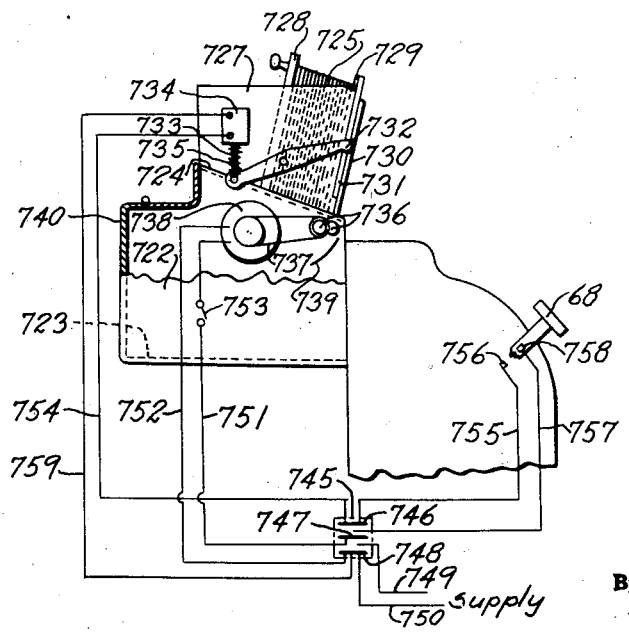

Fig. 40 is a view of a portion of the mechanism of the time card supporting attachment and shows how the card picker mechanism is released for operation upon the depression of the "Earnings to date" key of the total row.

Figure 41:
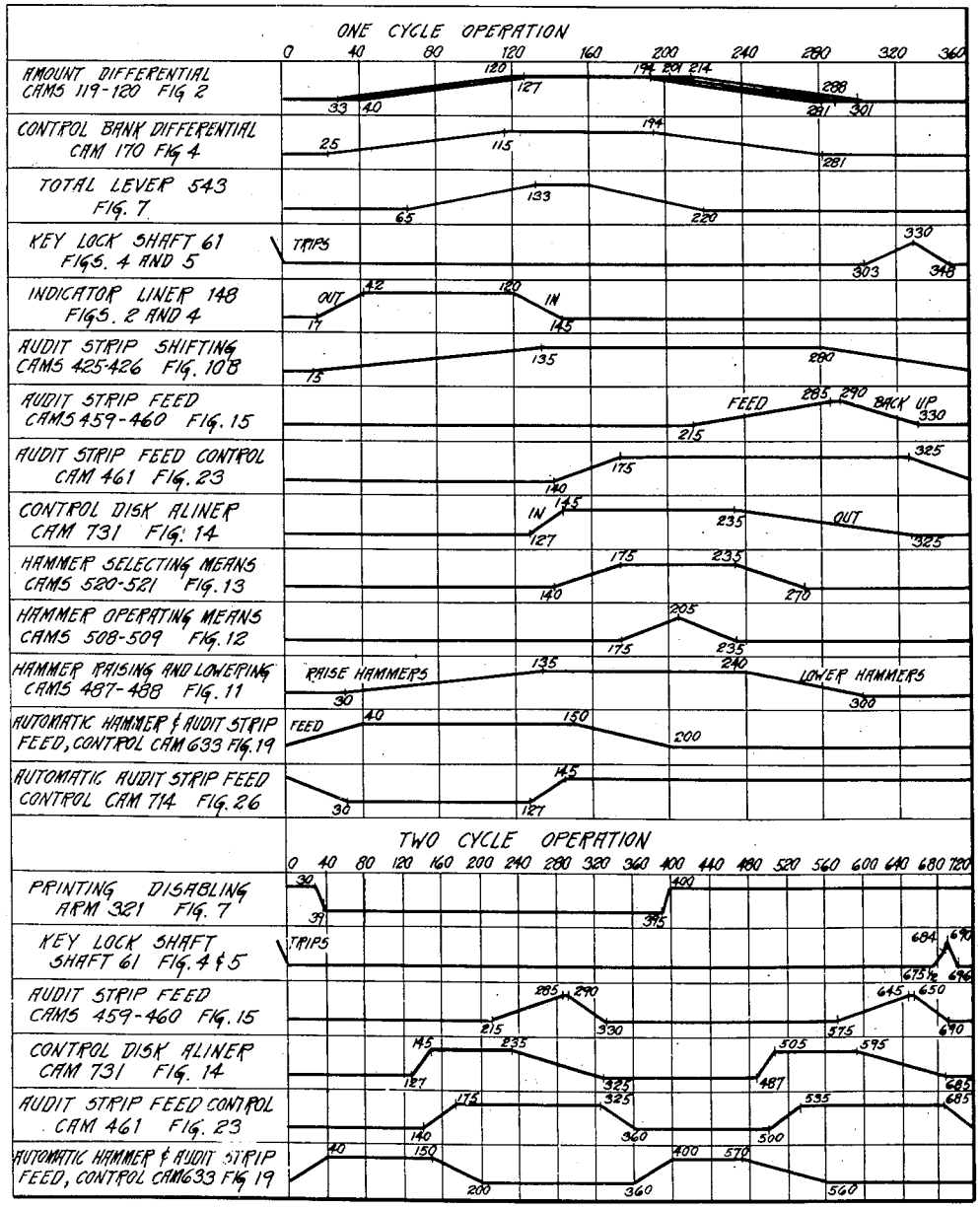

Fig. 41 is a time chart illustrating the time of operation of the various mechanisms described.

GENERAL DESCRIPTION

Described in general terms the machine embodying the instant invention is of the type generally disclosed in the above mentioned Shipley and Goldberg patents. These patents disclose a plurality of totalizers into which may be distributed various amounts, according to the business system for which the machine is built. In the present instance the totalizers are adapted to receive the many and various items constituting individual transactions that are handled in the process of making out payroll checks. The above mentioned patents also disclose what are known in the art as add and subtract totalizers or "Crossfooters," from which balances may be printed at any desired time.

In the present machines there has been a definite change in the position and operation of the master tape or audit strip. In the patents above mentioned, the audit strip is usually in the front of the machine, whereas in the present machine this master tape or audit strip is at the right end of the machine and in the forward part thereof. Moreover it is so mounted on a slidable and tiltable frame that the entire audit strip may be slid forwardly out of the machine and tilted to a substantially right angled position from normal, for the purpose of removing the old audit strip or the core of the old audit strip when the strip is exhausted, so as to replace a new roll in the machine. After the replacing of the roll, the audit strip frame is again tilted back to its horizontal position and moved toward the rear of the machine and latched in position relative to the printing mechanism or hammers, by means of which printed impressions are made from the groups of columnarly positioned type wheels which are set under control of the internal gear drive mechanism, such as that fully illustrated and described in the above mentioned Kreider patent.

In the previously mentioned co-pending applications of Spurlino and Rauch the master tape is also located at the right end of the machine but the printing upon said strip and the feeding mechanism of such strip are wholly different from those disclosed in the present application.

The hammers and type wheels for printing upon the ledger card are located at the lefthand side of the machine and the type wheels and printing hammers for printing upon the payroll checks are located substantially at the center of the machine. The payroll check is fed into the machine in substantially the same manner as are the telephone statements in the previously mentioned copending application of Mayo A. Goodbar, Serial Number 324,462.

As above mentioned, there is also provided in the machine of the present invention the internal gear driving mechanism, such as that disclosed in the above mentioned Kreider patent, which is for the purpose of simultaneously setting up on groups of printing devices amounts and data under control of the keys so that printing can be readily accomplished on an inserted ledger card at the extreme left of the machine, upon the payroll check insertable near the center part of the machine, and also on the audit strip which as above mentioned is located at the right front part of the machine.

Such amounts are all set up under the control of the amount keyboard, which in the present instance has, as above mentioned, the dual function of setting up the clock number and number of hours worked by the employee, and of setting up the gross amount of the employee's check, and is used also for the picking up of the other necessary figures, such as the "Earnings to date" and "Advances to date." These keys also are used for setting up on the keyboard any and all of the various types of deductions that may be used by various companies which may be using such machines.

As has been previously mentioned, the machine keyboard is arranged for taking care of business systems in connection with organizations that wish to issue payroll checks and keep very complete records of all of the various transactions which pertain to the issuance of any particular payroll check. The machine is, therefore, provided with the amount keys as above mentioned, of sufficient capacity to take care of such types of business.

There are also three rows of what are known in the art as "Control keys," for the purpose of selecting various totalizers for the distribution of the transactions entered in the machine. There is also a row of total-taking keys, which control the machine for the purpose of taking totals of the necessary items in connection with the printing of a payroll check and for clearing the various totalizers at the close of any day when it is desired to clear out the machine to render it ready for business for the following day or any other following period.

The rows of control keys above mentioned will hereinafter be known as transaction keys, and are numbered row 1, row 2, and row 3, for purposes of a better understanding of the controls effected by these keys over the printing hammers and also over the feeding mechanism for the audit strip. The extreme righthand row of keys in Fig. 1 will be known hereinafter as the total row.

In the carrying out of the invention herein described, a mechanism is utilized for controlling the release of certain printing hammers and the effectiveness of the audit strip feed, which is similar in construction to that shown and described in Letters Patent of the United States No. 2,141,332, issued to Charles H. Arnold on December 27, 1938. However, in the Arnold patent, the adjustment of certain control plates is under the sole control of the keys on the keyboard, and the column in which data is to be printed, and the effectiveness of the audit strip feed, are always the same for a given control key. In the present invention, the hammer operation and audit strip feed mechanisms are controlled in part by the keys on the keyboard and in part by a special automatic mechanism. The operation of this automatic mechanism is determined by the type of entry made during a preceding operation, as will become apparent when the detailed description which follows is considered.

Described in very general terms, the effect of the special automatic mechanisms in controlling the audit strip feed, acting jointly with the keyboard controls, is to cause the entries to be made in the proper columns of one line, until a predetermined number of such entries has been made, or until a different class of entry is to be made, all of which is accomplished without overprinting. Using the first transaction illustrated in Fig. 36 as an example, this joint control functions as follows:

The first three entries in the order named made are the amount of "Earning-to-date," the amount of "Pick-up advance balance," and the amount of "Gross earnings." In the entry of each of these items, a printing hammer is selected to cause the entry to be made in the proper column, but the audit strip feed mechanism is controlled to remain in its original or unfed position, so that all three items are printed on the same line. During the entry of said three items, the automatic mechanism is controlled by the keyboard so as to be ineffective to modify the control over the printing and feeding until the last one of the three items is entered, during which operation the feed controls are set so that the audit strip is line-spaced during the next operation. When the items illustrated on the second line are entered, which items represent deducts, the automatic mechanism is set in motion, so that the selection of a hammer and the operation of the audit strip feed mechanism are modified in accordance with the number of deducts entered. For example, when the first deduct is entered on line two, the hammer for the second column is selected and the feed mechanism is ineffective; when the second deduct is entered, the hammer for the third column is selected and the feed mechanism is still ineffective; and when the third deduct is entered, the hammer for the fourth column is selected and the feed mechanism is still ineffective.

When each of these three deducts is entered, the automatic mechanism is advanced one step, so that, at the end of the operation in which the third deduct is entered, the automatic means will have set controls to cause the audit strip to feed during the next machine operation. In this manner, when the maximum number of columns have items entered therein, the audit strip will feed during the next succeeding operation, regardless of which deduct key on the keyboard is depressed. If, on the other hand, less than three deducts are entered, or when deducts in multiples other than three are to be entered, then another automatic means becomes effective to restore the controls set by the first automatic mechanism to their original controlling conditions. Thus, for example, if one, two, four, or five deducts are entered, then, when the next entry other than deduct is made, following the said one, two, four, or five deducts, the first automatic means is actuated to restore the hammer selecting controls and the audit strip feed control to their original controlling conditions, so that a feed of the audit strip will take place under control of the depressed key of the keyboard.

DETAILED DESCRIPTION

*Framework and operating mechanism*

Figure 2:
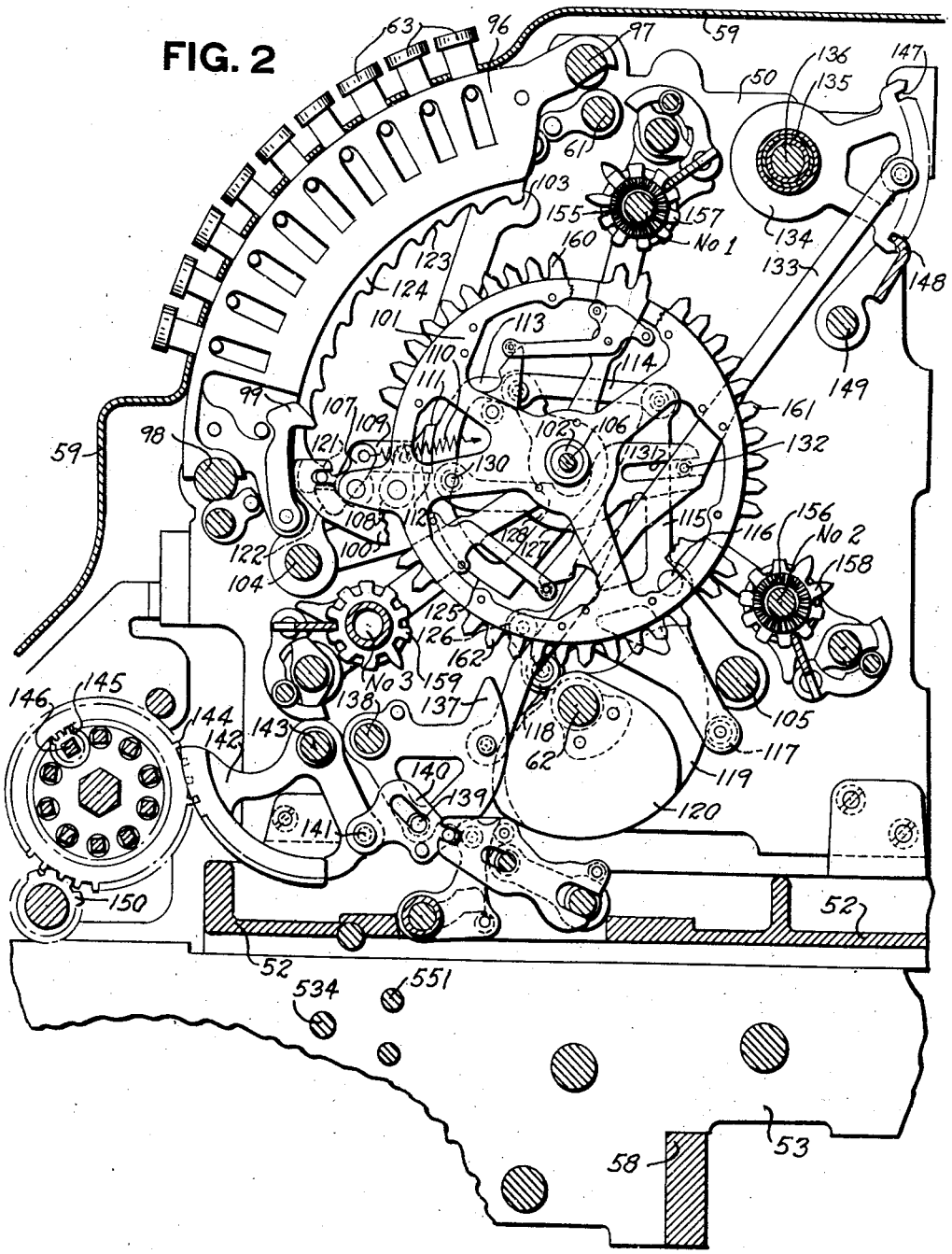
Fig. 2 is a section of the machine taken to the right of one of the amount banks, and shows the differential mechanism associated therewith.

The machine framework for the main part of the machine comprises a left frame 50 (Figs. 2 and 4) and a right frame 51 (shown only partially in Fig. 8) which support most of the machine mechanism and which are in turn secured to a base (Figs. 2 and 4) and are further supported in relation to each other by various cross frames, rods and bars. The base 52 rests on and is secured to four printer frames, only three of which are shown in the present application. The left-hand printer frame is not shown. However, the left one of the two intermediate frames is shown in Figs. 2 and 3, and is numbered 53. The two righthand printer frames 54 and 55 are shown in Figs. 9A, 9B, and 10B. The printer frames 53, 54 and 55 are in turn mounted on a sub-base 56, shown only in Figs. 10A and 18, and are held in proper lateral relation by various rods and tie bars, one of the tie bars 57 being shown in Figs. 10A, 11, 12, and 18, and the other tie bar 58 being shown in Fig. 2.

The machine proper, and also the printing mechanism thereof, are enclosed in a suitable cabinet 59 (Figs. 2, 4 and 36), having the necessary hinged sections for access to certain parts of the machine by the operator whenever necessary. Certain of these sections will be later described in connection with the audit strip mechanism. All of the hinged sections, wherever necessary, are provided with suitable locks to prevent unauthorized persons from having access to the inner parts of the machine.

Normally the machine is electrically operated by a conventional type of motor such as that disclosed in the Shipley patents referred to hereinbefore, and in addition a hand crank is provided for operating the machine manually when necessary. The well known electric starting bar used on previous machines has been omitted from this machine and instead the machine is released for operation by depression of any one of a plurality of so-called "motorized" or "operating" keys located in the transaction control rows 1, 2 and 3, and also located in the lower half of the total row. These keys will be explained more in detail later in the specification.

Depression of any of the operating keys releases a key lock shaft 61 (Figs. 2, 4 and 5) to the action of a spring (not shown), which rocks said shaft a slight distance clockwise to operate the clutch mechanism which connects the driving motor to a main shaft 62 journaled in the machine side frames 50 and 51. The movement of this shaft 61 simultaneously operates the switch mechanism which closes the circuit to the motor, thus causing the motor to operate and drive the main drive shaft 62.

As above stated, the machine herein is adapted to make two types of operations, one of which is an adding operation consisting of one cycle, and the other of which is a total taking operation consisting of two cycles. In this application, one complete rotation of shaft 62 is considered "one cycle" of operation.

After the machine has performed the proper number of cycles of operation to complete the type of operation being executed, the key lock shaft 61 is returned counter clockwise (Figs. 2, 4 and 5) to disengage the clutch mechanism and simultaneously to open the switch to the electric motor. When the machine is manually operated by the use of a hand crank, the operating keys are used for releasing the machine in exactly the same manner as when the machine is electrically operated.

*Keyboard*

Figure 1:
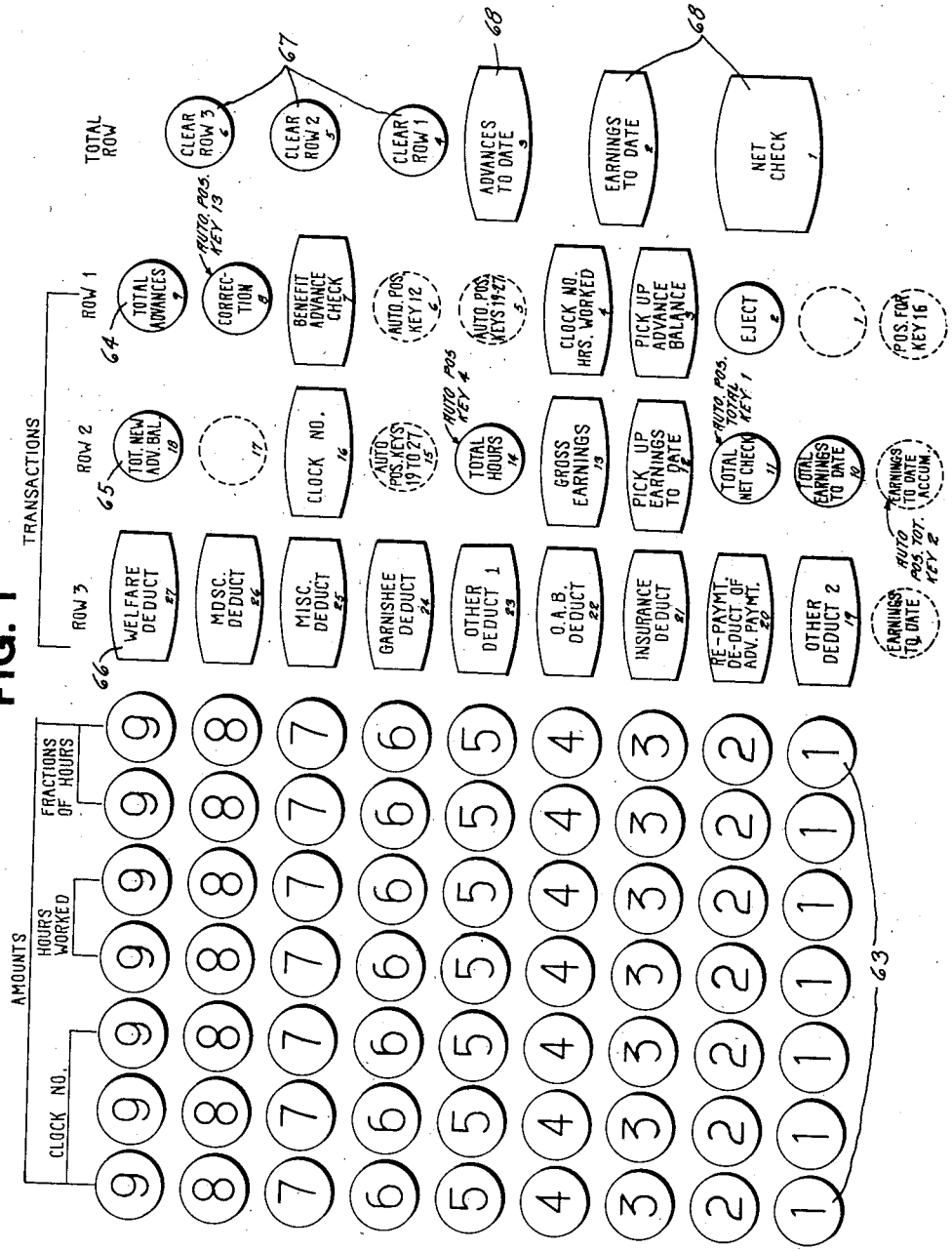
Fig. 1 is a diagrammatic view of the keyboard of the machine.

The keyboard of the machine is shown in diagrammatic form in Fig. 1, and is also indicated in the perspective view of Fig. 39. Referring now particularly to Fig. 1, there are seven rows of amount bank keys 63. The first three left-hand rows under the heading "Clock number" are used for setting up the employee's clock number. The next two rows under the "Hours worked" heading are used for setting up the number of hours the employee has worked and the two right rows of keys 63 set up fractions of hours. However, all of the keys 63 may be used for setting up amounts of various kinds for the various types of entries necessary in connection with the system described herein. There are three rows of transaction keys, the keys of row 1 being numbered 64, the keys of row 2 being numbered 65, and the keys of row 3 being numbered 66. There is also a total row of keys consisting of three total keys 67, used for selecting the totalizers of the various groups of totalizers corresponding to rows 1, 2 and 3 of the transaction keys, when taking the totals of the individual totalizers associated with these three rows. There are also three keys 68 in the "total row," used for selecting totalizers to print the various totals necessary to complete the transaction associated with any one employee, when his pay-roll check is printed on the machine.

The totalizers and their various arrangements, including the crossfooters, will be later discussed under heading of the totalizers. However, it might be well to state here that the manner in which the transaction keys 64, 65 and 66 and total keys 67 and 68 control the selection of the different totalizers, and the manner in which the keys 67 and 68 control the engaging and disengaging movement of the different totalizer lines are fully explained in the Shipley patents previously referred to and also in the co-pending application of Bernis M. Shipley, Pascal Spurlino and Everett H. Placke, Serial Number 677,980 filed June 28, 1933 which issued into Patent No. 2,262,258 on November 11, 1941. Therefore, in view of the above patents, only a general description will be given of the totalizers under that heading, as it is believed that the complete illustrations and detailed descriptions of the totalizers in the above mentioned patents will be sufficient for all purposes herein.

A description of the transaction keys 64, 65, and 66 and the total keys 67 and 68 in connection with their general functions will now be furnished, and it is thought best to refer particularly to Figs. 36, 37, and 38 and illustrate one specific example of the various transactions entering into the printing of a single payroll check on the machine disclosed in this application.

For the example, let us consider the first three lines of printing on the detail strip in Fig. 36, the first line of printing on the ledger card (Fig. 38) and all of the printing on the payroll check in Fig. 37.

The first operation necessary is for the operator to pick up the earnings to date, and this is done by setting up the amount on the amount keys 63. Let us assume that the previous earnings to date were $40.00. The operator sets up $40.00 on the first four righthand banks of amount keys 63 and then depresses the "Pick up earnings to date" key 65 in row 2. This entry requires a single cycle operation and $40.00 is printed in the second column on the audit strip along with the designation PU, which indicates pick-up. The next entry to be made is the pick up of the advance balance which entry requires a single-cycle operation. Let us assume that the employee owed the company $20.00. Therefore, this amount, $20.00, is set up on the amount keys 63 and the "Pick up advance balance" key 64 in row 1 is depressed, whereupon during the ensuing operation of the machine, $20.00 is printed in the third column on the audit sheet, along with the pick up symbol "PU." The next item entered into the machine is the employee's clock number and the number of hours worked. This entry also requires only a single cycle operation. The clock number, 123, is set up on the three lefthand rows of keys 63 under the heading "Clock number" and the number of hours worked, say 45, is set up on the two rows of keys under the heading "Hours worked," after which the "Clock number hours worked" key 64 of row 1 is depressed and the machine is operated.

Before the clock number and the hours worked are entered, the ledger card and a payroll check are placed in the machine, and during the machine operation the clock number and the hours worked are entered on these two records. The operator is thereafter ready to enter the gross earnings of the employee. Assume that these gross earnings are $55.00, which amount is set up on the amount keys 63, after which the "Gross earnings" key 65 of row 2 is depressed which releases the machine for a single cycle operation, during which this item is entered into the machine. This gross amount of $55.00 is printed in the fourth column of the audit sheet and is accompanied by symbols "GR," representing Gross Earnings. This same amount is printed in the column, "Earnings today" on the ledger card and is printed under "Gross and balances" on the stub portion of the payroll check.

It will be noticed that the items thus far entered have all been printed on one line on the audit strip, which means, of course, that there has been no feeding of the audit strip up to this time. The feeding of the audit strip is controlled by the control keys, and the control keys used in entering the above-described items control the audit strip mechanism to prevent a feed of the audit strip.

The next step in the transaction is the entering of various deductions necessary to be taken from the gross earnings. The first deduction is the Old Age Benefits or Social Security, which according to the gross earnings of $55.00, at the present rate would be 55 cents, which amount is set up on the amount keys 63, after which the "OAB deduct" key 66 of row 3 is depressed, whereupon this amount is printed on the second line of the second column of the audit strip, accompanied by the symbol "SS" designating Social Security. This amount is also printed in the OAB column of the ledger card and is printed in the column headed "Deductions" on the stub portion of the payroll check. Another deduction for insurance is to be made for this same employee, and this amount, $2.00, is set up on the amount keyboard, after which the "Insurance deduct" key 66 of row 3 is depressed, and this amount is printed in the third column of the audit sheet, accompanied by the symbol "IN," designating insurance. It will be noted that this amount is printed in the same line of the audit strip in which the social security amount of 55 cents is printed. This same amount of $2.00 is also printed in the "Deductions" column on the stub portion of the employee's check but not on the ledger card.

The next deduction is $5.00, which the employee is paying toward the $20.00 which he owes the Company. This amount of $5.00 is set up on the amount keyboard, after which the "Repayment deduct of advance payment" key 66 of row 3 is depressed, whereupon this amount is printed in the fourth column on the audit sheet and is accompanied by the symbol "AD" representing advance payment deduction. This amount of $5.00 is likewise printed in the same line in which are printed the Social Security and the insurance. This amount of $5.00 is also printed in the "Repaid" column of the ledger card and in the "Deductions" column on the stub portion of the employee's check.

After this last deduction was entered, the audit strip was advanced one step so that the next entry of the transaction is printed upon a new line.

This next entry of the transaction is a two-cycle operation and it is not necessary to depress any amount keys because the data printed during this entry is all entered automatically. To enter this next item, the operator depresses the "Advances to date" key 68 of the total row, whereupon the machine makes two complete cycles of operation, and during this operation the total of the employee's advances, which in this instance is $15.00 (which is the $5.00 deducted from the previous advance of $20.00), and is printed in the third column on the audit strip, accompanied by the symbol "A," designating advances. This amount is also printed in the "Balance on advances" column on the ledger card and also in the "Gross and balances" column on the stub portion of the employee's check.

The next item of the transaction is also a two-cycle operation and the operator depresses the "Earnings to date" key 68 in the total row, whereupon the amount of $95.00 and the symbol E are printed in the second column of the audit sheet, which $95.00 is the sum of the previous earnings to date plus the gross earnings of the employee for the current period. This same amount is printed in the "Earnings to date" column of the ledger card and in the "Gross and balances" column on the stub portion of the payroll check.

The last and final item of the present complete transaction for the printing of an employee's check, and for the recording of all of the various items pertaining to this check, is accomplished by the depression of a "Net check" key 68 of the total row, whereupon the amount of $47.45 is printed in the fourth column on the record strip accompanied by an asterisk, which designates the net total. This total of $47.45 is the difference between the gross earnings of $55.00 and the total of the three deductions of $5.00, $2.00, and 55 cents, which this employee had during the past pay period.

During the printing of this net check there is printed a check serial number, which in this instance is shown as 2085. This is printed on the audit sheet in the fifth column and is also printed on the main portion of the payroll check under the heading "Check number."

This net amount of $47.45 is printed in three places on the employee's payroll check, once under the column headed "Net" on the stub portion of the check and twice on the main body of the check, as is shown in Fig. 37.

On certain checks where there have been no advances, there are two operations which are to be omitted from the complete transaction entry. The first operation, of course, is the pick-up advance balance, of which there is none, and therefore no necessity for this operation, and since there are no advances it is not necessary to operate the "Advances to date" key 68 in the total row.

The means for controlling the feeding of the audit strip so that the printing will be accomplished in the proper places, and so there can positively be no overprinting at any time, under the control of the transaction keys in rows 1, 2 and 3, and also under the control of the keys 68 in the total row, will be later described. Moreover there is also a definite specific control of the hammers for printing in all columns of the audit strip in connection with the entry of the complete transaction just described. The control of the hammers during these transactions is also definitely determined by the transaction keys in rows 1, 2 and 3, and also by the total keys 68.

The check and the ledger card are dated by appropriate mechanism not shown nor described herein.

*Amount banks and their associated differential mechanisms*

As previously stated, the machine of this invention has seven rows of amount keys, which may be used in some instances to set up amounts and in other instances to set up clock members and hours worked. However, as all of the rows or banks of keys 63 and their associated differential mechanisms are similar in every respect, it is believed that a description of one of these rows of keys and its differential mechanism will be sufficient.

Fig. 2 is a transverse sectional view of the machine taken just to the right of one of the amount banks, showing said bank and its associated differential mechanism, which will be considered as representative of all of the amount banks.

The amount keys 63 are mounted in a key bank framework 96, supported by rods 97 and 98, and extending between the main frames 50 and 51 of the machine. Depression of one of the keys 63 rocks a zero stop pawl 99 for this particular denomination counterclockwise out of the path of a reset spider 100, free on a hub of an amount differential actuator 101 rotatably supported by a hub 102 extending between two similar amount differential support plates 103 (only one here shown) in turn supported by rods 104 and 105, extending between the side frames 50 and 51. There is a pair of support plates 103 for each amount differential and a tie rod 106 extends through the holes in the center of the hubs 102 to secure all of the amount differentials in a compact unit.

A slot in the forward end of the spider 100 (Fig. 2) engages a stud in a latch disengaging arm 107 pivoted on an extension of the actuator 101. The arm 107 and a companion arm 108 together support a differential latch 109 for horizontal shifting movement. A spring 110 urges the arms 107 and 108 and the latch 109 rearwardly to normally hold a foot-shaped projection 111 of said latch in engagement with a shoulder 112 on a differential driving segment 113 rotatably supported on the hub of the actuator 101. A link 114 pivotally connects the driving segment 113 to a cam lever 115 pivoted on a stud 116 in the lefthand one of the plates 103, and said lever 115 carries rollers 117 and 118 which cooperate, respectively, with the peripheries of companion plate cams 119 and 120 secured on the main drive shaft 62. Depression of one of the amount keys 76 likewise moves the lower end thereof into the path of a rounded surface 121 on an extension of the arm 107.

In adding operations the main shaft 62 and the cams 119 and 120 make one clockwise revolution, causing the lever 115 to rock the driving segment 113 first clockwise and then counterclockwise back to its normal position. During this clockwise movement the segment 113 by means of the shoulder 112, in cooperation with the projection 111 of the latch 109, carries said latch and the amount actuator 101 clockwise in unison therewith until the rounded surface 121 contacts the stem of the depressed amount key 76. This rocks the latch arm 107 and its companion arm 108 counterclockwise to disengage the projection 111 from the shoulder 112 to interrupt the clockwise movement of the actuator 101 and to arrest said actuator after having moved an extent commensurate with the value of the depressed amount key 63. Disengaging movement of the latch 109 moves a rounded extension 122 thereof into engagement with the corresponding one of a series of locating notches 123 on a plate 124, secured between the rod 104 and an upward extension of the lefthand support plate 103.

After the latch 109 is disengaged from the shoulder 112 of the segment 113, said segment continues its clockwise movement without interruption, causing an arcuate surface 125 thereof, in cooperation with the sole of the foot-shaped projection 111 to lock the extension 122 of the latch 109 in the notch 123 corresponding to the value of the depressed amount keys 63. When the lever 115 and the segment 113 reach the termini of their initial movements clockwise, a roller 126 carried by said lever 115 engages an arcuate surface 127 on the underside of an amount beam 128 pivoted at 130 to the actuator 101 and forces an arcuate surface on the upper edge of said beam to contact the hub of said actuator 101 to position the beam 128 in proportion to the depressed amount key 63. The beam 128 has a slot 131 which engages a stud 132 in a link 133, the upper end of which is pivotally connected to an indicator positioning and totalizer selecting segment 134 mounted on one of a series of nested tubes 135 supported by a shaft 136 journaled in the side frames 50 and 51. The lower end of the link 133 is pivotally connected to a segment 137 free on a shaft 138 journaled in the frames 50 and 51. The segment 137 carries a stud 139 which engages a camming slot in a zero elimination cam plate 140 pivotally mounted on a stud 141 in a segmental gear 142 free on a shaft 143, also journaled in the frames 50 and 51. The teeth of the segmental gear 142 mesh with the external teeth of an external-internal ring gear 144, the internal teeth of which mesh with a pinion 145 which drives a square shaft 146. The square shaft in turn drives similar pinions meshing with the internal teeth of the gears similar to the gear 144, the external teeth of which gears are adapted to mesh with and drive corresponding denominational type wheels 150 in each row of the column printing mechanism, which column printing mechanism in the present case is for the purpose of printing on a ledger card at the extreme left of the machine, on the employee's payroll check near the center of the machine, and also on an audit strip located at the right side of the machine.

This method of driving the type wheels of the column printing accounting machine is fully explained in the previously mentioned Arnold Patent No. 2,141,332 an embodies an application of the well known Kreider principle of driving mechanism disclosed in the above mentioned Kreider Patent No. 1,693,279.

For the purpose of properly alining the differential mechanism and the type wheels set thereby there is provided on each of the segments 134 a series of notches 147 engaged by an aliner 148 secured to a shaft 149.

The aliner is disengaged from the notches 147 during the differential setting of the type wheels, and after they have been set under the control of the keys through the differential mechanism the aliner 148 is again moved into engagement with the notches 147 thus positively alining the type wheels during printing.

The zero elimination mechanism above mentioned, which is for the purpose of controlling the printing of zeros, and which is controlled by the above mentioned zero elimination cam plate 140 is not directly involved in the invention in the present application and therefore no further reference to the zero elimination mechanism will be given herein. Such type of zero elimination mechanism is illustrated and described in the above mentioned Arnold Patent No. 2,141,332.

Totalizers

The machine shown in this application has the usual three lines of totalizers, numbered 1, 2 and 3, in Fig. 2. The No. 1 line has a balance totalizer or crossfooter and also one straight adding totalizer on it. The No. 2 or near line has one crossfooter and five regular adding interspersed totalizers of the type shown in the previously mentioned Shipley and Goldberg patents. The No. 3 or front line of totalizers has 10 of the well known interspersed adding totalizers thereon.

The No. 1 and No. 2, or upper and rear, totalizer lines, as above mentioned, have the crossfooters and also the regular adding totalizers thereon. Such construction is illustrated in the co-pending application of Pascal Spurlino, William M. Carroll, Arthur R. Colley, and Alfred G. Kibler, Serial Number 376,670 filed January 30, 1941, for Accounting machines. If any further information is needed with reference to such totalizer lines having crossfooters and straight adding totalizers thereon, reference may be had to this application.

The crossfooter on No. 1 line is indicated by the reference number 155, and the straight adding totalizer on this line is 157. On the back, or No. 2, line the crossfooter is 156, and the other five adding totalizers on this line are indicated by the reference numeral 158. On the No. 3 or front line of totalizers, all of these totalizers are indicated by the general reference number 159.

Totalizers of these types are old and well known in the art and are fully illustrated and described in the previously mentioned Shipley patents, and therefore no further description of the construction of these totalizers is felt necessary herein.

As is usual in machines of this type the actuators 101 are divided into three tooth sections Nos. 160, 161, and 162. The sections 160 actuate the crossfooter and also the regulator totalizer on the No. 1 line, the sections 161 actuate the crossfooter and the other totalizers on the No. 2 line, and the tooth sections 162 actuate the totalizers 159 on the front or No. 3 line.

In adding operations, the wheels of the selected totalizer or totalizers, as the case may be, are engaged with their respective sets of actuating tooth sections 160, 161 and 162 of the actuators 101 after said actuators have completed their setting movement in a clockwise direction under control of the keys 63.

Return movement counterclockwise of the actuators 101, as explained above, rotates the corresponding wheels of the selected and engaged totalizer or totalizers in proportion to the value of the depressed amount keys 63 to enter into said totalizers the amount corresponding to the keys depressed.

In subtract operations the corresponding subtract wheels of the crossfooters 155 and 156 are engaged with the teeth 160 and 161 of the actuator 101 exactly the same as in adding operations, and the return movement of the actuator reversely rotates the adding wheels 155 and 156 of the crossfooters through the reverse gearing shown in Figure 2, which is well known in the art and shown in several of the above mentioned Shipley patents and also in the last mentioned co-pending application of Spurlino, Carroll, Colley and Kibler.

If no amount key 63 (Fig. 2) is depressed, the zero stop pawl 99 remains in the path of the spider 100 upon initial movement of the actuator 101 and engages said spider and breaks the latch 109 to arrest said actuator in zero position. After the actuator 101 is positioned at zero, the roller 126 positions the beam 128, the link 133 and the segments 134 and 137 in proportion thereto, as shown in Figure 2.

At the end of any type of operation the actuator 101 is always returned to home position as shown in Figure 2. However, the links 133 and the printing mechanisms controlled thereby remain in set positions at the end of machine operations and are moved directly from these positions to their new positions in the succeeding operations of the machine through the beam mechanism, which is old and well known in the art and is often referred to as the "minimum movement device." The usual transfer mechanism is provided for entering one unit in the next higher order when the lower order wheel passes through zero, in either positive or negative direction.

*Transaction keys and differential mechanisms associated therewith*

As hereinbefore mentioned the present machine is provided with three banks or rows of transaction keys 64, 65 and 66. All of the transaction keys have small numerals near the bottom thereof from 1 to 9 in row 1, 10 to 18 in row 2, and 19 to 27 in row 3, which indicate the various positions of these keys and the totals in the machine.

Considering the keys of row 1, the "Eject" key is used to control the ejection of a check from the machine when one has been placed in there before it should have been. The "Pick-up advance balance" key is used when picking up the advance balance of any employee's account when writing his payroll check. Associated with this key is an individual totalizer and the amount picked up will be added into said totalizer and also into the plus side of the No. 2 crossfooter, which is located on the back totalizer line No. 2. The "Clock number hours worked" key of row 1 is used when setting up the employee's clock number and the number of hours which he worked, and prints the clock number and the numbers of hours, and controls the latch or differential of the second bank to break in the fifth position so that the number of hours worked will be added into the totalizer associated with the "Total hours" key 65. The "Benefit advance check" key 64, in the 7th position of row 1, is used when issuing a check to pay an employee an advance amount and causes the amount of this advance check to be added into the plus side of the No. 1 crossfooter and also the plus side of the No. 2 crossfooter to be used for further purposes in obtaining the net check at the regular payroll period time. The "Correction" key 64 in the 8th position of row 1 is used only in connection with the "Net check" total key 68 in the total row to control certain elements of the machine to correct an erroneous set-up and to add in the plus side of the No. 1 crossfooter. The "Total advances" key 64 in the 9th position of row 1 is used only with the total key 67 in the 6th position of the total row to control the machine whereby it transfers totals to the totalizer corresponding to the key position 18 of the second transaction row.

The "Total earnings to date" key 65 in the first position of row 2 is used only with the total key 67 in position 5 to control the machine to clear the group total for the purpose of obtaining the total earnings to date. The "Total net checks" key 65 has an individual totalizer associated therewith and is used for controlling the machine for taking the totals of the net checks. The "Pick up earnings to date" key 65 in the third position of row 2 is used in connection with the picking up of the earnings prior to the issuing of a payroll check, so that to this earnings to date may be added the amount of the gross check which is entered in the proper totalizer. The "Gross earnings" key 65 of row 2 is used in connection with the issuance of a payroll check and is used when setting up the employee's gross check. The "Gross earnings" key has an individual totalizer associated therewith to receive the data entered under control thereof, and it also controls the selection of the plus side of the No. 1 crossfooter. The "Total hours" key 65 of row 2 is used to control the taking of a total of the number of hours worked from the totalizer associated therewith. The "Clock number" key 65 of row 2 is used to control the machine to print the clock number when issuing an advance check to an employee. The "Total new advance balance" key 65 of row 2 controls the machine to add in the plus side of the No. 2 crossfooter and is also used for controlling the machine for taking the totals of the advance balance.

All of the keys of the transaction row 3 have associated therewith individual totalizers into which are added the amounts set up in connection with the deductions indicated on the keys of this row. Also, all of said deductions are entered into the minus side of the No. 1 crossfooter, and the "Repayment deduction of advance payment" key of row 3 also controls the machine to enter amounts into the minus side of the No. 3 crossfooter.

It is to be understood that the captions on these transaction keys Nos. 64, 65 and 66 are used for illustrative purposes, and may be varied to suit the particular demands of any organization using the machine.

The differential mechanisms associated with these three rows of transaction keys 64, 65 and 66 are substantially the same, and therefore a description of the row of keys 64 (row 1) and the differential mechanism associated therewith will suffice for all. As this differential mechanism is similar to the amount differential mechanism described above, and is fully illustrated and described in the patents referred to herein before, only a brief description thereof will be necessary herein. As above stated, the keys 64 control transaction differential mechanism which selects certain totalizers corresponding to the keys and which positions the printing wheels for printing symbols corresponding to the keys. This bank of keys also controls, to a certain extent, the feeding of the audit strip and also the operation of the hammers in connection with the printing on said strip. The feeding mechanism is also controlled by the total row of keys later to be described, and also by certain of the transaction keys of rows 2 and 3.

The differential mechanism associated with the first control bank or row 1, which is controlled by keys 64 and certain of the keys 65 and 66 in rows 2 and 3, is illustrated in Figs. 3 and 4, and it will be briefly described, as it is similar to the control differentials illustrated and described in the previously mentioned Shipley Patent No. 1,916,535.

The drive shaft 62 carries a pair of cams 170 for operating a lever 171 conected by a link 172 to the usual driving segment 173. The driving segment 173 and other parts of the differential mechanism are supported by a rod 174.

The segment 173, through the usual latch 175 carried by a differentially adjustable arm 176 supported by the rod 174, rocks the arm 176 clockwise until the forward end of the latch 175 contacts whichever one of the keys 64 is depressed, at which time the latch is separated from the driving segment, permitting the arm 176 to remain in the position to which it has been driven under control of the depressed key 64.

The differential arm 176 carries the usual minimum movement beam 177 connected to a link 178 fast to an arm 179 loose on the shaft 138 supported by the side frames 50 and 51. A link 181 connects the arm 179 with a segment 182 secured to the shaft 143 carried by the frames 50 and 51. The upper end of the link 179 is pivoted to an aligner segment 183 with which cooperates the previously mentioned aliner 148 which extends across all differentials. The segment 182, by means not shown, sets a symbol type wheel to print on a ledger sheet in the manner disclosed in the above mentioned Arnold patent.

The shaft 143, through means to be later considered in detail, operates certain control means in the printer, depending upon the type of entry being made in the machine.

The usual zero stop pawl 184, carried by a frame 185, in which the transaction keys 64 are slidably mounted, is adapted to cooperate with an arm 186 supported by the rod 174, and the arm 186 is provided with a slot to cooperate with a pin 187 of the latch 175 for this bank of keys 64. The zero stop pawl 184 is normally in an ineffective position, for a purpose to be later described.

Under certain conditions it is necessary to control this differential mechanism (Fig. 4) associated with the first transaction row of keys 64 by certain of the keys 65 and 66 in rows 2 and 3.

In other words, all of the keys 66 of row 3 will cause the differential mechanism of row 1 to be stopped in the fifth position. Likewise all of these keys 66 of row 3 will cause the differential mechanism associated with row 2 to be stopped in the sixth position. The "Pick-up earnings to date" key in the third position of row 2 controls the differential mechanism of row 1 to be stopped in the 6th position. The "Gross earnings" key in the fourth position of row 2 causes the differential mechanism of row 1 to be stopped in the 8th position.

Total row of keys

As viewed in Fig. 1 there are six keys in the total row. Three numbered 67 are for selecting the rows of totalizers when clearing the machine of the totals on the various lines. This control from these keys is of the usual well known type shown and described in the previously mentioned Shipley Patent 1,619,796.

The three keys 68 are used at the end of each of the payroll check issuing transactions in the following order: First, the "Advance to date" key is used to print the total of the advances to date, the "Earnings to date" key is used to print the total of the earnings to date, and the "Net check" key is used to print the amount of the net check. The "Net check" key 68 and the "Earnings to date" key 68 both control the stopping of the differential mechanism in the second transaction bank, the "Net check" key causing the second bank differential mechanism to stop in the first position to accumulate in the totalizer associated with this position all of the net checks that are issued. The "Earnings to date" key 68 controls the row 2 differential to stop in the zero position so that when finally clearing the machine all of the totals of the earnings to date will be found in the totalizer located in the zero position of row 2; that is, the zero position of the back totalizer line.

Automatic differential control from the transaction banks of keys in row 1, 2 and 3, and from the total row of keys Associated with the total rows of keys 67 and 68 is a detent 200 (Fig. 6) mounted on the rod 174 and having lugs 201 and 202 adapted to cooperate with pins 203 and 204 in the "Earnings to date" key 68 and "Net check" key 68, respectively. Also mounted on the rod 174 and associated with the row 1 bank of transaction keys 64 is a detent 205 (Figs. 3 and 4) having a lug 206 cooperating with a pin 199 in the "Clock number hours worked" key 64. Adjacent the detent 205 and pivoted on the rod 174 is another detent 207 (Figs. 3 and 6) like the detent 200, which is for a purpose to be later described. Also pivoted on the rod 174 is a detent 208 associated with the keys 66 of row 3. This detent 208 has 8 lugs 209 (Fig. 3) like the previously described lugs, 201, 202 and 206 of the detents 200 and 205 for cooperating with the pins 210 in all of the keys 66 of row 3 except the "Insurance deduct" key. However, in connection with this key the detent 208 carries a block 211 secured to the side thereof, having a lug 212, which cooperates with the pin 210 of the "Insurance deduct" key 66 of the third row. The detent 208 also has a lug 213 like the lugs 209, which lug is in alinement with the lugs 209 and in position to be acted upon by a key pin 214 on the "Pick up earnings to date" key 65 of the second row of transaction keys. The purposes of these lugs will be hereinafter explained.

As previously stated, the latch 175 of the first transaction bank of keys 64 carries a pin 187 extending into the slot of an arm 186, so that the latch can be disconnected from the driver 173 by arresting the arm 186. The arm 186 is integral with a plate 220 (Figs. 4 and 5) having segmental sections 221 and 222. The segmental section 221 has two stopping blocks 223 and 224, which coact with the end of an arm 241 when the latter is rocked into the path thereof in a manner later described. When the arm 241 is rocked into position to be engaged by block 223, the latch 175 is disengaged from the driver 173 when the differential member 176 reaches its sixth position, and, when the arm 241 is in position to be engaged by block 224, the differential arm 176 is arrested in its fifth position.

Associated with the row 2 bank of transaction keys 65 is an arm 226 (Figs. 3 and 6) cooperating with a pin 225 carried by a latch mechanism 227 supported by a differentially adjustable arm 228 and driven by a driving segment 229 for the second bank of keys. The latch mechanism 227, differential arm 228 and driver 229 are substantially the same as the latch 175, arm 176 and drive 173 of Fig. 4, of the first transaction bank. The arm 226 is integral with a plate 230 (Fig. 6), pivoted on the rod 174, and has an upper segmental section 231 and a lower segmental section 232. Secured to the section 231 are two differential stopping blocks 233 and 234 located in the fifth and sixth differential positions, respectively. The fifth position corresponds to the "Total hours" key 64. The lower section 232 has two stopping blocks 235 and 236 located respectively in the zero and in the No. 2 differential positions of the second transaction bank.

Cooperating with the two stop lugs 223 and 224 of the first transaction bank is the stop arm 241 (Figs. 3 and 4) integral with a yoke 245 pivoted on a rod 246 supported by the side frames 50 and 51. The other end of the yoke 245 has pivoted thereto a link 240 connected to an upstanding arm 247 integral with the detent 208, associated with the third transaction bank of keys 66.

Cooperating with the stop lugs 233 and 234 on the section 231 cooperating with the second transaction bank of keys 65 is a stop arm 248, which is like the stop arm 241 and which is secured to the yoke 245, so as to operate in synchronism therewith.

Also integral with the yoke 245 is an arm 249 (Figs. 3 and 4) connected by a link 250 to an upstanding arm 251 integral with the detent 205 of the first transaction bank. A spring 252, connected between the link 250 and a stud 253 mounted on a stationary plate, tends at all times to rock the detent 205 in a clockwise direction and therefore tends to rock the yoke 245, the arm 241, and the arm 248 in a clockwise direction, to move the stop arm 241 into the path of either the lug 224, when any of the keys 66 of the third transaction bank are depressed, or into the path of the lug 223 when the "Pick up earnings to date" key 65 of the second transaction bank is depressed. At the same time it moves the stop arm 248 into the path of the lug 233 of the second transaction bank when the "Clock number hours worked" key 64 of the first transaction bank is depressed, and into the path of the lug 234 of the second transaction bank when any one of the keys 66 of the third transaction bank is depressed.

The detent 205 (Fig. 4) is normally restrained from clockwise movement under the action of the spring 252 by means of a stud 255 carried by one arm of a yoke 256 suitably pivoted on a rod 257 supported by the usual hangers in the transaction banks of keys. Connecting another arm of the yoke 256 to an arm 258 is a link 259. The arm 258 is fastened to the key lock shaft 61, which, it will be recalled, when the machine is released, receives a slight movement in a clockwise direction. When this occurs, the yoke 256 is rocked counterclockwise and the stud 255 is moved below a shouldered surface 260 on the arm 251, and therefore the arm 251 may be moved in a clockwise direction under the influence of the spring 252 until the lug 206 contacts the pin 199 of the "Clock number hours worked" key 64 of the first transaction bank, when the key 64 is in its depressed position, and when this occurs, the stop arm 248 is moved a half step into the path of the lug 233 (Fig. 6) on the section 231 of the second transaction bank in order to stop the second transaction differential in the fifth position under control of the "Clock number hours worked" key in the fourth position of the first transaction bank.

The detent 208 associated with the keys of row 3 is released in a like manner and consequently, when a key 66 of the third transaction bank is depressed, the arm 248 is moved into the path of the lug 234, thus stopping the differential mechanism of the second bank in the sixth position, under control of any of the keys of the third transaction bank.

Connected to an upstanding arm 264 of the detent 200, associated with the total row of keys, is a link 265 (Figs. 3 and 6), which is also connected to an arm 266 of a yoke 267 pivoted on the rod 246. Also integral with the yoke 267 is an arm 268 carrying a stop lug 269 adapted to cooperate with the previously mentioned stop blocks 235 and 236 on the section 232 associated with the second transaction bank of keys. When the detent 200 is released to clockwise movement by means to be hereinafter described, a spring 270 connected to the link 265 and to a stationary stud (not shown) rocks the arm 200 clockwise until either the lug 201 strikes the pin 203, if the "Earnings to date" key 68 is depressed, or until the lug 202 strikes the pin 204 of the "Net check" key if that key is depressed. When the latter key is depressed, the detent 200 receives one specific step of movement, which is sufficient to position the stop block 269 in the path of the lug 236 so as to stop the differential mechanism of the second transaction bank in the second position, which corresponds to the position of the "Total net checks" key of the second transaction bank. This is to select the "Total net checks" totalizer, which is in the second position on the totalizer line No. 2.

When the "Earnings to date" key 68 is depressed, the detent 200 receives a full step of movement, which is sufficient to position the block 269 into the path of the lug 235 of the second transaction bank, whereupon the second transaction differential will be stopped in its zero position, in which position the lug 235 is located, so that the Earnings-to-Date will be accumulated in the totalizer in the zero position associated with the transaction bank of keys, which is in the zero position on the No. 2 totalizer line.

In order that the detent 200 may be moved in a clockwise direction when either of the keys 68 entitled "Earnings to date" or "Net checks" is depressed, the previously mentioned detent 207, shown partially in Fig. 6 and in top view in Fig. 3, has an upstanding arm 270, having a shouldered surface 271, which cooperates with the previously mentioned stud 255, which is long enough to stand in the path of the detent 205 and the detent 207. This stud, it will be remembered, is moved downwardly upon clockwise movement of the key lock shaft 71, when the machine is released for operation, and therefore, when the detent 205 is released, the detent 200 for the total bank is also released, because the upstanding arm 270 is connected by a link 272 by a pin to the previously described arm 268, and is actuated by the spring 270.

From the above description it will be clear that whenever any of the keys 66 of the third transaction row are depressed, the differential mechanism of the first transaction bank is automatically stopped in the fifth position, and the differential mechanism of the second transaction bank is automatically stopped in the sixth position. Also, when the key 65 is in the fourth position of the first transaction bank is depressed, the second transaction bank is automatically stopped in the fifth position. Also, when the key in the third position of the second transaction bank is depressed, the differential mechanism of the first transaction bank is automatically stopped in the sixth position. Moreover, when the "Net check" key 68 is depressed, the differential mechanism of the second transaction bank is automatically stopped in the second position and when the "Earnings-to-date" key 68 is depressed, the differential mechanism of the second transaction bank is automatically stopped in zero position.

There is, however, one other automatic position to be considered, and that is whenever the "Gross earnings" key 65 of the second transaction bank is depressed it is necessary to stop the differential mechanism of the first transaction bank in the eighth position. This is accomplished in the following manner:

The Gross Earnings key 65 (Fig. 5) has a stud 276 cooperating with a cam lug 277 on a shiftable bar 278 pivotally carried by arms 279 and 280 pivoted to the second transaction key bank frame 281. A stud 282 on the arm 279 cooperates with a finger 283 of an arm 284 pivoted on a stud 285. The arm 284 has a shoulder 286 held against a stud 287 in a lever 288 by a spring 289. The lever 288 is pivoted on a stud 290 and has a stud 291 adapted to be moved downwardly under the action of a spring 292 into the path of a shoulder 293 on the section 221 associated with the first transaction bank of keys. The arm 280 has a finger 295 cooperating with a stud 296 on a zero stop pawl 297 of the usual type, which is associated with the differential mechanism of the first bank.

When the gross earnings key 65 of the second transaction bank is depressed, the finger 295, by its cooperation with the stud 296, rocks the zero stop pawl 297 out of the path of the arm 186 and consequently the section 221 can be driven by the driving mechanism and the latch 175 of the first transaction bank in the manner previously described. The downward movement of the bar 278 by the pin 276 rocks the arm 284 counterclockwise against the action of the spring 289, whereupon the stud 287 is released from the shoulder 286 and the spring 292 rocks the arm 288 counterclockwise and places the stud 291 in the path of the lug 293 on the section 221. This lug 293 is in the eighth position of the differential mechanism of the first transaction bank and therefore when the "Gross earnings" key 65 of the second transaction bank is depressed, the differential mechanism of the first transaction bank will be automatically stopped in the eighth position.

When there is no key depressed which cooperates with the detents 205 and 208 (Figs. 3 and 4) said detents are rocked clockwise by the spring 252 until they are stopped by a stud 298 on the frame 185 of row 1, in the path of the detent 205, thus causing the stop arms 241 and 248 to be moved above the paths of the blocks 223 and 224 of row 1 and 233 and 234 of row 2 whereby the differentials of row 1 and row 2 can be set under control of the other keys in those rows.

When any key in row 2, except those in the third and fourth positions, is depressed, the detent 205 will move until it strikes the stud 298, and an arm 299 on the detent is removed from contact with the row 1 zero stop pawl 184 to release the pawl to the action of its spring whereupon the pawl 184 moves into position to stop the row 1 differential in the zero position during an ensuing machine operation.

PRINTER

*Printer driving mechanism*

As has been previously stated, certain portions of the printing mechanism are adapted to receive two full cycles of operation on each two-cycle total taking operation, whereas other portions of the printing mechanism are disabled during the first cycle of a two-cycle total taking operation and function only during the second cycle thereof.

The means for so driving the printing mechanism will now be described.

The main drive shaft 62 of the machine is supported by the left side frame 50 and the right side frame 51. The right side frame 51 is shown in Fig. 8 with the machine drive shaft 62 extending therethrough. Secured to this shaft 62 on the outside of the righthand side frame 51 is a gear 301 (Fig. 7) meshing with a gear 302 secured to a shaft 303 supported by the frame 51 and an auxiliary frame 304 which is in substantial vertical alinement with the righthand printer frame 55. Secured to the outer end of the shaft 303 on the outside of the auxiliary frame 304 is a gear 305 meshing with a gear 306 mounted on a stud 307 supported by the frame 304. The gear 306 meshes with a gear 308 secured to a printer drive shaft 309, which is supported by the printer frames 54 and 55 (Figs. 9B and 10B.)

It will be clear from the above described train of gears that, due to the fact that the machine drive shaft 62 receives two complete rotations during every two-cycle total taking operation, the printer drive shaft 309 will likewise receive two complete rotations during every two-cycle total-taking operation.

Rigidly secured to the previously described gear 301, which is fast to the machine drive shaft 62, is a plate 310, which receives two complete rotations during every total-taking operation. This plate 310 has secured thereto between itself and the hub of the gear 301 a collar 311. By referring to Fig. 8 it will be noticed that the end of the shaft 62 extends about midway into the collar 311, and that the end of the shaft 312 extends through the plate 310 and into the collar 311. The shaft 312 has a bearing near its other end in the auxiliary frame 304. Carried by the plate 310 is a driving pawl 313 adapted to cooperate with a shouldered collar 314, securely fastened to the shaft 312. The plate 310 carries another pawl 315, which cooperates with another shoulder on the collar 314 to prevent any backward movement of the collar 314 and consequently of the shaft 312. A spring holds the pawls 313 and 315 normally in contact with the opposite shoulders of the collar 314. As the gear 301 is driven clockwise, as viewed in Fig. 7, the plate 310 is driven likewise, whereupon the pawl 313 drives the collar 314 and consequently the shaft 312 clockwise in the same direction simultaneously with the movement of the shaft 62. Secured near the end of the shaft 312 is a gear 316 meshing with a gear 317 pivoted on a stud 318 supported by the auxiliary frame 304. The gear 317 meshes with the gear 319 secured to a second printer driving shaft 320.

From the above description it will be clear that when the shaft 62 of the machine is driven clockwise one rotation during adding operations, the axially alined shaft 312 will be given a movement of like extent by means of the plate 310, pawl 313 and collar 314, and through the gearing above described the printer shaft 320 will receive one complete clockwise movement during each adding cycle of operation. During the first cycle of a total-taking or sub-total taking operation it is necessary that the shaft 320 be moved a short distance, approximately 40 degrees, but during such operations the shaft 62 receives two rotations in the well known manner. In order to arrest the shaft 320 after said short rotation, during the very first part of the first cycle of such a two-cycle operation an arm 321 is moved into the path of travel of a finger 322 on the pawl 313 and causes said pawl to be disengaged from the collar 314, and therefore the shaft 312 remains idle during the remainder of the first rotation of all sub-total and total operations. The means for moving the arm 321, as above described, is fully illustrated and described in the above mentioned Shipley Patent No. 1,619,796. However, during the second rotation of a total taking operation the pawl 313 is again permitted to contact the shoulder 314 and drive the shaft 312 and consequently the shaft 320 completes one rotation during the second cycle of a total taking operation.

*Supporting frame for audit strip*

As previously stated, the audit strip is located at the extreme righthand end of the machine and at the front part thereof. It has also been stated that the audit strip is mounted in a frame which is slidable into and out of active, or printing, position. It is slidable out of active position for the purpose of easy reloading when necessary. After the frame has been slid outwardly from the machine, it may also be tilted at right angles to make it easier to thread the leading end of a new strip roll.

Referring to Figs. 9A, 10A and 18, the audit strip frame comprises a left side plate 331 and a right side plate 332 tied together near the lower front corner by a rod 333 and near their top edges by a plate 334 having flanges secured to the frames 331 and 332. Pivoted to the frame 332 at 335 is an arm 336, the right-hand end (Fig. 10A) of which extends through a slotted plate 337 mounted on the sub-base 56. The arm 336 has two studs 338 resting on top of the plate 337 and two studs 339 just below the plate 337 to keep the arm 336 from tipping up when in its normal or printing position in the machine. The bottom of the frame 332 rests and slides on the plate 337. Pivoted at 340 on the plate 331 is an arm 341, the right-hand end (Fig. 18) of which projects through a slotted plate 342 secured to the base 56. This arm 341 carries two studs 343, resting on top of the plate 342, and two studs 344 resting against the bottom side of the plate 342. The bottom of the frame 331 rests and slides upon the plate 342.

The sides of the audit strip frame are covered by the regular cabinet parts of the machine, and the front and top portions are covered by a hinged cover 345 pivoted on the rod 333. The top portion of this cover 345 has an opening 346 for the purpose of making autographic notations on the audit strip, if desirable. An arm 347 (Fig. 17) on the top part of the cover 345 has a stud 348 normally engaged by a latch 349 to hold the cover in its normal closed position to keep the audit strip frame covered. This latch 349 will be described later on in connection with other functions that it has.

An audit strip supply roll 355 is provided with trunnions which rest in V blocks 356 (Figs. 9A and 18) mounted on the inside of the frames 331 and 332. The supply roll is held in position in the V blocks 356 by a pair of latches 357 (Figs. 10A and 17) which are operated to release the roll whenever desirable by means to be hereinafter described.

To keep a proper tension on the roll and keep the trunnions against the underside of the pair of latches 357 the roll rests upon a spring-pressed plate 358 secured to a shaft 359, which has secured to it an arm 360. A spring 361 holds the plate 358 against the bottom of the roll 355 and keeps the trunnions against the underside of the latches 357 at all times. Guide strips 362 are secured to the plate 334 and extend downwardly below the supply roll 355 to aid in threading the supply roll in and around the several rollers in a manner to be hereinafter described.

To properly thread the supply roll around in the frame so that it can be properly printed upon, the leading end is fed upwardly over a roller 363 mounted on studs projecting from the frames 331 and 332, thence over said roller and around another roller 364 supported by shiftable side plates 365 and 366 and thence to the right around a roller 367 carried by the plates 365 and 366 and over a roller 368 carried by said shiftable plates over a roller 369 supported by the plates 331 and 332 and thence downwardly around a pair of knurled feed rollers 370 fastened together by a sleeve 371 and journaled on a shaft 372. The strip is then fed between the pair of feed rollers 370 and a pair of tension rollers 373 (only one of which is shown) each of which is mounted on a lever 374 mounted on a rod 375 carried by arms 376 integral with a plate 377 secured to the tie bar 57. Springs 378 hold the tension rollers 373 against the paper so that when the feed rolls 370 are rotated in a manner to be hereinafter described the paper will be fed toward the left as viewed in Figs. 10A and 18. From the rollers 370 and 373 the paper enters a chute 379 and from here it is fed out through a slot 380 in the cover 345.

The plates 365 and 366, as above mentioned, are tied together by the rollers 364, 367 and 368, and are mounted to slide from their normal positions as shown in Figs. 10A and 18 toward the right for a purpose to be hereinafter described and then back again to normal position. The frames slide on four studs; two of them 381 cooperate with the plate 365 and two of them 382, which are secured to the frame 332, cooperate with the plate 366. Thus the frame, hereinafter known as the shifting frame, has a very free movement to the right and back again to its normal position.

The frame supporting the audit strip is latched in its normal position in the machine by means of latches 385 (Fig. 17) and 386 (Fig. 10A), pivoted on a shaft 387 supported by the side plates 331 and 332. The latch 385 cooperates with a stud 388 carried by the printer frame 54 and the latch 386 cooperates with a stud 389 carried by the frame 55. Each of the latches 385 and 386 has a spring 390 attached thereto to hold the latches in engagement with their respective studs 388 and 389. To release the latches 385 and 386 from the stationary studs 388 and 389 so that the audit strip frames may be drawn forwardly out of the machine, there is secured to the shaft 387 a hand-operated lever 391 (Fig. 10A) having a stud 392 normally held in contact with a finger 393 of the latch 386 by a spring 394 stretched between a stud on the lever 391 and an extension of the latch 386. Secured to the other end of the shaft 387 is an arm 395 having a stud 396 held in engagement with a finger 397 of the latch 385 by the same spring 394.

When it is desired to release the latches 385 and 386 from their respective studs 388 and 389, the operator grasps a flange 398 on the lever 391 and rocks the lever in a clockwise direction, whereupon the studs 392 and 395 are withdrawn from contact with fingers 397 and 393, respectively, thus permitting the spring 394 to rock the latches 385 and 386 clockwise and disengage them from their locking studs 388 and 389, whereupon the entire frame, including the audit strip and the feed rolls, may be slid forwardly until the lefthand one of the studs 339 and 344 strikes a rib 399 secured to the sub-base 56.

When the studs 339 and 344 strike the rib 399 as just mentioned, the operator may tilt the entire frame around the pivot studs 335 and 340 until the frame is in a substantially vertical position, or in other words, at right angles from the position shown in Figs. 10A and 18 until the ends 400 of the arms 336 and 341, contacting the shaft 359, act as a stop to prevent any further movement of the audit strip frame. Now if the operator wishes to release the cover, all that is necessary is that he move the latch 349 to release it from the stud 348 shown in Fig. 17.

Audit strip shifting mechanism

In order that the last several printed records on the audit strip 355 may be visible to the operator through the opening 346 in the cover 345, there has been provided a shifting mechanism to shift the strip from the normal position, up to a position adjacent the hammers and type wheels, and then after the printing has been made back to a position wherein the last print is visible through the opening 346 as above mentioned.

Assume that the last print is at the point marked 411 in Figs. 10A and 18. It will be necessary to shift this point on the audit strip from that position shown toward the right, to a point directly beneath the type wheels 150 shown generally in these two figures. After the audit strip has been shifted to that position, the feeding mechanism to be later described is operated to position the last printed item, which is now at point 412, one step to the right as viewed in Figs. 10A and 18, so that the new print will be just below or to the left of the print which has been moved from point 411 to 412.

The mechanism for accomplishing the shifting of the audit strip as above mentioned will now be described. As previously mentioned in connection with the frame for supporting the audit strip, three of the rollers, namely, 364, 367, and 368, are carried by a frame consisting of the shiftable plates 365 and 366 which slide on the rollers 381 and 382. The plate 366 (Figs. 9A and 10A) has a stud 413 engaged by an arm 414 which is rigidly secured to the previously described shaft 372. Also secured to this shaft is an arm 415 carrying a pin 416 engaged by an arm 417 fastened to a short shaft 418 supported by the frame 55.

Also secured to the shaft 418 is an arm 419 connected by a link 420 (Figs. 10A and 10B) to a lever 421 pivoted on a shaft 422 supported by the printer frames 54 and 55. The lever 421 carries rollers 423 and 424 cooperating with a double plate cam 425 and 426 secured to the printer drive shaft 320. It will be recalled that this shaft during adding operations makes one complete rotation, and during total taking operations it is disabled during the first cycle.

The timing of the cams 425 and 426 are such that shortly after the beginning of an operation of the machine, the lever 421 is rocked in a counterclockwise direction (Fig. 10B), which rocks the arms 419 and 417 counterclockwise (Fig. 10A), whereupon the arms 415 and 414 are moved in a clockwise direction, thus moving the plates 365 and 366 to the right, as viewed in Figs. 10A and 18.

When this occurs, there is no unwinding of the audit strip from the roll 355 nor is there any winding of the audit strip around the feed roll 370. As the roller 364 is moved to the right out of the bight formed by the paper around said roller, the paper is "given up" and the paper thus given up taken up by the roller 367 as it is moved to the right into the bight formed by the paper around the roller 367, thus bringing the point marked 411 from the position shown in Figs. 10A and 18 to the point marked 412, which is directly beneath the type wheels. After this movement of the audit strip, the feeding mechanism to be hereinafter described advances the strip one step to place the succeeding printing line of the strip just to the left of the point 412 ready to be printed upon.

After the printing on the audit strip has taken place, the cams 425 and 426 reverse the motions of the levers and arms above described, thus rocking the arms 415 and 414 counterclockwise to move the plates 365 and 366 back to the position shown in Figs. 10A and 18. During this movement the audit strip around the roll 367 is "given up" and the slack created thereby is taken up by the roller 364 as it moves to the left to its normal position. Thus at the end of this operation, the point marked 411 in Figs. 10A and 18 would be left at a point marked 430, and the last, or new, print will be at the point marked 411. It might be well to state here that the above described shifting movement of the audit strip takes place during each adding operation of the machine and during the second cycle of all total taking operations of the machine.

Secured to the plate 332 (Fig. 10A), near the base thereof, is a plate 427 having a curved upper surface 428, a vertical surface 429 and a shoulder 431. As the arm 415 is moved down to shift the strip, a stud 432 on the arm 415 stops against the shoulder 431 and limits the shifting of the strip. This stud, being, during such downward movement, in front of the surface 429, acts to prevent any withdrawal of the frame during machine operations.

Audit strip machine feeding mechanism

As above explained, after the audit strip has been shifted to the right, as viewed in Figs. 10A and 18, the strip feeding mechanism functions to feed the strip to bring a fresh portion thereof to receive the impression below the last impression which had taken place during the previous operation of the machine.

During certain types of total taking operations, it is necessary to feed the paper during the first cycle of a total operation as well as during the second cycle thereof. The purpose of this will be hereinafter explained. Therefore, in order that such feeds of the audit strip may take place, the drive for the audit strip is taken from the previously described shaft 309 (Fig. 7), which it will be recalled receives two complete revolutions during total-taking operations.

The audit strip mechanism is shown particularly in Figs. 9A, 9B, 10A, 10B and 15.

Secured to the lefthand one of the feed rollers 370 is a ratchet 440 having cooperating therewith a feed pawl 441 pivoted at 442 on a lever 443 journaled on the shaft 372. A spring 444 stretched between a tail on the pawl 441 and an arm of the lever 443 maintains the pawl 441 in constant engagement with the ratchet 440. Connected to the lever 443 by a hub is an arm 445 carrying a pin 446. A spring 447 normally holds the parts in the positions shown in Figs. 10A and 15, wherein a finger 448 stops against a collar on the shaft 387 and the pin 446 is held in close proximity to a lever 449 journaled on a shaft 450 supported by the frames 54 and 55. The lower end of the lever 450 carries a stud 451 normally engaged by the slotted end of a link 452 pivoted to an arm 453 journaled on the shaft 422. Also pivoted to the arm 453 is a link 454 connected to a bell crank 455 journaled on a rod 456 supported by the frames 54 and 55. The bell crank 455 carries rollers 457 and 458 cooperating respectively with the plates 459 and 460 of a double plate cam secured to the shaft 309.

It will be recalled that the shaft 309 makes two complete rotations during total taking operations. Therefore the bell crank 455 will be given two oscillations during total taking operations and one during adding operations. First consider the adding operation. After the audit strip has been shifted in the manner above described, the bell crank 455 is rocked clockwise, thus rocking the arm 453 and moving the link 452 to the right as viewed in Fig. 15. This rocks the lever 449 counterclockwise whereupon it engages the stud 446 and rocks the arm 445 and lever 443 clockwise, whereupon the pawl 441 moves the ratchet 440 one step, thus turning the feed rollers 370 one step to feed the audit strip the required distance.

After the feeding has thus taken place, the cams 459 and 460 reverse the motions of the train of mechanism just described down to and including the lever 449, whereupon the spring 447 restores the arm 445 and lever 443 counterclockwise to their normal positions, wherein they are arrested by the finger 448 coming into contact with the collar on shaft 387, thus moving the pawl 441 to the left so as to pick up the next successive tooth of the ratchet 440, ready for the next feeding operation.

As before explained, it is sometimes necessary to feed the audit strip during the first cycle of a total taking operation and sometimes it is not necessary to feed it during the first cycle of a total taking operation. There is, therefore, means provided for disconnecting the link 452 from the pin 451, so that when the cams 459 and 460 operate during certain types of total taking operations the audit strip will not be fed.

Secured to the shaft 309 is a single plate cam 461 (Figs. 10B and 23) cooperating with a roller 462 carried by a pitman 463 pivotally connected to an arm 464 journaled on a shaft 465 supported by the frames 54 and 55. Also journaled on the shaft 465 and rigidly connected to the arm 464 is an arm 466 connected by a link 467 to the previously described operating link 452 (Fig. 15) for the feeding mechanism. A spring 468 (Fig. 23) holds the roller 462 against the cam 461.

As the cam 461 operates, a lower portion therefor is presented to the roller 462, thereof, the spring 468 rocks the arms 464 and 466 counterclockwise, thus causing the link 467 to lower the left end of the link 452 and disconnect it from the pin 451 of the feed lever 449.

However, this disconnection is controlled by specially constructed selecting means which will be hereinafter described. At certain times when the cam 461 presents its low spot to the roller 462 the arms 464 and 466 are prevented from being moved counterclockwise by the spring 468 and consequently there is no disconnection between the link 452 and the feed operating lever 449 and therefore a feed will be given to the audit strip sometimes during the first cycle of a total taking operation as well as during the second cycle thereof.

The feeding of the audit strip varies for different types of operations and this is all controlled by a control mechanism to be hereinafter described in detail.

*Audit strip feed overthrow preventing means*

There is means provided for preventing the overthrow of the feed rollers 370 during an operation of the machine. This means includes a ratchet 470 (Figs. 9A and 16) secured to the righthand one of the feed rollers 370. The teeth in this ratchet are the reverse from the teeth in the feed ratchet 440. Cooperating with this ratchet is a pawl 471, slidably and pivotally mounted upon the shaft 387 and carrying a pin 472 normally held against a cam arm 473 by a spring 474. This cam arm 473 is fast on the previously described shaft 372, which it will be recalled is given first a clockwise and then a counterclockwise movement by the mechanism that shifts the audit strip from reading to printing position and back again.

The cam arm 473 is so positioned normally, as shown in Fig. 16, that by its contact with the pin 472 it holds the nose 475 of the pawl 471 disengaged from the teeth of the ratchet 470. However, when the shaft is rocked clockwise to shift the audit strip the surface 476 of the cam arm 473 is so shaped that it will permit the spring 474 to rock the pawl 471 counterclockwise to engage one of the teeth of the ratchet 470 to prevent any overthrow of the feed rolls 370 by the feeding ratchet 440 and its pawl 441. As the shaft 372 is returned counterclockwise to its normal position at the end of the shifting operation of the audit strip, the cam surface 476 of the arm 473 by its contact with the stud 472 cams the nose of the pawl 475 so that it remains disengaged from the ratchet 470 at the end of the operation of the machine.

*Manual feed of audit strip*

Means is provided for operating the ratchet 440 (Fig. 15) and pawl 441 to turn the feed rolls 370 to manually feed the audit strip whenever it is desirable. Referring to Figs. 10A and 15, the lever 391 fast on the shaft 387 is used to release the audit strip roll from the machine so that a new one can be put in the machine if desired, or whenever necessary.

Also secured to this shaft 387 (Fig. 15) is an arm 477 cooperating with a pin 478 which is carried by the feed lever 443.

Therefore the operator by grasping the handle piece 398 on the lever 391 and moving the same downwardly can rock the shaft 387 counterclockwise, thus raising the arm 477, whereupon through its engagement through the stud 478 in the feed lever 443 it will turn said feed lever in a clockwise direction an amount sufficient to cause the pawl 441 to turn the ratchet 440 one tooth space, or in other words, the regular line feed for the audit strip.

*Audit strip printing hammers*

In order to print on the audit strip, the machine is provided with five separate hammers for printing in the five separate columns on the strip. These hammers are all shown in Fig. 9A and are numbered 481, 482, 483, 484, 485. The hammer 483 is also shown in Figs. 10A, 11 and 12. These hammers are all mounted to pivot on a rod 486 (see also Fig. 10B) supported by the printer frames 54 and 55.

The hammer 481 prints the employee's clock number and the number of hours worked in the lefthand column on the record strip. The hammer 482 prints the designating symbols shown in the second column and also the amounts shown in the second column, which amounts vary. In some instances they represent the "pick-up" amount of previous earnings to date, any one of the several deductions which may be printed under control of the transaction keys 66 of the third row, and the earnings to date are also printed by this hammer 482. When taking a run of the totals of the machine these totals are also printed by the hammer 482.

The hammer 483 prints everything which is shown in the third column on the record strip, including the indicating symbols at the left of the column of figures. The figures in this column may represent any advances to date, any one of the deductions made and also the total of the last amount of advance balance.

The hammer 484 prints everything shown in the fourth column on the record strip, including the designating symbol and the amounts. The amounts may represent the gross amount of the pay check, a deduction, and the net amount of the pay check.

The hammer 485 prints the check numbers, which are shown in the fifth column on the audit strip.

These hammers are operated to print at various times during various types of operations in a manner to be hereinafter described.

Hammer raising and lowering means

As shown in Fig. 10A, the hammers lie directly beneath the rollers 367 and 368, which rollers are directly beneath the type wheels 150. Therefore it is necessary that these hammers be moved upwardly to a position in closer proximity to the type wheels after the rollers 367 and 368 have been shifted out of the path of the hammer and prior to taking an impression from the type wheels by the hammers because the distance as shown in Fig. 10A from the type wheels to the hammers is further than is practical to move the hammers for taking an impression.

Therefore there is means provided to raise the hammers to a closer position to the type wheels after the rollers 367 and 368 have been moved to the right by the audit strip shifting mechanism previously described, so that it will only require a short movement or impression blow by the hammer to take the impression from the type wheels on the audit strip. Such raising and lowering mechanism will now be described with particular reference to Figure 11.

Since these hammers never print during the first cycle of a two-cycle total taking operation, the cam for operating the raising and lowering of the mechanism for the hammers is secured to the cam shaft 320, which it will be recalled is disabled during the first cycle of a total taking operation and operates only during the second cycle thereof.

This mechanism for raising and lowering the hammers includes a double plate cam consisting of cams 487 and 488, which cooperate with rollers 489 and 490, respectively, carried by a bell crank 491 pivoted on the shaft 422. Secured to the bell crank 491 is an arm 492 connected by a link 493 to an arm 494 secured to the shaft 450.

Secured to the shaft 450 are five arms 495, one for each of the hammers 481 to 485. Each arm 495 has two fingers 496 and 497 to cooperate with a pin 498 of a lever 499 journaled on the shaft 450. There are five of these levers 499, one for each of the hammers. Each of the levers 499 is connected by a link 500 to its respective hammer 481 to 485.

After the audit strip rollers 367 and 368 start to move to the right, as viewed in Fig. 10A, the cams 487 and 488 rock the bell crank 491 clockwise, thus rocking the arm 494, shaft 450 and five arms 495 in a counterclockwise direction. It will be noted from Figure 11 that there is considerable distance between the pins 498 and the fingers 496 of the arms 495, and consequently such movement is idle as far as the levers 499 are concerned. However, after the fingers 496 contact the pins 498, the levers 499 are rocked counterclockwise, whereupon the links 500 raise the hammers 481 to 485 upwardly from the position shown in full line in Fig. 11 to the dot and dash line position shown in Fig. 11. By the time the hammers are raised to the dot and dash line position, the rollers 367 and 368 have been moved sufficiently far toward the right so there can be no interference between the hammers and said rollers.

After the printing has taken place and before the rollers 367 and 368 are moved back to the left, to the position shown in Fig. 10A, the cams 487 and 488 reverse the motion of the bell crank 491, arm 492, link 493, arm 494 and shaft 450, whereupon the fingers 497 will first be moved to take up the lost motion between them and the pins 498 and finally contact the pins 498 and restore the levers 499 clockwise to the position shown in Fig. 11, and thus, through the links 500, lower all of the hammers 481 to 485 from the dot and dash line position shown in Fig. 11 to the full line position shown in Fig. 11.

Hammer operating means

After the hammers have been moved up into the dot and dash line position of Fig. 11, there is mechanism, shown particularly in Figs. 12 and 13, for causing the hammers to be operated to take a printing impression from the type wheels 150 on the audit strip.

When the hammers are in their dot and dash line positions shown in Fig. 11, the levers 499, it will be remembered have been moved counterclockwise from the position shown in Figs. 11 and 12. During this counterclockwise movement, the pins 501 on said levers have been moved from the position shown in Fig. 12 into a position directly beneath notches 502 of links 503 pivoted to arms 504 secured to the shaft 422. There are five links 503 and five arms 504, one for each of the hammers 481 to 485. Also secured to the shaft 422 is a bell crank 505 carrying two rollers 506 and 507 cooperating respectively with plates 508 and 509 of a double plate cam secured to the printer operating shaft 320.

After the pins 501 have been moved beneath the notches 502, means to be hereinafter described is operated to rock the links 503 counterclockwise so that the notches 502 will fully engage the pins 501. In other words, all five of the links 503 will be rocked counterclockwise so that all five of their notches 502 will engage all five of the pins 501 of the five levers 499. After this engagement has taken place and after the audit strip has been moved to the right in the manner previously described, but before the feeding mechanism has operated, the cams 508 and 509 rock the bell cranks 505 and the shaft 422 in a clockwise direction, thus moving all of the links 503 to the right as viewed in Fig. 12, to rock the levers 499 counterclockwise to raise the hammers from the dot and dash line position of Fig. 12 still higher into contact with the audit strip which lies just beneath the type wheels 150 in order to take an impression from the type wheels on the audit strip.

During this extra, or printing, movement of the hammers, there is no interference between the stud 498 and the fingers 496 and 497 of the arms 495 which are pinned to the shaft 450, because it will be remembered that prior to the impression or hammer operating means just described, the arms 495 and shaft 450 will rock counterclockwise until the fingers 496 take up the lost motion between themselves and the pins 498, and then move the pins 498 and the levers 499 a sufficient distance to raise the hammers from the position in full line of Fig. 11. The hammers then remain in this position until after the cams 508 and 509 have rocked the levers 499 still further to give the hammers the necessary movement from the dot and dash line position into contact with the audit strip, which lies just beneath the type wheels, to take the impression on the audit strip. This extra movement of the levers 499 is permitted, due to the fact that when the hammers are in the dot and dash line position the fingers 496 are contacting the pins 498, and therefore there is plenty of space between the pins 498 and the fingers 497 to give the added movement of the levers 499 without the pins 498 interfering with the fingers 497. This is the reason for having the fingers 496 and 497 spaced apart as shown in Figs. 11 and 12.

*Hammer selecting means*

The mechanism for connecting the links 503 to the pins 501 on the levers 499 to select them for operation will now be described. Connected to each of the links 503, by a link 510, is an arm 511 pivoted on the shaft 465. Spring 512 holds shoulders on the arms 511 in contact with pins 513 of arms 514 fastened to the shaft 465. There are five of the arms 511 loose on the shaft 465 and five arms 514 fast on the shaft 465. Each of the arms 511 carries a cluster of feeler fingers which will be specifically described later on, which cooperate with notches and high spots on control plates. It is sufficient to state at this point that when the feeler fingers are opposite notches of the plates, the arms 511 can be rocked in a counterclockwise direction by their springs 512 a distance sufficient to move the links 503 counterclockwise to cause their notches 503 to fully engage the studs 501 so the hammers can be operated when the arms 514 and shaft 465 are rocked by the cams 508 and 509.

The manner in which these arms 514 and the shaft 465 are rocked in a counterclockwise direction for the purpose just mentioned will now be described. Secured to the shaft 465 (Fig. 13) is an arm 515 connected by a link 516 to a bell crank 517 journaled on the shaft 422. The bell crank 517 has rollers 518 and 519 cooperating with plates 520 and 521 of a double plate cam secured to the printer operating shaft 320, which it will be remembered receives one complete rotation during adding operations but is disabled during the first cycle of a two-cycle total operation.

Just before the cams 508 and 509 begin to operate to cause the hammer to make the impressions from the type wheels 150, the cams 520 and 521 rock the bell crank 517 clockwise, whereupon the link 516 rocks the arm 515, shaft 465 and all of the arms 514 in a counterclockwise direction, in the manner above mentioned, to cause the springs 512 to rock the arms 511 counterclockwise whereby the feeler fingers carried by said arms may feel for high spots, or notches, on the control plates later described. If notches are opposite the feelers, the links 503 will be connected to the levers 499 and the impression hammers will be operated to take an impression. However, if high spots are presented to the feeler fingers on the arms 511, the springs 512 will be stretched due to the fact that they cannot be rocked counterclockwise because of the interference of the high spots on the plates with the feeler fingers, and consequently no impression will be made from the hammers whenever their respective selecting plates, which will be later described in detail, are positioned with high spots opposite the feeler fingers.

*General automatic control for the audit strip feed and for the hammer mechanism*

As has been previously stated, when the complete record of any transaction relative to the issuance of a payroll check is recorded on the audit strip, it is necessary to feed the audit strip after certain of the impressions made thereon, and necessary to prevent the feeding of the audit strip after certain other impressions have been made thereon, and at other times it is also necessary to feed the audit strip before any impressions have been made thereon and even before the audit strip has been shifted into its position to receive the printed impression.

Also, it is necessary to control the selection of the operation of the hammers 482, 483 and 484, to print in the various second, third and fourth columns on the audit strip during the registration of a transaction comprising the issuance of a payroll check.

When there are three deductions, for example, involved in a transaction, it is necessary that each of these deductions be printed by a different one of the hammers 482, 483, and 484. If there are four deductions, the hammer 482 must again operate immediately following the operation of the hammer 484. If there are no deductions, then these hammers must be controlled so that the hammer 483 will operate to print the total of the advances to date, after which the hammer 482 is operated to print the total earnings to date, and finally the hammer 483 is operated to print the total of the net checks.

To control the above mentioned operation of the selection of the hammers and also of the selection of the feeding mechanism, there are provided first, several groups of control plates to control the selection of the hammers, and second, a separate group of control plates to control the feeding of the audit strip.

These control plates for the control of the hammers and the feed are differentially positioned from three different sources; first, from the first transaction bank, row 1; second, from a special gear line, which in turn receives its motion from the differential mechanism of row 1; and third, from another line of gears, which receives its differential motion under control of the total bank, so that it will be positioned in any one of seven differential positions, the first position being add, and the other six positions being total positions.

The control of the selection of only the hammers 482, 483 and 484, which print in the second, third and fourth columns on the audit strip, will be considered at this time.

The driving means from the first transaction bank, row 1, will be described first. Secured to the previously described shaft 143 (Fig. 4) which it will be remembered is moved differentially under control of the differential mechanism associated with row 1, is a segment 530, meshing with a gear 531, pivoted on a stud 532, carried by the base 52. The gear 531 meshes with a gear 533 secured to a shaft 534 upon which are mounted the several groups of hammer control plates and also the group of audit strip feed control plates. This shaft 534 is supported by the printer side frames 54 and 55 and by the other two printer side frames, not shown in Fig. 9B, but which are further to the left in the machine.

To operate another set of control plates of the several groups which control the selection of the hammers, and also the control plates of the single group, which controls the feed mechanism, under control of the first transaction bank differential mechanism, there is provided a shaft 535 (Figs. 9B and 10B) which has secured thereto gears 536, 537, 538 and 539, which adjust the hammer selecting control plates, gear 540 which adjusts the feed selecting control plates, gear 541, which is smaller than the previously mentioned gears and adjusts the hammer selecting plates for a purpose to be hereinafter described, and also a gear 542, which adjusts certain alining discs on the shaft 534, to be hereinafter described.

The driving mechanism under control of the differential mechanism of the total row for controlling the hammer selecting plates and the audit strip feed will now be described. Mounted on the shaft 174 (Fig. 7) is the usual total plate 543, which is fully illustrated and described in the above mentioned Goldberg patent and is set differentially under control of the keys in the total row, numbered 67 and 68. Pivoted to this total control plate 543 is a link 544 which is pivoted to an arm 545 journaled on the previously described shaft 138. Secured to this arm 545 is a gear segment 546 meshing with a gear segment 547 secured to a shaft 548 supported by the auxiliary frame 304 and the machine right side frame 51, said frames being shown in Fig. 8. Also secured to this shaft 548 is a gear segment 549 meshing with a gear 550 fast on a shaft 551, which is supported by the printer frames 54 and 55, as shown in Fig. 9B. Fast on the shaft 551 are gears 552, 553, 554, 555 and 556. The gears 552, 553, 554 and 555 adjust the hammer control plates, which are controlled from the keys of the total row. The gear 556 cooperates with the strip feed control. Another gear 557 is also secured to this shaft 551 and is used in connection with the alining plates for the control plates to be hereinafter described.

Referring now to Figs. 9B and 27 to 35, in which are shown the groups of control plates for controlling the three hammers 482, 483 and 484, for printing in the second, third and fourth columns of the audit strip, the mechanism shown in Figs. 27, 28 and 29, is for controlling the hammer 482, which prints in the second column on the audit strip. This group of control plates will now be described.

Fastened to the shaft 534, which it will be recalled is driven directly under control of the differential mechanism of the first transaction bank, is a control plate 560 (Fig. 29) having notches 561. Journaled on the shaft 534 is a control plate 562 (Fig. 28) having notches 563. It is secured to a gear 564, which meshes with the gear 539 on shaft 535, and which is moved only during an operation following an operation in which a key 66 is depressed, as later described. Also journaled on the shaft 534 is a control plate 565 (Fig. 27) having notches 566. It is secured to a gear 567 driven by the gear 555.

Thus it can be seen that the plate 560 is controlled by the first transaction bank differential. The plate 562 is operated by an automatic means released for operation under control of the first transaction bank, when differentially positioned under control of keys 66 of row 3, and is driven by a special ratchet drive shown in Figs. 19 and 20, to be later described. Control plate 565 is driven under control of the total row of keys.

The hammer selecting arm 511 (Fig. 27) carries a stud 568 on which is pivoted a feeler block 569 having feeling fingers 570 and 571 cooperating with the control plate 565, a feeling finger 572 (Fig. 28) cooperating with the control plate 562, and two feeling fingers 573 and 574 (Fig. 29) cooperating with the selecting plate 560.

The control points on the disks are marked with Arabic and Roman numerals, the former cooperating with the lower feeling fingers and the latter with the upper feeling fingers of said feeling blocks.

From the above it can be seen that the feeler block 569 has five feeler fingers in all, and that in order for the hammer 482 to be selected for operation it requires that the three lower feeler fingers 570, 572 and 573 cooperate with notches in all three of the plates 565, 562 and 560, respectively at one time, or that the two upper fingers 571 and 574 cooperate with notches, at the same time, in the plates 565 and 560.

When either of the two above conditions occurs, that is, when the three lower feelers cooperate with notches in the three plates, the hammer 482 will be selected for operation, or when the two upper feeler fingers cooperate with notches in the two plates, the hammer 482 will be selected for operation. This, it will be recalled, is due to the fact that, when the arms 514 are rocked counterclockwise by the cam mechanism of Fig. 13, the springs 512 cause the arms 511 to follow the arms 514, if the above condition of relationship between the feeler fingers on the block 569 and on the selecting plates 560, 562 and 565 occurs. When the arm 511 is thus lowered, the link 510 rocks the link 503 counterclockwise to cause its notch 502 to engage the pin 501 in the hammer operating lever 499.

To better illustrate the function of the control plates for the hammer 482, which is controlled from the plates of Figs. 27, 28 and 29, the specific example illustrated in lines 1, 2, and 3 of Fig. 36 will be used. The first entry of this transaction consists of picking up the earnings to date. As illustrated on the first line in the second column of the audit sheet, the operator picked up an amount of $40.00, which was the earnings-to-date, and in so doing, to complete that part of the transaction, he depressed the "Pick-up earnings-to-date" key 65 in the second transaction bank. It will be recalled from the previous description that the depression of this key through the automatic latch breaking mechanism causes the latch and differential mechanism of the first transaction bank to be stopped in the sixth position. When this occurs, the selecting plate 560 (Fig. 29) is moved to the sixth position, whereby the notch 561, numbered on the outside of the disc by the Arabic numeral 6, will be brought opposite the feeler finger 573. Since no key 66 was depressed, the control plate 562 in Fig. 28 will remain in the position shown wherein there is a notch opposite the feeler finger 572, and due to the fact that this is an adding operation, the control plate 565 remains in the position shown; that is, in the adding position with the notch opposite the feeler finger 570.

Therefore, since a notch is opposite all three of the lower feeler fingers 570, 572 and 573, when the arm 514 (Fig. 27) is lowered as above described, the feeling fingers enter said notches and therefore the spring 512 causes the arm 511 to follow the arm 514, thus connecting the link 503 of Fig. 12 to the hammer operating mechanism so that the hammer 482 will be operated to print the amount of the earnings to date.

The next group of selecting control plates to be discussed will be those of Figs. 30, 31 and 32, which are associated with the hammer 483, which prints in the third column on the audit strip.

A control plate 580, having notches 581, is fast on the shaft 534 and therefore differentially set under control of the row 1 bank of keys 64. Journaled on the shaft 534 and operated by a ratchet device to be later described, after a key 66 of row 3 is depressed, is a control plate 582, having notches 583, and secured to a gear 584, which meshes with the gear 537 secured to the shaft 535.

Also journaled on the shaft 534 is a control plate 585 having notches 586 and secured to a gear 587 meshing with the gear 553, which is secured to the shaft 551 that is operated under control of the keys 68 and 67 of the total row.

Carried by the arm 511, associated with the hammer 483, is a pin 588, having pivoted thereon a feeler block 589, having two feeler fingers 590 and 591, to cooperate with the plate 585, one feeler finger 592 to cooperate with the plate 582, and two feeler fingers 593 and 594 to cooperate with the control plate 580.

Since the next item of a complete transaction, now under consideration, following that of picking up the earnings-to-date consists of picking up the advances-to-date, the "Pick-up advance balance" key 64 of row 1 is depressed, whereupon the differential of row 1 sets the plate 580 (Fig. 32) into the third position since this key is in the third position of this row. This setting of the plate 580 brings the notch 581 opposite the III position and the Arabic 3 position opposite the feeler fingers 594 and 593, respectively. During this operation the disc 582 is not moved, nor is the disc 585 moved, the disc 585 remaining in the add position as shown in Fig. 30. It will be noticed in Fig. 30 that opposite both of the feeler fingers 590 and 591 there is a notch 596. Opposite the feeler 592 on the plate 582 there is no notch, and therefore the lower end of the feeler block cannot enter its fingers into notches on these three plates, 580, 582 and 585. However, as above mntioned, the hammer can be operated if any two of the upper feeler fingers 591 and 594 are opposite notches to permit the spring 512 of Fig. 30 to cause the arm 511 to follow the arm 514, which it will be recalled is moved downwardly by the camming device of Figure 13 to move the notch 502 of the link into engagement with the pin 501 of the hammer operating lever.

Therefore, since the notch 586 of the plate 585 is opposite the feeler 591, and since the notch 581 of the plate 580 in the III position is opposite the feeler 594, the hammer 483 can be operated to print in the third column the amount of $20.00, which is the amount of the advance balance that the employee owes the Company to date.

The next group of control plates to be considered are those shown in Figs. 33, 34 and 35, and are associated with the hammer 484, which prints in the fourth column on the audit strip.

Secured to the shaft 534 is a plate 600, having notches 601. This plate being secured to the shaft 534 is set directly under control of the differential mechanism of row 1.

Journaled on the shaft 534 is a control plate 602 having notches 603 and secured to a gear 604 meshing with the gear 536 which is secured to the shaft 535, which it will be remembered is operated by ratchet mechanism under control of keys 66, row 3, in a manner to be hereinafter described.

Also journaled on the shaft 534 is a control plate 605 having notches 606 and being secured to a gear 607 which meshes with the gear 552, fast to the shaft 551, which is set under control of the total row.

The arm 511 (Fig. 33) which is associated with the hammer 484 has a pin 608, upon which is pivoted a feeler block 609 having two feeler fingers 610 and 611, cooperating with the control plate 605, one feeler finger 612 (Fig. 34) cooperating with the control plate 602, and two feeler fingers 613 and 614 (Fig. 35) cooperating with the control plate 600.

The part of the transaction now being considered is the entering of the employee's gross check, and to make this entry the operator sets up the amount on the amount keys 63 and presses the "Gross earnings" key 65 in the second transaction row.

From the past description it will be remembered that depression of this Gross Earnings key 65 automatically controls the differential mechanism of row 1 to stop in the eighth position and consequently the control plate 600 will be moved to the eighth position. In the eighth position, both in the Roman numeral position and the Arabic numeral position, there is a notch 601 which cooperates with the feelers 613 and 614. The plate 602 is not moved during the entry of this item of the transaction, which enters the gross amount of the check, nor is the plate 605, since it is normally in its add position and this is an add operation. Therefore with the plates 605 and 602 in the positions shown, and the plate 600 moved to the eighth position, the two upper feelers 611 and 614 of the block 609 will encounter notches 606 and 601, respectively, when the arm 514 is rocked clockwise; therefore the spring 512 can rock the arm 511 counterclockwise to cause this link 510 to lower the link 503 and couple it by its engagement with the stud 501 with the hammer operating lever 499.

The next entry of the transaction involved in the issuance of a payroll check, when there are deductions, is the entry of the deductions, and by referring to Figure 36 it will be noticed that in the example now being considered, in the second row there is recorded 55 cents in the second column, $2.00 in the third column, and $5.00 in the fourth column.

For these three transactions the three keys 66 in the fourth position, in the third position, and in the second position of row 3 will be depressed for three successive item entry operations of the machine, which are a part of the complete transaction under consideration.

During the operation of the machine, whenever one of these keys 66 is depressed, there is a special mechanism controlled to move the discs 562, 582 and 602 one step during the next succeeding machine operation. If there are three deductions, these plates will be moved first from the No. 1 position to the No. 2 position during the second deduct operation, and then to the No. 3 position during the third deduct operation. If there are four deductions, the next position of these plates will be to the next succeeding No. 1 position.

The mechanism for controlling the movement of these three plates in Figs. 28, 31 and 34 will now be described.

Referring particularly to Fig. 19, secured to the shaft 534, which is operated by the differential of the row 1 transaction, is a control plate 620 having a single notch 621 in the fifth position thereof. It will be remembered from the previous description that when any of the keys 66 of row 3 are depressed, the differential mechanism of row 1 will be automatically stopped in its fifth position.

Adapted to cooperate with this disc 620 is a stud 622 carried by a lever 623 journaled on the shaft 465. The stud 622 is normally held in contact with the plate 620 by a spring 624. Pivoted on a pin 625 on the lever 623 is a fed pawl 626 cooperating with a ratchet 627 secured to the side of a gear 628 which meshes with the previously mentioned gear 538 that is fast to the shaft 535. The teeth on the ratchet 627 are spaced 30 degrees apart.

Cooperating with the lever 623 is a stud 629 carried by a bell crank 630 pivoted to a pitman 631 which is forked to slide on a collar on the shaft 309. The pitman 631 carries a roller 632 cooperating with a cam 633 on the shaft 309.

As is well known in this art, the differential mechanisms operate what are known in the art as minimum movement devices, and as the shaft 534 is set by the minimum movement device under control of the differential mechanism of row 1 this shaft and all of the control plates fastened thereto will remain in the positions at the end of the operation in which they were set during that operation. Therefore, since the last item of the transaction considered was that of entering the gross check, the differential of row 1 was left in the eighth position at the end of this operation, in which position the plate 620 of Fig. 19 was moved into its eighth position, and at this position of the plate 620, there is no notch and therefore the ratchet pawl 626 remained ineffective.

The operation following the gross check entry, in the example under consideration, is one during which the deduction of the amount of social security is made. At the beginning of this operation, the cam 633, through pitman 631, rocks the stud 629 against the tail on arm 633 and rocks said arm clockwise (Fig. 19) to withdraw the roller 622 from contact with the plate 620. Clearance is provided between the ratchet pawl 626 and the adjacent tooth of the ratchet wheel 627 to permit this clockwise movement without rotating the latter. The timing of the cam 633 is such that the roller 622 is withdrawn from contact with the plate 620 before the plate begins to rotate. Since the social securing deduction operation is controlled by the depression of a key 66 in row 3, the plate 620 is adjusted, during the said operation, to be moved to present the notch 621 into the path of roller 622. Near the beginning of the second half of rotation of cam 633, the pitman 631 is moved to the right (Fig. 19) to rock the arm 630 counterclockwise to withdraw the stud 629 from contact with the tail on arm 623. This movement of the arm 630 permits the spring 624 to rock the arm 623 counter-clockwise, and, since the notch 621 is now in the path of roller 622, the arm is rocked an extent sufficient to move the pawl 626 upwardly to engage over the next higher ratchet tooth on ratchet wheel 627, ready to rotate the ratchet wheel at the beginning of the next machine operation.

The next machine operation, in the example assumed, is the entry of the insurance. To properly control the machine for this entry, the "Insurance deduct" key 66 in row 3 is depressed. During this operation, the differential mechanism of row 1 is again arrested in the fifth position, and, since the plate 620 is set by the usual well-known "minimum movement" device, the disc 620 is not readjusted, with the result that the notch 621 therein remains in the position adjacent the roller 622. During the first part of this machine operation, when the cam 633 rocks the arm 630 clockwise, the pin 629 by its contact with the rear arm of the lever 623 will rock said lever in a clockwise direction, thus lowering the pawl 626 and turning the ratchet 627 and consequently the gear 628 one step of movement, which is 30 degrees of the ratchet. This motion, through the gear 538 and shaft 535, gear 539, (Fig. 28), and gear 564, will turn the disc 562 one step, whereupon there will be no notch presented to the feeler finger 572. At the same time, the gear 537, being fast to the shaft 535, will turn the gear 584 and its associated plate 582 one step, which will position the notch 583 of this disc opposite the finger 592 associated with the hammer 483.

Simultaneously with the movement of the plates 562 and 582, the disc 602 through the gear 536 and gear 604 is moved one step, which positions a high spot on the plate 602 opposite the feeler 612. Consequently during this operation of the entry of the insurance, which is the second deduction, only the three feeler fingers 590 (Fig. 30), 592 (Fig. 31), and 593 (Fig. 32) will be opposite notches in the plates 585, 582, and 580. It will be noticed that the plate 580 has a notch opposite the fifth position, and as the differential is stopped in the fifth position, this notch is placed opposite the finger 593, and therefore when the arm 514 is rocked counterclockwise, as viewed in Fig. 30, the spring 512 of the hammer arm 511 can connect its link 503 with the hammer operating arm 499 associated with this hammer and consequently the insurance deduction of $2.00 is printed in the third column on the audit strip, as shown in Fig. 36 by the hammer 483.

The next item to be entered is repayment on advance payment, and therefore the operator depresses the "Repayment deduction of advance payment" key 66. This key being in the third row, the differential of row 1 will remain in the fifth position, whereupon a notch of the plate 600 (Fig. 35) is opposite the feeler finger 613 and, the plate 605 not being moved, the notch 606 will be opposite the feeler 610. During this operation the mechanism of Fig. 19 again functions under control of the pitman 631 since the plate 620 remains in the fifth position and consequently the ratchet 627 will be moved one more step of 30 degrees by the pawl 626 when the arm 630 is moved clockwise, as above described, and therefore the gears 539 and 564 will turn the plate 562 of Fig. 28 to the third position, which leaves a high spot opposite the feeler 572, and the gears 537 and 584 will turn the plate 582 one more step, which will remove the notch in the 2 position and place a high spot in the 3 position opposite the feeler 592. At the same time the gears 536 and 604 of Fig. 34 will turn the plate 602 to position the notch 603 in the third position opposite the feeler 612. Since the plate 600 of Fig. 35 has a notch in the 5 position opposite the finger 613, all three of the feelers 610, 612 and 613 of the block 609 are in position to permit the spring 512 (Fig. 33) to lower the arm 511 when the arm 514 is rocked by the mechanism of Fig. 13, and consequently the link 503 associated with the hammer 584 will be moved into active position with its stud 501 on the hammer operating arm 499, and consequently this third deduction of $5.00 is printed by the hammer 484 in the fourth column on the audit strip.

The next operation in the transaction is one of the total operations to print the total of the advances to date, which in the instance under consideration is $20.00, which was entered as the second entry of the transaction, minus $5.00, which was deducted from the $20.00 in the last entry described, leaving a balance of $15.00. This amount is taken off of the balance totalizer and printed by the hammer 483 in the third column on the audit strip. The means for controlling the operation of this hammer will now be described.

Referring particularly to Fig. 20, journaled on the shaft 534 is a ratchet 640, the teeth of which are spaced 45 degrees apart, for a purpose to be hereinafter described.

In a transaction which includes three deductions, or multiples of three, the mechanism shown in Fig. 20 performs no function. It is described here to point out its movements during such a transaction and to show why it performs no function during such a transaction. Its functions will be clear in the consideration of a transaction having deductions other than in multiples of three.

Secured to the ratchet 640 (Fig. 20) is a gear 641 meshing with the small gear 541 secured to the shaft 535. Also journaled on the shaft 534 is a gear 642 meshing with the gear 554 on the shaft 551 which is driven under control of the total row of keys. Secured to this gear 642 is a control plate 643 having a notch 644 extending over the 1, 2, 3 and 4 positions of this plate 643. In the add position of the 643 plate there is a high spot. Cooperating with the ratchet 640 is a pawl 645 pivoted on a stud 646 of a lever 647 journaled on the shaft 465. The lever 647 carries a pin 648 held in contact with the periphery of the plate 643 by a spring 649. The rear end of the lever 647 cooperates with the stud 629, which is of sufficient length to extend not only beneath the rear of the lever 623 but also beneath the rear of the lever 647. Consequently the lever 647 is operated by the cam 633, pitman 631 and arm 630 to operate the lever 647 and pawl 645 in the same manner and at the same time as the lever 623 and pawl 626 are operated.

During the three operations involving the three deductions, the control plate 620 is adjusted to render the pawl 626 effective to index the ratchet wheel 627. However, since the timing of the cam 633 is such that the ratchet wheel 627 is not indexed until the beginning of the operation following the one in which the pawl 626 is rendered effective, this indexing takes place only during the last two deduction operations. However, at the end of the third deduction operation, the pawl is still effective, and therefore the ratchet wheel 627 is indexed at the beginning of the next succeeding machine operation, which, in the example here described, is the "total of advances to date" operation, which is a two-cycle operation, and the ratchet wheel 627 is indexed its third step during the early part of the first cycle of the two-cycle balance printing operation. The ratchet 627 is moved 30 degrees for each indexing operation thereof and through the gears 628 and 538, shaft 535, gears 541 and 641 the ratchet 640 is moved 15 degrees each time the ratchet 627 is indexed, due to the fact that the ratio of this train of gears is 2 to 1. Therefore, at the end of three steps of movement, the ratchet 627 having 30 degrees spaced teeth comes to rest after one quarter rotation thereof, in which position it is as shown in Fig. 19, and as the ratchet 640 has 45 degrees spaced teeth it comes to rest after rotating the distance of only one tooth space, in which position it is as shown in Fig. 20.

During each of the deduction operations, which are entry operations, the pawl 645 cannot move because the plate 643 is in add position with a high spot opposite the stud 648 of the lever 647. As before mentioned, the timing of the cam 633 is such that it rocks the arm 647 to lower pawl 645 at the very beginning of a machine operation. Thus the pawl 645 is lowered before the control plate is adjusted under control of the "Advance to date" key, and therefore the pawl is also not effective to rotate the ratchet wheel 640 during the total, or balancing, operation. During this balancing operation, the low spot 644 is positioned opposite the stud 648, and therefore, when the cam 633 returns the arm 647 toward its upper position, the stud 548 enters the low spot and permits the pawl to rise toward the next tooth space. However, the extent of upward movement given the pawl 645 is not sufficient to position the pawl behind the next tooth on the ratchet 640, and therefore it will be ineffective during the next succeeding operation of the cam 633.

Therefore, during a balancing operation following three deduction operations, the plate 582 remains in the position shown in Fig. 31, in which a high spot is opposite the finger 592 of block 589.

The cam 633 is mounted on shaft 309, which shaft, as above explained, receives two complete rotations during a balancing or total taking operation. However, the control disc 620 is adjusted during the first cycle of a two-cycle operation to remove the notch 621 from the path of roller 622, and therefore the pawl 626 cannot be raised for a second effective operation of the ratchet wheel 627 during said second cycle of operation. The pawl 645 is also moved during the second rotation of cam 633, but at this time the pawl is not effective to rotate the ratchet wheel 640 for the reasons just given.

During the first cycle of a total taking, or balancing, operation, the disc 585 of Fig. 30 is adjusted under control of the differential in the "Total Row" and presents the III notch 586 therein to the feeler finger 591, and the plate 582 need not be considered even though it has been moved into a position wherein there is no notch 583 opposite the feeler finger 592. However, the plate 580, which is operated under control of the row 1 differential, has been moved to position the notch 581 of the IX position, because the zero stop pawl 184 (Fig. 4) of this bank is moved to its ineffective position during total taking operations by the well known mechanism illustrated and described in the Shipley Patent 1,617,916, and consequently this plate 580 is moved into the 9 position. Therefore, since there is a notch opposite the feeler 591 and opposite the feeler 594, the hammer 483 is operated by the means previously described to print the advances to date in the third column of the audit strip.

The next entry of the present transaction is the printing of the earnings-to-date, which is accomplished by operating the machine after the depression of the "Earnings-to-date" key 68 of the total row. This key is in the second position in the total key row, and therefore, during the machine operation, the gear 554 of Fig. 20 moves the control plate 643 to the second position, which presents a low spot or notch 644 to the roller 648 and consequently the pawl 645 will again be raised. However, the pawl 645 will move idly during this operation, because, as above mentioned, the movement is not sufficient to move the pawl above the next 45-degree tooth on the ratchet 640. Therefore the plate 562 remains in the position shown in Fig. 28, wherein a notch 563 is opposite the feeler 572. The plate 566 of Fig. 29 is moved to present a notch opposite the 9 position thereof to the feeler finger 573 and as the plate 565 is moved under control of the total row the notch in the 2 position thereof is positioned opposite the feeler 570. Therefore, during this operation of the printing of the earnings-to-date, only the hammer 482 will be operated and consequently this amount, which in the present instance is $95.00, is printed in the second column, as shown on the audit strip, since the three feelers 570, 572 and 573 are opposite notches in their control plates.

All of the other plates of Figs. 30 to 35 do not present the sufficient combination of notches of their plates to permit either of the hammers 483 or 484 to be operated during this earnings-to-date operation.

The last and final operation of the transaction under consideration is the printing of the net check, and this is accomplished by operating the machine after the depression of the "Net check" key 68 of the total row.

During the first part of this operation, the cam 633 lowers the pawl 645, but, since the pawl is not behind a tooth on ratchet 640, the pawl is ineffective. Therefore the plate 602 will not be moved.

During this operation, the plate 600, under control of the row 1 differential, is set in the 9 position, which presents a notch 601 opposite the feeler 614, and the plate 605 is set under control of the total row to the 1 position to present its notch 606 of the 1 position opposite the feeler 611, and consequently the two upper feelers associated with the hammer 484 are opposite notches of the control plate, and so this hammer is operated to print the net check in the fourth column on the audit strip.

It will be noted that none of the plates in Figs. 27 to 32 inclusive have the proper combination of low spots set up during this net check operation to permit either the hammer 482 or 483 to be operated at this time.

The next transaction to be considered will be where there were only two deductions from the employee's gross check.

This transaction is completely printed in the fourth, fifth and sixth rows of the audit strip, referenced 663 as viewed in Fig. 36.

In entering the various items of this transaction, the hammers are selected in the same manner as explained above, when printing the $95.00 "Earnings to date"; the $15.00 "Advances to date"; the $100.00 "Gross earnings"; the 90 cents "O. A. B. deduct"; and the $15.00 "Repayment deduction of advances to date." There are only two deductions in the example illustrated, the second deduction being a $15.00 one, wherein the employee paid off all of his previous advances to date. After this deduction, the Advances-to-Date key 68 is operated, and consequently the hammer 483 is operated to print the balance of the employee's advance-to-date after he has fully paid them off, which, in the example being considered, is zero. This operation of the hammer 483 for printing the zero balance follows the printing of the $15.00 deduction; thus, the hammer 483 is operated during two succeeding operations, and the hammer 484 is not operated in the operation just preceding the entry of the balance of zero.

To cause this hammer 483 to print during the operation immediately following the entry of a second deduction, the plates of Figs. 30 and 32 are positioned as previously described in connection with the previous Advances-to-Date operation so that the proper combination of notches of the plates 580 and 585 will be opposite the feeler fingers 591 and 594 to allow this hammer to be operated. During the said balance operation, the plate 580 is positioned to present the notch IX to the feeler finger 594, and the plate 585 is moved to present the notch III to the feeling finger 591, in the same manner as hereinbefore described for an "Advances to date" operation.

It will be recalled that the ratchet wheel 627 (Fig. 19) is indexed one step during the second deduction operation, another step during the third deduction operation, and a third step when printing the "Advances to date," to properly index the control plate 582 (Fig. 31). In the example now being considered, no third deduction is made, and therefore the plate 582 is indexed its second step during the "Advances to date" operation. Thus, at the end of this latter operation, the plate 582 is standing with a notch 583 opposite the feeler finger 592. However, before the next succeeding item is printed—that is, the item $195.00, "Earnings to date"—the control plate must be in a position with a high spot "1" opposite the feeling finger 492. To obtain this result, the before-mentioned mechanism shown in Fig. 20 is provided.

During the operation in which the second deduction is made, the ratchet wheel 627 (Fig. 19) was advanced one step, and during the operation in which the "Advances to date" balance is printed, the ratchet wheel 627 (Fig. 19) was advanced another step, making a total of two steps, or 60 degrees, and therefore the ratchet wheel was advanced two steps, or 30 degrees. During the operation in which the "Advances to date" is entered, the control plate 643 is adjusted to present a low spot 644 to the roller 648, and therefore, at the end of such operation, the pawl 645 is in its upper position. Since, at this time, the ratchet wheel 640 is two steps or 30 degrees out of its normal position, in a direction clockwise from that shown in Fig. 20, the pawl 645 engages behind the next tooth of the ratchet, which tooth is two steps out of normal at this time. During the first part of the next operation of the machine—that is, when printing the $195.00 "Earnings to date"—the cam 633 (Fig. 19), through pitman 631 and arms 630 and 647, lowers the pawl 645. This pawl, being behind a tooth of the ratchet wheel, rotates the said ratchet one step, or 15 degrees, clockwise (Fig. 20), which in turn, through gears 641 and 541, shaft 535 (Fig. 28), and gears 539 and 564, adjusts control plate 562 one step, and, through shaft 535 (Fig. 31) and gears 537 and 584, adjusts control plate 582 one step, and, through shaft 535 (Fig. 34) and gears 536 and 604, adjusts control plate 602 one step. By this means, the three control plates 562, 582, and 602 are moved to their "1" positions, as shown in the drawings. Therefore, before the printing of the "Earnings to date" takes place, the control plates are in the positions explained in the first example of entering a transaction described herein.

This adjustment of the cam plates 562, 582, and 602 takes place during the early part of the first rotation of shaft 309 and cam 633. At the end of said first rotation of cam 633, the pawl 645 is again raised to its uppermost position. At the beginning of the second rotation of the cam 633, for the total taking operation being considered, the pawl 645 is lowered idly, because it is not behind the next tooth of ratchet wheel 640.

The next operation following the printing of the "Earnings to date" is the printing of the "Net check" amount, $84.10, and the printing hammer is selected in the same manner as explained in the first transaction entry described herein.

For the next transaction represented by lines 664 (Fig. 36) there were no advances-to-date and only one deduction. In all the operations of this transaction before the deduction operation, the control plates are adjusted to select the printing hammers in the same manner as in the similar operations described above. After the deduction of 75 cents, which was printed by hammer 482, the next item of this transaction was the depression of the Earnings-to-Date key, which causes the same hammer 482 to again operate.

During the entry operation of the single deduction, the pawl 626 (Fig. 19) is raised to engage behind the next tooth of the ratchet wheel 627. Then, at the beginning of the first cycle of the two-cycle operation for printing the "Earnings to date," the pawl 626 moves the ratchet 627 one step, or 30 degrees, which moves the ratchet 640, 15 degrees. At the time the pawl 626 moves the ratchets 627 and 640, the cam 633 also lowers the pawl 645 (Fig. 20), but, since this pawl 645 is not in effective engagement with the ratchet wheel 640 at this time, the pawl 645 moves idly. However, when the pawl 645 is again raised into its upper position near the end of said first cycle of operation, the pawl 645 drops behind the next tooth on the ratchet wheel 640, which tooth was positioned in relation to the pawl 645 when rotated by pawl 626 during said first cycle of operation. Then, when the pawl 645 is lowered by the cam 633 at the beginning of the second cycle of operation, the pawl 645 rotates the ratchet wheels 640 and 627 to bring them into a position like that shown in Figs. 19 and 20. When the ratchet wheels 640 and 627 are as shown in Figs. 19 and 20, the control plates 562, 582, and 602 again assume the positions shown in Figs. 28, 31, and 34. These adjustments of the control plates are made prior to the operation of the printing hammers during the second cycle of the "Earnings to date" entry operation.

Now, the plate 562 has a notch 563 opposite the feeler 572, and the plates 560 and 565 will be positioned the same as during the previous Earnings-to-Date total operation, wherein the 9 position notch 561 is opposite the feeler 573 and the 2 position notch 566 is opposite the feeler 570. Therefore a combination of three notches is opposite the feelers 570, 572 and 573 so that the hammer 482 can be again operated to print the amount of $270.00.

Overthrow preventer

To prevent any overthrow of the plates 562, 582 or 602 there is provided an overthrow preventing mechanism which will now be described. Journaled on the shaft 534 (Fig. 22) and secured to the plate 585 (Fig. 30) and gear 587 is a control plate 655.

Also journaled on the shaft 534 is a stopping plate 656 secured to a gear 657 which meshes with a gear 658 secured to the shaft 535 that is driven by the ratchets 627 and 640. The stopping plate 656 has four stopping lugs thereon adapted to cooperate with a flat stud 659 carried by an arm 660 journaled on the shaft 465. The arm 660 has a spring 661 connected thereto, which holds a roller 662 against the periphery of the control plate 655. In adding operations, the roller 662 is held against the higher periphery of the plate 655, as it is not necessary to stop the ratchet mechanisms during adding operations because the movement is not sufficient to cause any overthrow. However, during certain total operations, the ratchet 640 is moved further, and there may be a chance of overthrow because the movement of said plates 562, 582 or 602 may be as much as 60 degrees. Therefore to prevent any overthrow of the said control plates, the plate 655 has a low portion opposite all of the total positions, and as this plate 655 is driven from the gear 553 under control of the total row whenever any of those keys in the total row are depressed, the low part of the plate 655 is presented to the roller 662 and consequently the spring 661 moves the stud 659 into the path of movement of one of the lugs on the stopping plate 656 to prevent any overthrow of the ratchet and also of the control plates 562, 582, or 602 connected thereto during certain total taking operations.

Grand total printing

At the end of the run of payroll checks for any pay period, the operator may wish to run the totals from the machine, and to do so, to clear the totalizers associated with rows 1, 2 and 3, the respective total keys 67 with the proper designations, as shown in Figure 1, are depressed. During this type of operation, all of these totals are printed by the hammer 482 and the proper combination of notches in the plates 560, 562 and 565 of Figs. 29, 28 and 27, respectively, are opposite the feelers associated with hammer 482, so that these totals will be printed by this hammer and the control plates of Figs. 30 to 35 are so positioned that the two hammers 483 and 484 will not be connected to their operating mechanism.

During the clearing of row 3 totalizers, in order to prevent the pawl 626 (Fig. 19) from operating the ratchet 627, due to the fact that the plate 620 is moved to the fifth position to present the notch 621 to the roller 622, due to the fact that any key in row 3 causes the row 1 differential to stop in the fifth position, there is provided a special plate 665 (Fig. 21) secured to the gear 567 and control plate 565, which special plate 665 moves to the sixth position of the total row with the plate 565 and blocks out the notches in the fifth position of plate 620 so that the roller 622 cannot move into the notch 621 during the clearing of any of the deduction totals, and consequently the pawl 626 cannot function during that time.

The reason for the block being in the fifth as well as the sixth position is to prevent operation of pawl 626 if a key 66 is depressed, which stops row 1 differential at 5, along with the depression of total key 67 in the fifth position which is for clearing of row 2.

Clock number hours worked printing

By referring to Fig. 36 it will be noted that in the first column the employee's clock number, 123, and the number of hours worked, 45, are printed. These are printed when the Clock Number and Hours Worked key 64 of the first transaction row is depressed, and is printed by the hammer 481. To control this hammer to print only during the operation of the transaction in which the clock number and hours worked are set up, the shaft 551 has a gear 670 secured thereto (Fig. 9B), which drives a gear 672 secured to a control plate 673, which has a notch only in the add position to cooperate with a feeler finger similar to those shown in Figs. 27 to 35, so that only in the add position will this hammer work, and only when the Clock Number and Hours Worked key is depressed. Secured to the shaft 534 and cooperating with the same feeler pawls for the hammer 481 is a control plate 674 which has a notch in the third position corresponding to the position of the Clock Number and Hours Worked key, so that this notch in combination with the notch in the add position of the disc 673 permits only the hammer 481 to operate during this particular adding operation.

Serial number printing

The hammer 485 of Fig. 9A prints in the fifth column on the audit strip the serial number of the check, and this is printed only during the operation when taking the net check total. To control the hammer 485 to print the serial number of the check during the net check total operation there is secured to the shaft 551 a gear 675 meshing with a gear 676 journaled on the shaft 534. Also fast to the shaft 534 and under control of the row 1 transaction bank is a control plate 678. The combination of notches in the zero position of the plate 677 in add and in the 9 position of the plate 678 controls the hammer 485 to print only during the net check operation and to be prevented from printing during all other operations of the machine.

Automatic controls for machine feed mechanism of the audit strip

As shown by the printing of the first complete transaction on the audit strip, there is no feeding of the strip after the picking up of the "Earnings to date" nor after the picking up of the advance balance, but there is a feed after the setting up of the gross earnings. Then after the first deduction there is no feed, after the second deduction there is no feed, but after the third deduction there is a feed, so that the "Advances to date" which is printed next will be printed in the next line. This is represented by the $15.00 in the third column. After this printing of the "Advances to date" there is no feeding, and therefore the $95.00 item, which is the "Earnings to date," is printed on the same line in column 3. After this operation there is no feeding, with the result that the net check amount of $47.45 is printed in the fourth column but in the third line, along with the $95.00 and $15.00 totals.

Since the actual feeding mechanism for the audit strip has been previously described, it only remains to describe the means for controlling the coupling and uncoupling of the feed link 452 (Figs. 10A and 10B) to and from the pin 451 on the feed operating lever 449. To control this feeding mechanism, there is provided a cluster or group of control plates having notches and high spots, or the true periphery thereon, and it takes a high spot, or the true periphery, to cause the coupling of the link 452 with the pin 451 of the feed operating arm and it takes notches on the control plates to prevent feeding of the audit strip.

With this in mind the feeding control for the audit strip will now be described, referring particularly to Figs. 23, 24, 25 and 26.

Secured to the shaft 534, which it will be recalled is operated under control of the row 1 transaction keys 64 is a control plate 690 (Fig. 25) having notches 691. Journaled on the shaft 534 (Fig. 23) is another control plate 692 having a long notch 693. This plate 692 is secured to a gear 694 driven by the gear 556 secured to the shaft 551, which is operated under control of the total row of keys. Also secured to the gear 694 is a plate 696 (Fig. 26) having a notch 697, which plate is driven under control of the total row of keys. There is also journaled on the shaft 534 another control plate 698 (Fig. 24) having several notches 699. This plate 698 is secured to a gear 700 meshing with the gear 540 secured to the shaft 535 which is operated by the ratchets 627 and 640 of Figs. 19 and 20.

Secured to the previously described arm 464 is a feeler block 703 (Figs. 23, 24, 25 and 26), having feeler fingers 704 and 705, adapted to cooperate with the control plate 692.

The block 703 has two more feeler fingers 706 and 707 cooperating with the control plate 698 and a single feeler finger 708 cooperating with the control plate 690. There is also a feeler finger 709 adapted to cooperate with an arm 710 journaled on a shaft 534. This arm 710 is pivotally connected to a lever 711, carrying a pin 712 adapted to cooperate with the notch 697 of the plate 696 and also carrying a roller 713 to cooperate with a cam 714 on the printer drive shaft 320. A spring 715, at certain times to be later described, causes the roller 713 to follow the low portion of the cam 714 to cause the audit strip to be fed on certain specific operations of a transaction, which will be later described. The lever 711 is pivoted on a shaft 716 supported by the frames 54 and 55.

It might be well to again state that to prevent the feeding of the record strip under control of the plates and the feeler fingers, it is necessary that all three of the fingers 705, 707 and 708 cooperate with notches 693, 699 and 691 of the plates 692, 698 and 690 at the same time, or if notches are presented to the feelers 704, 706 and the plate 710 is not over the feeler 709. When either of the above conditions is present, the arm 466 can be rocked by the spring 468 to cause the link 452 to be disengaged from the pin 451 of the feed operating lever 499.

The first operation in connection with a complete transaction for issuing payroll checks and for printing all of the complete records therefor on the audit strip, as above mentioned, is the picking up of the "Earnings to date." When this occurs, the key in the third position of row 2 is depressed, which automatically stops the row 1 differential in the sixth position. This moves the plate 690 (Fig. 25) to the sixth position, which presents a notch to the feeler 708. The plate 698 is not moved by the ratchet 627 of Fig. 19 during this operation and therefore the notch 699 remains opposite the feeler 707 and as this is an adding operation the notch 693 is opposite the feeler 705, and consequently the arm 466 will be rocked to disengage the link 452 from the pin 451 and there will be no feed after the printing of the pick-up "Earnings to date."

The next operation of the transaction is the pick-up of the advance balance, and for this operation the operator depresses the third key of row 1, which sets the plate 690 (Fig. 25) in the 3 position, which is a notch 691, thus presenting this notch 691 to the feeler 708, and as the plates 698 and 692 are not moved there will be notches opposite all three feelers 705, 707 and 708, and consequently there will be no feed of the audit strip after the printing of this item of "Advances to date."

The next item is the printing of the workman's clock number and the number of hours, which is accompanied by the depression of the fourth key of row 1. During this operation the plate 690 is set to the fourth position, which is a notch, and therefore, for this operation, as before, there will be notches opposite the feelers 705, 707 and 708, and consequently there will be no feed after the printing of the workman's clock number and the number of hours worked.

The next operation is the setting up of the gross amount of the check, and for this operation the operator depresses the key in the fourth position of row 2. During this operation the plate 690 is set by the first bank differential under the automatic control to the eighth position, which presents a high spot to the feeler 708, and as there are high spots opposite the feelers 704 because the plate 692 has not been moved since this is still an adding operation, there will be at least one high spot presented to one of the feelers on the lower portion of the block 703 and also a high spot presented to one of the feelers on the upper portion of the block 703, and consequently the arms 466 cannot be moved downwardly by the spring 468 and therefore the link 452 will not be disconnected from the pin 451 and consequently the audit strip will be fed one space to present a clean line for the next transaction.

The next operation is the entrance of the first deduction of 55 cents. As before stated, the ratchet 627 does not operate during this operation and therefore the plate 698 will remain in the position shown. During this operation the plate 690 is set automatically to the fifth position, which presents a low spot to the feeler 708, and as there is a low spot opposite the feeler 707 and still a low spot opposite the feeler 705, there will be no feed at this time because the arm 466 will be rocked to disconnect the feed operating mechanism.

The next transaction is the printing of the $2.00 insurance deduction and at this time the plate 698, prior to the time of the feeding, will be moved one step by the ratchet 627 to present the II position to the feeler 707, which is a low position, and as there is a low position in the 5 position of the plate 690 and in the add position of the plate 692 and of the plate 698 there will be no feed after the printing of the insurance deduction.

The next operation is the entrance of the advance payment deduction of $5.00. Prior to this printing the plate 698 has been fed a second time by the ratchet 627 and thus presents the III position to the feeler 707 and Arabic 3 position to the feeler 706 and therefore the arm 466 cannot be rocked during this operation, that is, after the printing of the $5.00, and consequently the audit strip will be fed to present a clean line for the printing of the next operation of the transaction.

The next operation is the taking of the total of the "Advance to date," which is accompanied by the depression of the advance-to-date key 68 in the third position of the total row. During this time the plate 692 is moved to the 3 position, which presents a high spot in the III position to the feeler 705. During this operation of the printing of the total "Advances to date" the plate 698 is moved three steps, but during this setting of the plate 698, the cam 714 has held the lever 711 so that the roller 712 will not fall in the notch 697 as the notch passes this roller. The plate 698 during the first cycle of this operation is moved 30 degrees by the pawl 626 from the III position into the next I position so that a low spot is opposite the feeler 707, and also opposite the feeler 706. The plate 710 is held out of the path of the feeler 709 and the feeler 704 has a low spot, and therefore there will be no feeding after the printing of the "Advances to date."

The next operation of the transaction is the "Earnings to date," which is accompanied by the depression of the Earnings-to-Date key 68 in the total row. This is in the second position and the plate 692 is positioned so as to have a low spot opposite the feeler 704 and plate 698 not having been moved presents notches to the feelers 706 and 707 opposite the feeler 704. Consequently there will be not feeding of the audit strip after the printing of the "Earnings to date."

The next operation of the transaction is the printing of the net check amount. It is desirable that there be a feed after the printing of this net check amount, and this is accompanied by the depression of the Net Check key, which is in the first position of the total row. The first position of the total row presents the notch 693 to both the feelers 704 and 705. The plate 690 will be moved to the 9 position during this operation and consequently there will be a high spot presented to the feeler 708. Also during the first cycle of this operation the plate 698 will be moved one step and present the notch 697 to the stud 712 but, as hereinbefore mentioned, shortly after the beginning of the first cycle the shaft 320 is stopped, leaving the higher portion of the cam 714 beneath the roller 713 of the arm 711 and therefore the plate 710 cannot be moved in front of feeler 709. Therefore feelers 704, 706 enter notches and feeler 709 misses the plate 710 thus disconnecting the feed during the first cycle. During the second cycle the shaft 320 moves the cam 714 and the spring 715 will move the lever 711 clockwise and rock the arm 710 in front of the feeler 709. Therefore, since there is a high spot opposite one of the upper feelers 708 and also opposite one of the lower feelers 709 the audit strip will be fed after the printing of the net check during the second cycle.

In the entry of a transaction including only one deduction—for example, like that shown in line 8 (Fig. 36)—the audit strip feed is line-spaced at the beginning of the next item entry operation, which is shown in line 9, column 2 (Fig. 36), as $195.00 "Earnings to date." During the operation in which the deduction of 75 cents is entered, the pawl 626 (Fig. 19) is moved into its effective position to index the ratchet wheel 627 and the control plate 698 (Fig. 24). At the beginning of the first cycle of the "Earnings to date" entry operation, the pawl 626, through the connections hereinbefore described, moves the control plate 698 one step and at the same time moves ratchet wheel 640 one step, so that the pawl 645 can be moved into effective position in relation to the ratchet wheel 640 during the first cycle of operation of said "Earnings to date" entry operation. When the shaft 309 starts its second rotation at the beginning of the second cycle of operation, the pawl 645 rotates the ratchet pawl 640 two steps, in the manner heretofore described, to move the control plate 698 into a position similar to that shown in Fig. 24, wherein a low spot is opposite both feeling fingers 706 and 707 on block 703, and therefore the control plate 698 is in a position to prevent a feed. Other control plates must, therefore, be set to cause a feed to take place.

During the first cycle of the "Earnings to date" entry operation, the control plate 690 (Fig. 25), adjusted by the differential in row 1, is moved into its "9" position, by mechanism hereinbefore described for adjusting shaft 534, to thus bring a high spot in front of the feeling finger 708 on feeler block 703.

Also during said first cycle of the "Earnings to date" entry operation, the differential mechanism of the "Total row" adjusts the control plate 692 into its "2" position, wherein a low spot is opposite the feeling finger 704 and a high spot (II) is opposite finger 705.

In addition to the above, the differential in row 1 adjusts the control plate 696 to control the member 710, in the manner described above, so that the member 710 will block the feeler finger 709.

Thus, at the beginning of the second cycle of operation of the "Earnings to date" entry operation, high spots are in the path of feeling fingers 705 (Fig. 23) and 708 (Fig. 25), and the member 710 is in the path of the finger 709 (Fig. 26) to cause a line-spacing feed to take place prior to the operation of the printing hammer 482.

During the clearing of the totals of rows 1, 2 and 3 the plate 692 (Fig. 23) is moved into the fourth, fifth and sixth position respectively and as both the Arabic positions 4, 5 and 6 and the IV, V and VI positions do not have notches, the feelers 704 and 705 are both held out and consequently the strip is fed during the first cycle before printing and during the second cycle after printing.

*Alining means for control disk*

There is an alining mechanism to aline the disks that are set under control of the first transaction bank, under the control of the ratchet 627, and under control of the total lever, which will now be described. Referring to Figs. 9A and 14, the gear 557 meshes with a gear 721, secured to an aliner 722. Meshing with the gear 542 is a gear 723 fast to another aliner 724 like the aliner 722. Fast on the shaft 534 is an aliner 725 shown also in Fig. 14. Cooperating with these aliners 722, 724 and 725 is an aliner bar 726 secured to a lever 727 pivoted on the shaft 716. The lever 727 is connected to a pitman 729 carrying a roller 730 cooperating with the cam 731 on the shaft 309, which it will be recalled makes two operations during total operations. A spring 732 causes the aliner 726 to engage all three of the aliner disks 722, 724 and 725 when the cam 731 moves to present the low portion thereof to the roller 730, so that during printing and feeding the control disks and plates will not be moved out of alinement.

There is also a so-called snap-aliner 733 which cooperates with the alining disk 724 under influence of the spring 734. This snap-aliner 733 merely bobs in and out over the serrations of the aliner plate during the setting thereof.

*Payroll check*

A facsimile of a payroll check is illustrated in Figure 37. This payroll check is printed by type wheels from the usual type of column printing mechanism which is set under control of the internal-external gear line of the Kreider type, shown in Figure 4, whereupon all of the amounts set up on the keyboard and printed on the audit strip are also printed on the check as illustrated.

*Ledger card*

A facsimile of the ledger card is shown in Fig. 38. The printing on this card is accomplished by type wheels set in the usual manner under control of the column printing internal-external gear drive mechanism shown in Figure 2, which is of the type illustrated in the above mentioned Kreider patent.

The hammers for printing on the payroll check and also on the ledger card are set under control of control plates similar to those shown in Figs. 27 to 35 so that the printing on the payroll check and also the ledger card can be accomplished at the proper time, dependent upon the type of operation of the particular transaction being entered into the machine at the time.

*Time card attachment*

As previously stated there is an attachment on the rear upper part of the machine to hold a stack of workmen's time clock cards from which data may be read in picking up certain of the amounts, the clock number, hours worked and other deductions, when it is desirable to use this type of system.

This attachment is shown in Figs. 39 and 40 and is substantially like that shown in the United States Patent No. 2,234,342 issued March 11, 1941, to Robert H. Goodell and Carl W. Roser. The attachment consists of supporting means comprising side plates 721 and 722 connected by a base 723 and an angular top 724. This top supports workmen's time clock cards 725 between guide plates 726 and 727 and held in position by a heavy plate 728. A card ejecting member or picker 729 is guided to slide downwardly against a front plate 730.

An extended arm 731 of the picker 729 has a slot engaged by the end of a lever 732 pivoted on the side plate 727. The other end of the lever 722 is connected to a rod 733 adapted to be moved upwardly by a solenoid 734 when the same is energized. A spring 735 returns the rod 733, lever 732 and picker 729 to normal positions after the picker 729 has been operated to move the foremost time card 725 downwardly. Upon downward movement of the time card it is moved between a pair of feed rollers 736 driven by a belt 737 from a motor 738. A deflecting plate 739 turns the card toward the left as viewed in Fig. 40 so that it will be stacked on the bottom plate 723. A hinged door 740 is provided for access to the cards that have been fed downwardly by the picker mechanism.

The operation of the picker and solenoid 734 is as follows:

Diagrammatically indicated at 745 is an electrical connection box having contact bars 746, 747, and 748. Supply lines 749 and 750 are connected to the bars 747 and 748. Also connected to the bars 747 and 748 are lines 751 and 752 leading to a motor 738. This motor 738 runs constantly except when the current is cut off by a switch 753. A line 754 connects the solenoid 734 and the bar 748 to which is connected a line 755 leading to a stationary contact 756. Connected to the bar 747 is a line 757 leading to a contact 758 mounted on the "Earnings-to-date" key 68 in the total row. A line 759 connects the solenoid 734 and the bar 748.

Upon depression of this "Earnings-to-date" key 68, as has been previously described, to control the machine to function during certain operations of transactions issuing payroll checks, the contact 758 strikes the contact 756 and closes the circuit through the solenoid 734 whereupon the picker 729 is operated to move the foremost card down into the lower part of the receptacle to present the next card in the stack to view, so that when writing the next employee's check the operator will have the information directly in front of him.

Machine operation

Due to the fact that during the general description and throughout the detailed description, the complete operations of the parts and their functions have been given, it is not felt necessary to go through any operation of the machine at this point because a thorough understanding of the same may be had from the general description in connection with the detailed description.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine capable of single and multiple cycle operations involved in a complete transaction, a plurality of banks of control keys, certain of which control the machine to make one-cycle operations and the remaining keys control the machine to make multiple-cycle operations; a plurality of differential mechanisms settable under control of the banks of the control keys; printing mechanism for printing upon record material, said printing mechanism including a plurality of impression means; a plurality of groups of selecting means for said impression means certain of said selecting means being differentially adjustable by the differential mechanisms, and automatic means for adjusting others of said selecting means, for causing successive operation of different ones of said plurality of impression means under control of certain banks of keys upon entry of certain operations forming a part of a complete transaction, or for causing repeat operations of various ones of said plurality of impression means, as determined by the operation of said differential mechanisms depending on the type of operation being entered as a part of said complete transaction; feeding means for said record material; and means including a group of selecting devices for determining operation of said feeding means, certain of said group of selecting devices being adjusted by said differential mechanisms, and others of said group of selecting devices being adjusted by the automatic means, whereby the feeding means is prevented from operation upon the above-mentioned successive operations of each of the impression means and is caused to operate between all the said repeat operations of the impression means.

2. In a machine capable of single and multiple cycle operations involved in a complete transaction, a plurality of banks of control keys, certain of which control the machine to make one-cycle operations and the remaining keys control the machine to make multiple-cycle operations; a plurality of differential mechanisms; printing mechanism for printing upon record material, said printing mechanism including a plurality of impression means; a plurality of groups of selecting means for said impression means settable by the differential mechanisms, for causing successive operation of different ones of said plurality of impression means under control of certain banks of keys upon entry of certain operations forming a part of a complete transaction; and automatic means operable under control of certain of said control keys to readjust certain of said selecting means for causing repeat operations of various ones of said impression means as determined by the operation of said differential mechanisms depending on the type of operation being entered as a part of said complete transaction.

3. In a machine capable of single and multiple cycle operations involved in a complete transaction, a plurality of banks of control keys, certain of which control the machine to make one-cycle operations and the remaining keys control the machine to make multiple-cycle operations; a plurality of differential mechanisms; printing mechanism for printing upon record material, including feeding means for said record material; a plurality of groups of selecting devices; connections differentially settable by the differential mechanisms for setting certain of the selecting devices for determining the operation of the feeding means to cause the same to be prevented from operation for a variable number of operations of the machine involving a part of the complete transaction; and automatic means operable to adjust others of said selecting means to cause the feeding means to be operated between certain other operations of the machine.

4. In a machine capable of single and multiple cycle operations involved in a complete transaction, a plurality of banks of control keys, certain of which control the machine to make one-cycle operations and the remaining keys control the machine to make multiple-cycle operations; a plurality of differential mechanisms operated differentially from various ones of the banks of the control keys; printing mechanism for printing upon record material, said printing mechanism including a plurality of impression means; a plurality of groups of selecting means for said impression means certain of which are operable by the above-mentioned differential mechanisms, for causing sequential operation of three of the said impression means under control of two keys in one bank of said certain banks of said control keys and under control of one key in another of said certain control banks upon entry of certain operations forming part of a complete transaction, and for causing a second sequential operation of the same impression means in the same order under control of different keys in another bank of said certain control keys; and automatic means operable under control of other keys to adjust certain others of said selecting means for causing an unsequential operation of said impression means.

5. In a machine capable of single and multiple cycle operations involved in a complete transaction, a plurality of banks of control keys, certain of which control the machine to make one-cycle operations and the remaining keys control the machine to make multiple-cycle operations; a plurality of differential mechanisms; printing mechanism for printing upon record material, said printing mechanism including a plurality of impression means; a plurality of groups of selecting means for said impression means and operable by the differential mechanisms, certain of said groups of selecting means adjustable for causing sequential operation of three of the said impression means under control of two keys in one bank of said certain banks of said control keys and under control of one key in another of said certain control banks upon the entry of certain operations forming part of a complete transaction, and for causing a second sequential operation of the same impression means in the same order under control of different keys in another bank of said certain control keys; automatic means operable to advance certain of said selecting devices step by step for selectively causing an unsequential operation of said impression means under control of three keys of still another bank of said remaining bank of control keys; feeding means for said record material; and means including a plurality of groups of selecting devices settable by the differential mechanism for preventing feed of record material after the first two operations of the first sequential set of operations of the impression means, and for causing a feed after the last one of the first of said sets of sequential operations of the impression means, and for preventing operation of the feeding means after each of the first two operations in the second set of sequential operations of the impression means; said automatic means setting certain selecting devices for causing operation of the feeding means after the third operation of the second sequential set of operations of the impression means, and for preventing operation of the feeding means after the first two unsequential operations of the impression means, and for causing an operation of the feeding means after the last of the unsequential set of operations of the impression means.

6. In a machine capable of single and multiple cycle operations involved in a complete transaction, a plurality of banks of control keys, certain of which control the machine to make one-cycle operations and the remaining keys control the machine to make multiple-cycle operations; a plurality of differential mechanisms; printing mechanism for printing upon record material, said printing mechanism including a plurality of impression means; a plurality of groups of selecting means for said impression means settable under control of said differential mechanisms for causing sequential operation of three of the said impression means under control of two keys in one bank of said certain banks of said control keys and under control of one key in another of said certain control banks upon the entry of certain operations forming part of a complete transaction, and for causing a second sequential operation of the same impression means in the same order under control of different keys in another bank of said certain control keys; automatic means operable to set certain of said selecting devices for causing an unsequential operation of said impression means under control of three keys of said remaining control keys; feeding means for said record material; and means including a group of selecting devices, certain of said devices being positionable under control of said differential mechanism and others positionable by the automatic means for preventing feed of record material after the first two operations of the first sequential set of operations of the impression means, and for causing a feed after the last one of the first of said sets of sequential operation of the impression means, and for preventing operation of the feeding means after each of the first two operations in the second set of sequential operations of the impression means, and for causing operation of the feeding means after the third operation of the second sequential set of operations of the impression means, and for preventing operation of the feeding means after the first two unsequential operations of the impression means and for causing an operation of the feeding means after the last of the unsequential set of operations of the impression means; all of said operations of the feeding means being controlled jointly by the automatic means and by the same keys which control the sets of sequential and unsequential operations of the impression means.

7. In a machine capable of single and multiple cycle operations involved in a complete transaction, a plurality of banks of control keys, certain of which control the machine to make one-cycle operations and the remaining keys control the machine to make multiple-cycle operations; a plurality of differential mechanisms; printing mechanism for printing upon record material, said printing mechanism including a plurality of impression means; a plurality of groups of selecting means for said impression means and operable by the differential mechanisms; and means for automatically adjusting certain of said selecting means, said automatic means acting jointly with the differential mechanisms for causing sequential operation of three of the said impression means under control of two keys in one bank of said banks of said control keys and under control of one key in another of said control banks upon entry of certain operations forming part of a complete transaction, and for causing a sequential operation of certain of said impression means upon operation of two keys in another of said control banks, and for causing a repeat operation of the last-operated impression means upon operation of a key in another control bank.

8. In a machine capable of single and multiple cycle operations involved in a complete transaction, a plurality of banks of control keys, certain of which control the machine to make one-cycle operations and the remaining keys control the machine to make multiple-cycle operations; a plurality of differential mechanisms operated differentially from various ones of the banks of the control keys; printing mechanism for printing upon record material, said printing mechanism including a plurality of impression means; a plurality of groups of selecting means for said impression means operable by the above-mentioned differential mechanisms; automatic means acting jointly with the differential for causing sequential operation of three of the said impression means under the control of two keys in one bank of said banks of said certain control keys and under control of one key in another of said control banks upon entry of certain operations forming part of a complete transaction, and for causing a sequential operation of certain of said impression means upon operation of two keys in another of said certain control banks, and for causing a repeat operation of the last-operated impression means upon operation of a key in another control bank; feeding means for said record material; and means including a group of selecting devices, certain of said last-named group of selecting devices adjusted by the automatic means and others of said last-named group of selecting devices set under control of the differential mechanisms to jointly cause operation of the feeding means after the last operation of the first sequential operations of the impression means, and for causing operation of the feeding means after the last of the second sequential operations of the impression means, and for preventing operation of the feeding means after all other operations of the impression means.

9. In a machine capable of making single and multiple cycle operations involving a complete transaction, printing means including a plurality of impression means for printing in columns on record material; a plurality of groups of impression selecting devices; a plurality of actuating means for operating said selecting devices; a plurality of banks of control keys selectively operable for controlling certain of said actuating means whereby the selecting means selects the impression means for operation during one machine operation to cause a certain one of said impression means to be operated during the next machine operation to thereby operate the impression means in a certain sequence; certain of said control keys adapted to control the actuating means to be arrested in a certain position; a normally ineffective means automatically operated during a machine operation; a control member adjustable by the last-named actuating means to render the automatic means effective during a succeeding operation of the machine to move the selecting means into a new position; and a second automatic means rendered effective upon operation of one of the said control keys to readjust the selecting means to select the impression means in a different succession.

10. In a machine capable of making single and multiple cycle operations involving a complete transaction, printing means including a plurality of impression means for printing in columns on record material; a plurality of groups of impression selecting devices; a plurality of actuating means for operating said selecting devices; a plurality of banks of control keys selectively operable for controlling certain of said actuating means whereby the selecting means selects certain of the impression means for operation in a certain sequence, said sequential operation control being effected during one operation to control the selection during the next succeeding operation; a normally ineffective means automatically operated during a machine operation; a control member adjustable by the last-named actuating means to render the automatic means effective during a succeeding operation of the machine to move the selecting means into a new position, certain of said control keys controlling the machine for multiple-cycle operations; a second automatic means rendered effective upon operation of one of the last-named control keys to readjust the selecting means to select the impression means in a different sequence; feeding means for the record material; and a plurality of selecting devices for said feeding means operable in conjunction with a certain group of the above-mentioned selecting means for the impression means, said last-mentioned group of impression control selecting means and the feed selecting devices being controlled by the same operated control devices above mentioned which determine when the record material is to be fed and after which of the impression operations.

11. In a machine capable of making single and two cycle operations involving a complete transaction, printing means including a plurality of impression means for printing in columns on record material; a plurality of groups of impression selecting devices; a plurality of actuating means for operating said selecting devices; a plurality of banks of control keys selectively operable for controlling certain of said actuating means whereby the selecting means selects certain of the impression means for operation in a certain sequence, said selection occurring in one of said sequence of machine cycles to determine the selection during the next machine cycle; a bank of control keys to control the actuating means to be arrested in a certain position; a normally ineffective means automatically operated during a machine operation; a control member adjustable by the last-named actuating means to render the automatic means effective during a succeeding operation of the machine to move the selecting means into a new position; a bank of control keys for controlling the machine for multiple cycle operations; a second automatic means rendered effective upon operation of one of the last-named control keys to readjust the selecting means to select the impression means in a different sequence; feeding means for the record material; a plurality of selecting devices for said feeding means operable in conjunction with a certain group of the above-mentioned selecting means for the impression means, said last-mentioned group of impression control selecting means and the feed selecting devices being controlled by the same operated control devices above mentioned which determine when the record material is to be fed and after which of the impression operations; a plurality of printer-operating means; means to give one of said operating means two rotations during a two cycle operation and prevent rotation of the other of said operating means during one cycle of a two cycle operation; connections intermediate the two cycle operating means and the feeding means for feeding the record material; and control means settable by said automatic means to control the effectiveness of said connections to cause the feeding means to be fed only once during any operation involving only the operation of one of the control means of the first-mentioned group or one of the control means of the second-mentioned group and for giving the record material two feeds when a key in each of the two mentioned groups is operated concurrently.

12. In a machine adapted to make single and multiple cycle operations involving a complete transaction, a main operating means for the machine; printing means for recording on record material all of the data involved in the several operations of the complete transaction; a plurality of printing hammers variably operated, depending upon the type of operation forming a part of the complete transaction; feeding means for the record material adapted to be variably operated, depending upon the type of operation involved in the complete transaction; a plurality of groups of devices for controlling said variable operations of the printing hammers; a group of members to control the variable operations of the feeding means; control keys to control the setting of said devices and members; and means actuated by the main operating means to automatically adjust certain of said members during a machine operation to modify the control of the keys over the printing hammers and feeding means, to cause the hammers to be operated in a definite successive cycle and to shift the control over said devices and members back to the control keys upon completion of said successive cycle of operations.

13. In a machine of the class described, the combination of means to print on record material data involved in the complete registration of a multiple operation transaction; a plurality of hammers for printing said data; a plurality of groups of selecting means for controlling the operation of said hammers; a plurality of banks of control keys selectively operable for controlling certain elements of said groups of selecting means to select certain hammers for operation in a certain sequence; and means including a plurality of ratchet devices adapted to be controlled by certain of said control keys to automatically adjust certain others of said elements one step during each machine cycle to vary the control of said control devices to select said hammers for operation in a different manner and in a different sequence.

14. In a machine of the class described, the combination of means to print on record material data involved in the complete registration of a multiple operation transaction; a plurality of hammers for printing said data; a plurality of groups of selecting means for controlling the operation of said hammers; a plurality of banks of control keys selectively operable for controlling said groups of selecting means to select certain of said hammers for operation in a certain sequence; means including a plurality of ratchet devices adapted to be controlled by certain of said control keys to automatically adjust certain others of said elements one step during each machine cycle to vary the control of said control devices to select said hammers for operation in a different manner and in a different sequence; feeding means for the record material; and a plurality of control members to control the operation of said feeding means under control of said control keys and said ratchet devices for varying the feed upon operation of other of said control keys.

15. In a machine of the class described, the combination of means to print on record material data involved in the complete registration of a multiple operation transaction; a plurality of hammers for printing said data; a plurality of groups of selecting means for controlling the operation of said hammers; feeding means for the record material; a plurality of control members for controlling variable operation of the feeding means; a plurality of banks of control keys for controlling the adjustment of said groups of selecting means and the group of control members to control the hammers and the feeding means to make variable operations; a ratchet device to modify said adjustment of the groups of selecting means; and another ratchet device to restore the groups of selecting means to said adjusted position.

16. In a machine adapted to make single and multiple cycle operations involving a complete transaction, printing means for printing on record material the data involved in the several operations of a complete transaction; a plurality of banks of control keys for controlling the machine to make single cycle operations; a bank of keys for controlling the machine to make multiple cycle operations; a plurality of hammers for printing the data in columns during all types of operations; a plurality of groups of control devices for controlling the variable operation of the hammers under control of one of the first-mentioned banks of control keys for a sequential columnar recording; a ratchet device operable under control of one of said banks of single cycle control keys to adjust the control devices to thereby select the hammers to record data in columns in a predetermined sequence; a second ratchet device under control of the multiple cycle bank of control keys for adjusting said control devices to a predetermined position to thereby select a predetermined column regardless of the sequential selection unit control of the single-cycle control keys, the second-mentioned ratchet device being connected to the first-named ratchet device and to certain of the groups of control devices; and means to prevent overthrow of the second-mentioned ratchet device to thereby prevent overthrow of said certain of the groups of hammer control devices.

17. In a machine adapted to make single and multiple cycle operations involving a complete transaction, printing means for printing on record material the data involved in the several operations of a complete transaction; a plurality of banks of control keys for controlling the machine to make single cycle operations; a bank of keys for controlling the machine to make multiple operations; a plurality of hammers for printing the data on all types of operations; a plurality of groups of control devices for controlling the variable operation of the hammers, said control devices settable under control of one of the first-mentioned banks of control keys; a ratchet device operable under control of one of said banks of single cycle control keys to readjust the control devices after being set under control of said one bank of control keys to control the selection of the hammers to record data in different columns in a certain sequence; a second ratchet device actuated under control of the multiple cycle bank of control keys for readjusting said control devices to change the selection of the hammers to record data in a certain column, the second-mentioned ratchet device being effective to readjust the control devices into a predetermined position upon each operation thereof; feeding means for the record material; a plurality of control members settable under control of the banks of single cycle control keys to control the operation of the feeding means at certain times, and operable under control of the multiple cycle control keys to control the feeding means to operate at other times; and means to prevent overthrow movement of the second ratchet device during one of its variable movements under control of the multiple cycle control keys to prevent overthrow of certain of the groups of hammer control means and certain of the feed control members.

18. In a machine capable of making single and multiple cycle operations involving a complete transaction, printing means including a plurality of impression means for printing in columns on record material; a plurality of groups of impression means selecting devices; a plurality of banks of single cycle control keys to control the selection devices; a bank of multiple cycle control keys to also control said selection devices; a differential means for each of the single cycle control banks of keys, each differential being controlled by its associated bank of keys; means associated with one bank of single cycle control keys and adapted to be controlled by a certain other bank of single cycle control keys to cause the differential mechanism for said one bank of keys to be controlled by said certain bank of keys; a ratchet device controlled by the differential mechanism of said one bank to adjust the selection devices from a certain position one step each time the machine is operated during which said one differential is controlled by said certain other bank of keys; and another ratchet device controlled by the bank of multiple cycle control keys to restore said selection devices into said certain position when the machine is operated under control of said multiple cycle keys, when said multiple cycle key is operated following an operation of only one key of said certain other bank of keys.

19. In a machine capable of making single and multiple cycle operations involving a complete transaction, printing means including a plurality of impression means, each impression means provided for printing in a separate column on record material; a plurality of groups of impression means selecting devices; a plurality of banks of single cycle control keys to control the adjustment of the selecting devices to select the impression means for sequential printing in the different columns; a bank of multiple cycle control keys to also control the adjustment of said selecting devices; a differential means for each of the single cycle control banks of keys, each differential being controlled by its associated bank of keys; means associated with one bank of single cycle control keys and adapted to be controlled by a certain other bank of single cycle control keys to cause the differential mechanism for said one bank of keys to be controlled by said certain bank of keys; a ratchet device which is controlled by the differential mechanism of said one bank to readjust the setting of the selecting devices out of a certain set position when said one differential is controlled by said certain other bank of keys; another ratchet device controlled by the bank of multiple cycle control keys to restore the selecting devices to said certain position, said other ratchet device controlled by said multiple cycle keys when said multiple cycle key is operated following an operation of one key of said certain other bank of keys; record material feed means; and feed selecting means controlled by said keys to control the operation of the feed means at certain times and controlled by said ratchet devices when controlled as above mentioned to control the operations of the feed means.

20. In a machine of the class described having a main operating means, the combination of printing means adapted to print on record material various types of data involved in the recording of a complete transaction; a plurality of impression means adapted to make a plurality of impressions for recording said transaction; a plurality of groups of selecting means for variously selecting said impression means for operation; a plurality of groups of control keys to control the adjustment of one group of said selecting means; and automatic means operated by the main operating means to directly adjust another group of said selecting means, said other group of selecting means acting jointly with said plurality of groups of selecting means to determine the sequential operation of the impression means in fixed successive cycles to determine the number of times each of the impression means is to operate.

21. In a machine of the class described having a main operating means, the combination of printing means adapted to print on record material various types of data involved in the recording of a complete transaction; a plurality of impression means adapted to make a varying number of impressions when recording said complete transaction; two groups of selecting means for selecting said impression means for operation in a certain successive order; a plurality of groups of control keys to control the adjustment of one of said groups of selecting means to determine the number of times each of the impression means is to operate and when they are to operate; means operable by the main operating means to adjust the other group of selecting means to jointly act with said one group of selecting means to control the selection of said impression means to begin a new successive order when one successive order of printing has been completed; feeding means for said record material; and a plurality of selecting devices for causing said feeding means to feed the record material after a complete successive order has been effective to cause the printing of certain of the said data on the record material under control of the same operated control devices which control the selection of said impression means.

EVERETT H. PLACKE.